United States Patent
Higashiyama et al.

(10) Patent No.: US 7,843,604 B2
(45) Date of Patent: Nov. 30, 2010

(54) IMAGE CORRECTING DEVICE, IMAGE FORMING APPARATUS, AND IMAGE CORRECTING METHOD

(75) Inventors: Makoto Higashiyama, Kanagawa (JP); Yoshiaki Kawai, Kanagawa (JP); Shingo Nishizaki, Kanagawa (JP); Tomohide Kondoh, Kanagawa (JP); Masashi Suzuki, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 519 days.

(21) Appl. No.: 12/000,928

(22) Filed: Dec. 19, 2007

(65) Prior Publication Data

US 2008/0174799 A1     Jul. 24, 2008

(30) Foreign Application Priority Data

Dec. 28, 2006 (JP) .............................. 2006-355891
Jun. 18, 2007 (JP) .............................. 2007-160464
Dec. 10, 2007 (JP) .............................. 2007-318458

(51) Int. Cl.
G03F 3/08     (2006.01)
G06F 15/00    (2006.01)
G06K 9/00     (2006.01)

(52) U.S. Cl. ...................... 358/1.9; 358/3.13; 358/3.26; 358/535; 382/167

(58) Field of Classification Search .................. 358/1.9, 358/3.13, 3.14, 3.15, 3.16, 3.17, 3.18, 3.19, 358/3.26, 535, 536; 382/167, 289
See application file for complete search history.

(56) References Cited

U.S. PATENT DOCUMENTS

| 2006/0181753 A1 | 8/2006 | Kawai |
| 2007/0140721 A1 | 6/2007 | Shinohara et al. |
| 2007/0165283 A1* | 7/2007 | Matsuzaki et al. ......... 358/3.26 |
| 2008/0075363 A1* | 3/2008 | Matsuzaki et al. .......... 382/162 |

FOREIGN PATENT DOCUMENTS

| JP | 09-090695 | 4/1997 |
| JP | 2001-080124 | 3/2001 |
| JP | 2001-353906 | 12/2001 |
| JP | 2006-123391 | 5/2006 |
| JP | 2006-212986 | 8/2006 |
| JP | 2007030207 A * | 2/2007 |

* cited by examiner

Primary Examiner—Thomas D Lee
(74) Attorney, Agent, or Firm—Harness, Dickey & Pierce, P.L.C.

(57) ABSTRACT

A pattern generating unit generates correction patterns on a transfer belt. Detection sensors detect the correction patterns, and amounts of magnification correction, amounts of misregistration in the main- and the sub-scanning direction are calculated. The amount of skew between each of colors is then calculated, and a position where an image is divided and a direction for shifting a divided image are determined. Possible dividing-positions are also determined, and a calculated dividing position and each of the possible dividing positions are compared with one another. Then, a possible dividing position closest to the calculated dividing position is set as an actual dividing position.

10 Claims, 44 Drawing Sheets

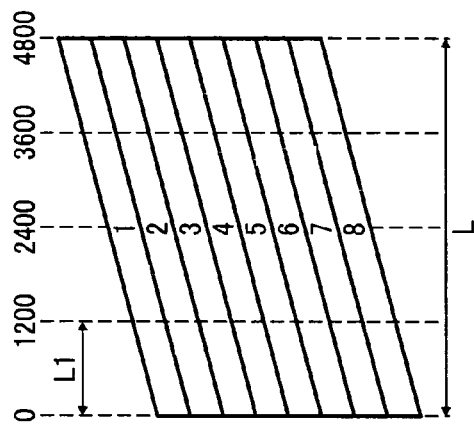
FIG. 9A
FIG. 9B
FIG. 9C
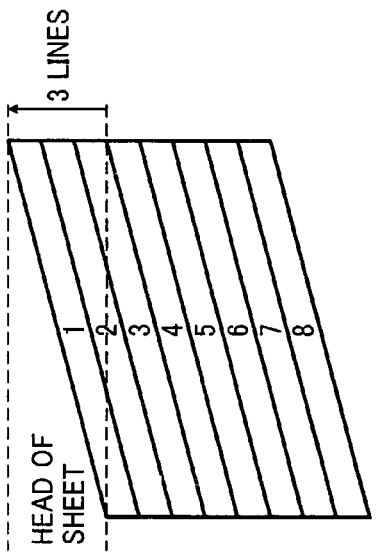
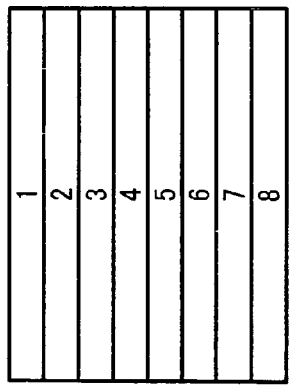
FIG. 9D
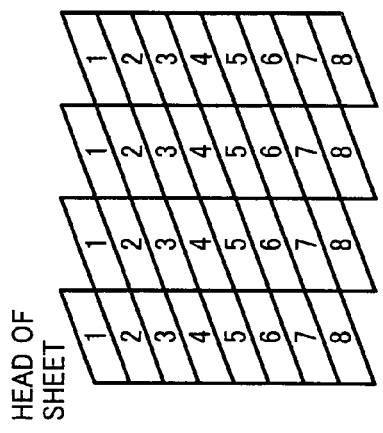
FIG. 9E
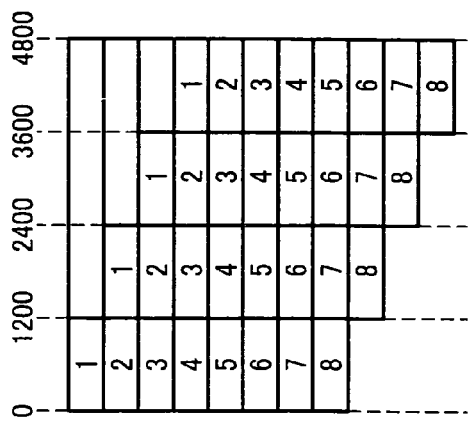
FIG. 9F FIG. 10A
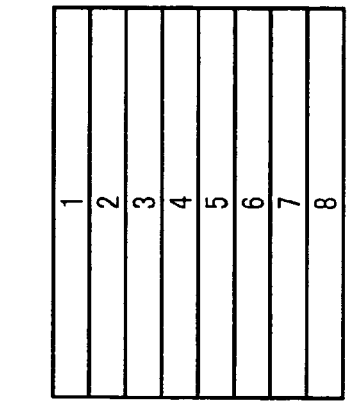
FIG. 10B
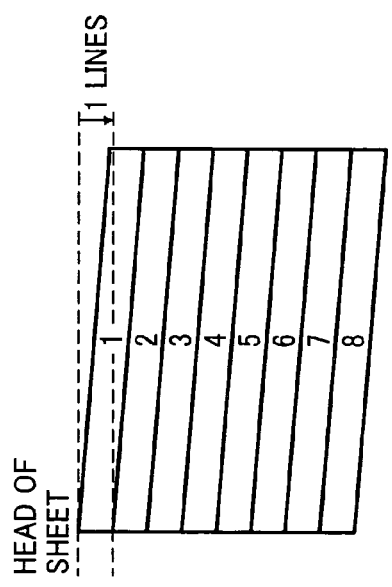
FIG. 10C
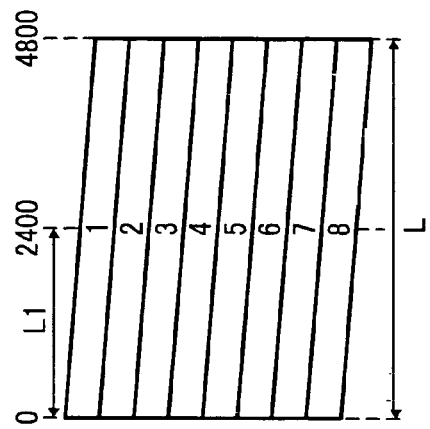
FIG. 10D
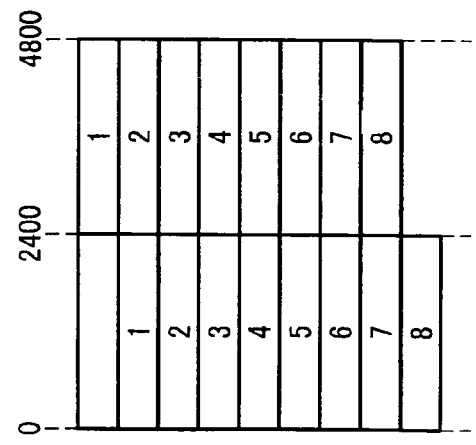
FIG. 10E
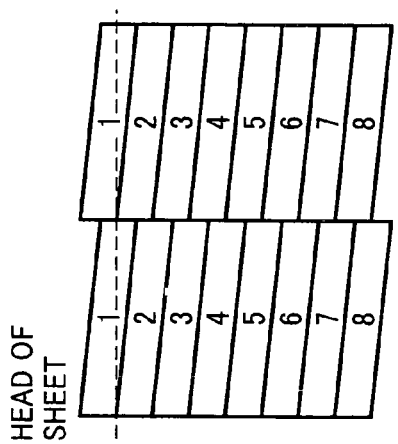
FIG. 10F
| SKEW CORRECTION DATA | 1 | 2 | 3 | 4 |
|---|---|---|---|---|
| POSITION OF DIVIDING | 2400 | | | |
| SHIFT DIRECTION | UP | | | |

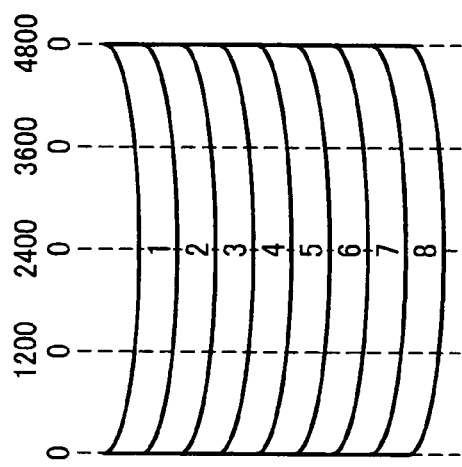
FIG. 12A  FIG. 12B  FIG. 12C
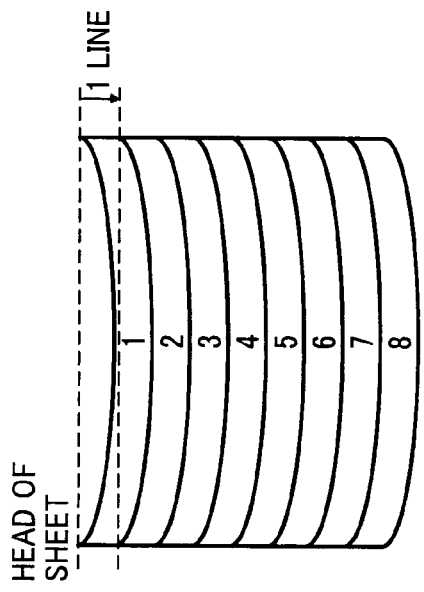
FIG. 12D
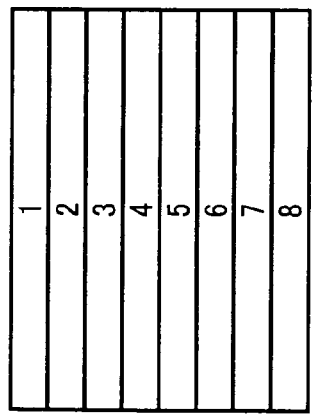
FIG. 12E
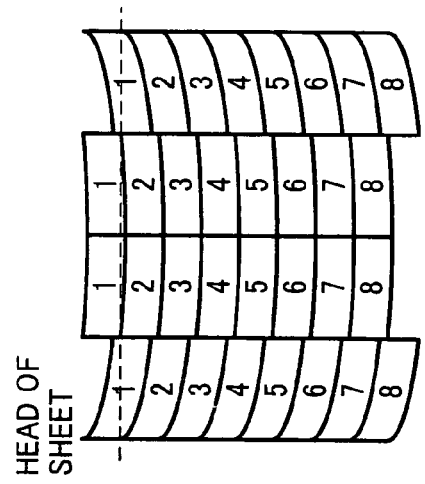
FIG. 12F
| SKEW CORRECTION DATA | | | | |
|---|---|---|---|---|
| POSITION OF DIVIDING | 1 | 2 | 3 | 4 |
| | 1200 | 2400 | 3600 | 4800 |
| SHIFT DIRECTION | UP | | DOWN | |
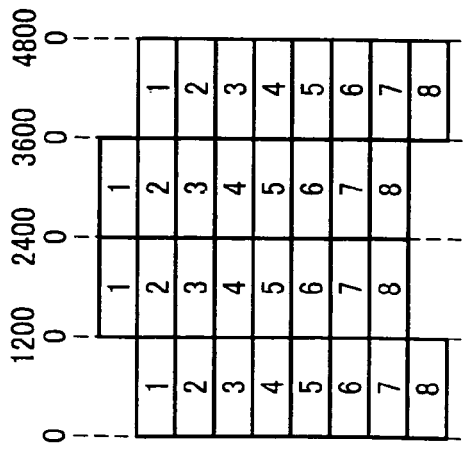

FIG. 14

| REFERENCE COLOR | K |
|---|---|
| AMOUNT OF SKEW FOR K [μm] | 0 |
| AMOUNT OF SKEW FOR M [μm] | -110 |
| AMOUNT OF SKEW FOR C [μm] | -130 |
| AMOUNT OF SKEW FOR Y [μm] | 30 |

FIG. 15

| REFERENCE COLOR | K |
|---|---|
| AMOUNT OF SKEW FOR K [LINE] | 0 |
| AMOUNT OF SKEW FOR M [LINE] | +3 |
| AMOUNT OF SKEW FOR C [LINE] | +3 |
| AMOUNT OF SKEW FOR Y [LINE] | -1 |

FIG. 16A EXAMPLE OF DITHER MATRIX OF 10×10

FIG. 16B ORIGINAL IMAGE 1

FIG. 16C PROCESSED IMAGE 1

FIG. 16D ORIGINAL IMAGE 2

FIG. 16E PROCESSED IMAGE 2

MAIN SCANNING SIZE L2 OF DITHER MATRIX

MAIN SCANNING SIZE L2 OF DITHER MATRIX

A: BLACK
A': BLACK

SHIFT POSITION

SHIFT DIRECTION

A: BLACK
A': WHITE

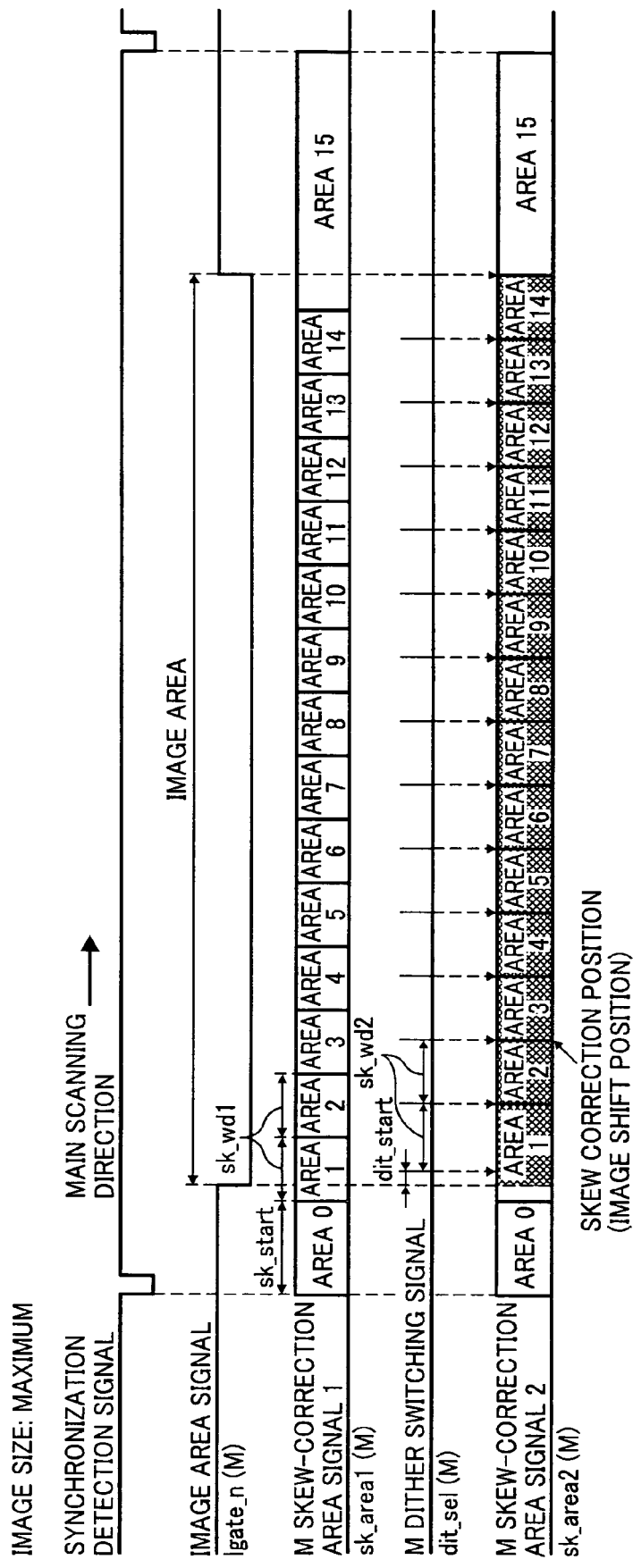

IMAGE CORRECTING DEVICE, IMAGE FORMING APPARATUS, AND IMAGE CORRECTING METHOD

CROSS-REFERENCE TO RELATED APPLICATIONS

The present application claims priority to and incorporates by reference the entire contents of Japanese priority document 2006-355891 filed in Japan on Dec. 28, 2006, 2007-160464 filed in Japan on Jun. 18, 2007 and 2007-318458 filed in Japan on Dec. 10, 2007.

BACKGROUND OF THE INVENTION

1. Field of the Invention

The present invention relates to a technology for correcting color misregistration of an image in an image forming apparatus.

2. Description of the Related Art

In color image forming apparatuses, registration for each color is adjusted to correct skew and curve of an image in an image processing. For correcting skew and curve of an image, the image is generally divided into areas in the main-scanning direction, and then shifted in the sub-scanning direction depending on its skew and curve. However, if an image to which a pseudo halftone process, such as a dither process, has been performed is shifted for correcting skew, dither patterns may be misaligned at a position of shifting of the image, causing a noisy image in which the position of shifting is visible on a printing medium.

It is necessary to correct misregistration for each color in an appropriate manner to form a desired image in the color image forming apparatuses. According to a conventional technology, in general color image forming apparatuses, predetermined toner patterns are formed for each color on a transfer belt, and the toner patterns are detected by an optically-based sensor. Then, values necessary for correcting skew are calculated, such as amounts of misregistration between each of colors, amounts of misregistration in the main- and the sub-scanning direction, amounts of difference in magnification for each color, and amounts of skew or curve. A feedback correction is performed so that each of the above elements becomes identical between each of colors. As a result, misregistration for each color can be reduced. Such a correction process is performed at various timings so that color misregistration can be constantly suppressed within a predetermined range. Examples of the timings include a time of boot of the image forming apparatus, a time when environmental condition, such as a temperature around the image forming apparatus, is changed, and a time when a predetermined number of sheets are printed.

The registration in the main- and the sub-scanning direction can be corrected by adjusting timings of write of image data in the main- and the sub-scanning direction. The magnification in the main scanning direction can be electrically corrected by adjusting a pixel clock. A skew of scanning beam can be corrected mechanically, or by reversely modifying an image to be output in an image processing.

For mechanically correcting the skew of scanning beam, it is necessary to set an adjustment mechanism that displaces a mirror in a write unit. For automatically performing such an adjustment of the mirror, it is necessary to set an actuator, such as a motor, resulting in increasing costs. Furthermore, it is difficult to downsize the write unit. Alternatively, for correcting the skew in the image processing, image data is stored line by line in a line memory, and stored image data is read out line by line, so that skew between each of colors can be corrected. In this case, it is only necessary to set a line memory in an image processing unit in accordance with a correction area. Thus, it is possible to realize correction of skew with lower costs compared to a method of changing mechanical configuration. Furthermore, such a correction can be performed automatically. Therefore, it is widely known that skew can be effectively reduced in the image processing. Moreover, it is known that this method performed in the image processing is also effective to reduce curve due to property of lens provided in the write unit.

Japanese Patent Application Laid-open No. 2001-353906 discloses a conventional technology for correcting skew. In the conventional technology, for correcting registration of an image in each different color, positions of dividing of images for each color are adjusted so that the positions do not come closer to each other. Accordingly, it is possible to prevent degradation of image quality unlike a corrected portion is visible on a printed sheet even after registration is corrected.

However, when skew is corrected in the image processing, a part of image data is stored in a plurality of line memories, stored data is read out line by line, an image is divided in the main scanning direction, and the image is then shifted in the sub-scanning direction, so that skew or curve between each of colors can be reduced. Therefore, dither patterns may be misaligned at a position where the image is shifted. If the dither patterns are misaligned, adjacency relation between pixels in the main-scanning direction is changed (e.g., white pixel is changed to black pixel), so that an area where toners are deposited in the main-scanning direction is also changed. In images to which a pseudo halftone process has been performed, this change occurs frequently and regularly in the sub-scanning direction. Thus, a noisy image is undesirably generated in which a corrected portion in the sub-scanning direction is visible as line on a recorded image (printed sheet).

As described above, if a skew correction (curve correction) is preformed in the image processing, if dither patterns are misaligned at an image shift position, an area where toners are deposited is changed when the image is printed. Such change of the area, where toners are deposited, occurs frequently in the sub scanning direction due to an image processing like a dither process, resulting in causing a noisy image and reducing image quality.

SUMMARY OF THE INVENTION

It is an object of the present invention to at least partially solve the problems in the conventional technology.

According to an aspect of the present invention, there is provided an image correcting apparatus that includes a first calculating unit that calculates a blank position of dither matrixes used for performing a dither process on an image, the blank position being a position in the dither matrixes at which an image pattern is not present, based on a main-scanning size and an interval between the image patterns in the dither matrixes, the main-scanning size is a size of each of the dither matrixes in a main-scanning direction, and determines the blank position as one of image-shift possible positions, the image-shift possible positions are candidate positions where the image can be divided when performing skew-correction on the image; a second calculating unit that calculates an image dividing position where the image is divided when performing skew-correction on the image based on amounts of misregistration between a reference color and each of other colors in the image; a determining unit that compares the image-shift possible positions with the image dividing position and determines one of the image-shift possible positions closest to the image dividing position to be an image shift position; and a correcting unit that performs skew-correction on the image by dividing the image at the image shift position.

According to another aspect of the present invention, there is provided an image forming apparatus that includes a first calculating unit that calculates a blank position of dither matrixes used for performing a dither process on an image, the blank position being a position in the dither matrixes at which an image pattern is not present, based on a main-scanning size and an interval between the image patterns in the dither matrixes, the main-scanning size is a size of each of the dither matrixes in a main-scanning direction, and determines the blank position as one of image-shift possible positions, the image-shift possible positions are candidate positions where the image can be divided when performing skew-correction on the image; a second calculating unit that calculates an image dividing position where the image is divided when performing skew-correction on the image based on amounts of misregistration between a reference color and each of other colors in the image; a determining unit that compares the image-shift possible positions with the image dividing position and determines one of the image-shift possible positions closest to the image dividing position to be an image shift position; a correcting unit that performs skew-correction on the image by dividing the image at the image shift position to obtain a skew-corrected image; and an image forming unit that performs an image formation process by using the skew-corrected image.

According to still another aspect of the present invention, there is provided an image correcting method including calculating a blank position of dither matrixes used for performing a dither process on an image, the blank position being a position in the dither matrixes at which an image pattern is not present, based on a main-scanning size and an interval between the image patterns in the dither matrixes, the main-scanning size is a size of each of the dither matrixes in a main-scanning direction, and determines the blank position as one of image-shift possible positions, the image-shift possible positions are candidate positions where the image can be divided when performing skew-correction on the image; calculating an image dividing position where the image is divided when performing skew-correction on the image based on amounts of misregistration between a reference color and each of other colors in the image; comparing the image-shift possible positions with the image dividing position and determining one of the image-shift possible positions closest to the image dividing position to be an image shift position; and performing skew-correction on the image by dividing the image at the image shift position.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 9A to 9F are schematic diagrams for explaining an example of calculation of amount of skew correction;

FIGS. 10A to 10F are schematic diagrams for explaining another example of calculation of amount of skew correction;

FIGS. 12A to 12F are schematic diagrams for explaining an example of calculation of amount of skew correction;

FIG. 14 is a table of an example of skew amount between reference color K and other colors at 600 dots per inch in the sub-scanning direction;

FIG. 15 is a table of another example of skew amount between reference color K and other colors at 600 dots per inch in the sub-scanning direction;

FIGS. 16A to 16E are schematic diagrams for explaining a dither process;

DETAILED DESCRIPTION OF THE PREFERRED EMBODIMENTS

Exemplary embodiments of the present invention are explained in detail below with reference to the accompanying drawings.

Figure 1:
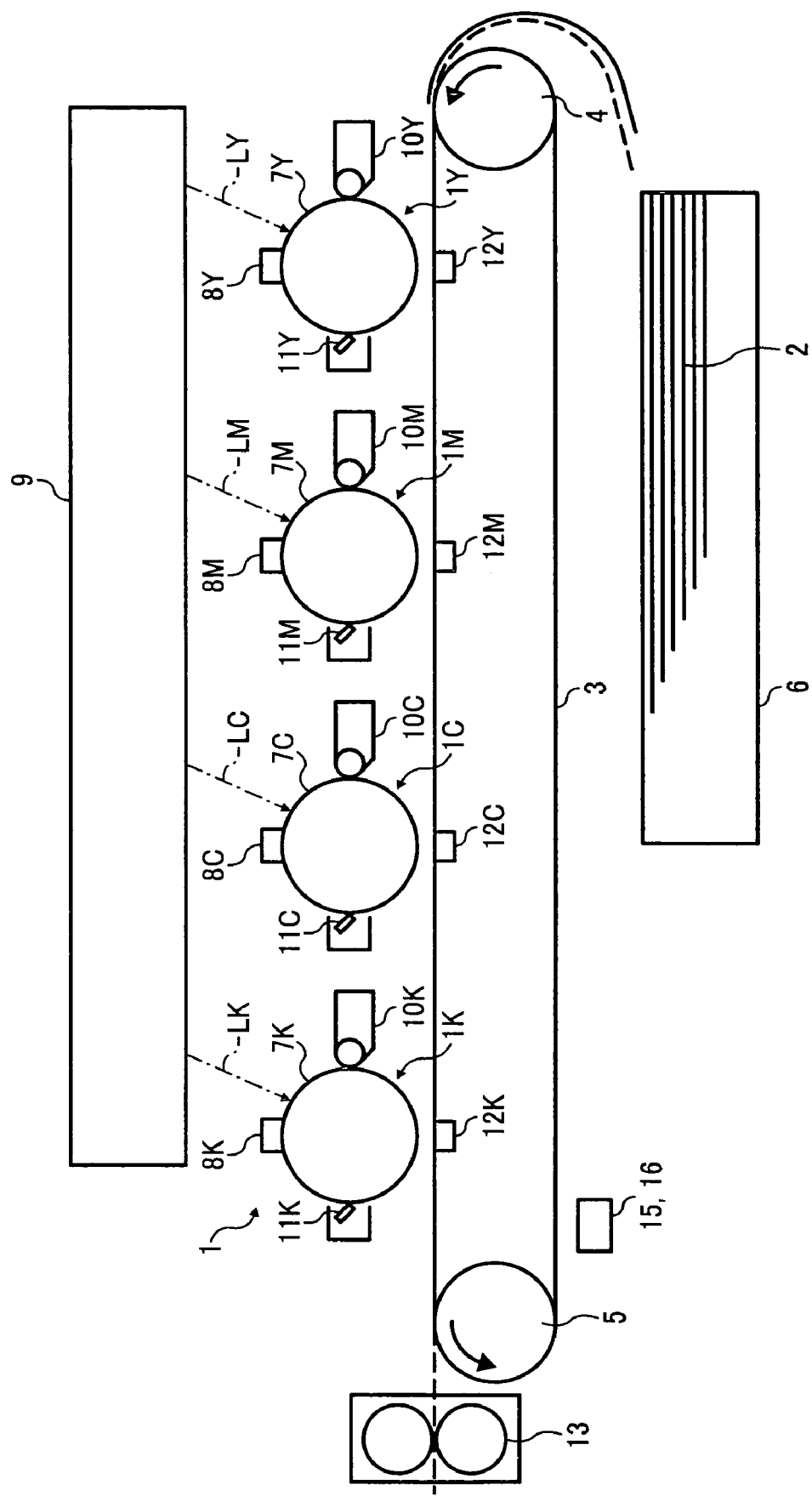
FIG. 1 is a schematic diagram of an image forming apparatus according to an embodiment of the present invention.

FIG. 1 is a schematic diagram of an image forming apparatus according to an embodiment of the present invention. The image forming apparatus shown in FIG. 1 is an example of direct-transfer tandem type image forming apparatuses. The image forming apparatus includes an image processing unit 1, an optical writing unit (exposure unit) 9, and a sheet feed unit (sheet feed tray) 6. The image processing unit 1 includes imaging stations for forming images of four different colors: yellow, magenta, cyan, and black (Y, M, C and K). The imaging stations are aligned along a transfer belt 3 that transfers a transfer sheet 2 as a transfer medium.

The transfer belt 3 is extended between a drive roller 4 that rotates as a driving member and a driven roller 5 that is driven to rotate, and rotated in a direction represented by an arrow shown in FIG. 1 by a rotation of the drive roller 4. The sheet feed tray 6 in which a bulk of transfer sheets 2 are placed is arranged below the transfer belt 3, and serves as a sheet feed unit. The transfer sheet 2 on the top of the bulk of the transfer sheets 2 is fed toward the transfer belt 3 upon forming an image.

The transfer sheet 2 fed to a transfer unit is then transferred to a first imaging station 1Y where a monochrome image of yellow is formed. The first imaging station 1Y includes a photosensitive drum 7Y, a charging unit 8Y, a developing unit 10Y, and a photosensitive cleaner 11Y. The charging unit 8Y, the developing unit 10Y, and the photosensitive cleaner 11Y are arranged around the photosensitive drum 7Y. An exposing member that applies laser beam LY from the exposure unit 9 is arranged between the charging unit 8Y and the developing unit 10Y.

The surface of the photosensitive drum 7Y is uniformly charged by the charging unit 8Y, and exposed by the exposure unit 9 by using the laser beam LY corresponding to an image in yellow, so that an electrostatic latent image is formed on the photosensitive drum 7Y. The electrostatic latent image is then developed by the developing unit 10Y, and a toner image is formed on the photosensitive drum 7Y. The toner image is transferred onto the transfer sheet 2 by a transfer unit 12Y at a position (transfer position) where the photosensitive drum 7Y comes contact with the transfer sheet 2 on the transfer belt 3. Thus, a monochrome (yellow) image is formed on the transfer sheet 2. After the toner image is transferred onto the transfer sheet 2, the photosensitive cleaner 11Y removes wastes such as residual toners remained on the surface of the photosensitive drum 7Y, thus making the photosensitive drum 7Y be ready for next image formation.

The transfer sheet 2 on which an image in yellow is transferred by the first imaging station 1Y is then transferred to a second imaging station 1M by the transfer belt 3. A toner image in magenta is formed on a photosensitive drum 7M in the same manner, and that toner image is superimposed onto the transfer sheet 2. The transfer sheet 2 is sequentially transferred to a third imaging station 1C and a fourth imaging station 1K, so that toner images in cyan and black are sequentially superimposed onto the transfer sheet 2. As a result, a full-color image is formed on the transfer sheet 2. The second to the fourth imaging stations 1M, 1C, 1K have the same configurations as that of the first imaging station 1Y; therefore, the same components are assigned with the same reference number and corresponding reference codes, and their detailed explanations are omitted.

After a toner image of each color is sequentially superimposed by the first to the fourth imaging stations to make a full-color image onto the transfer sheet 2, the transfer sheet 2 is transferred from the transfer belt 3 to a fuser 13. The full-color image is fixed to the transfer sheet 2 by the fuser 13 and then the transfer sheet 2 is discharged.

Figure 2:
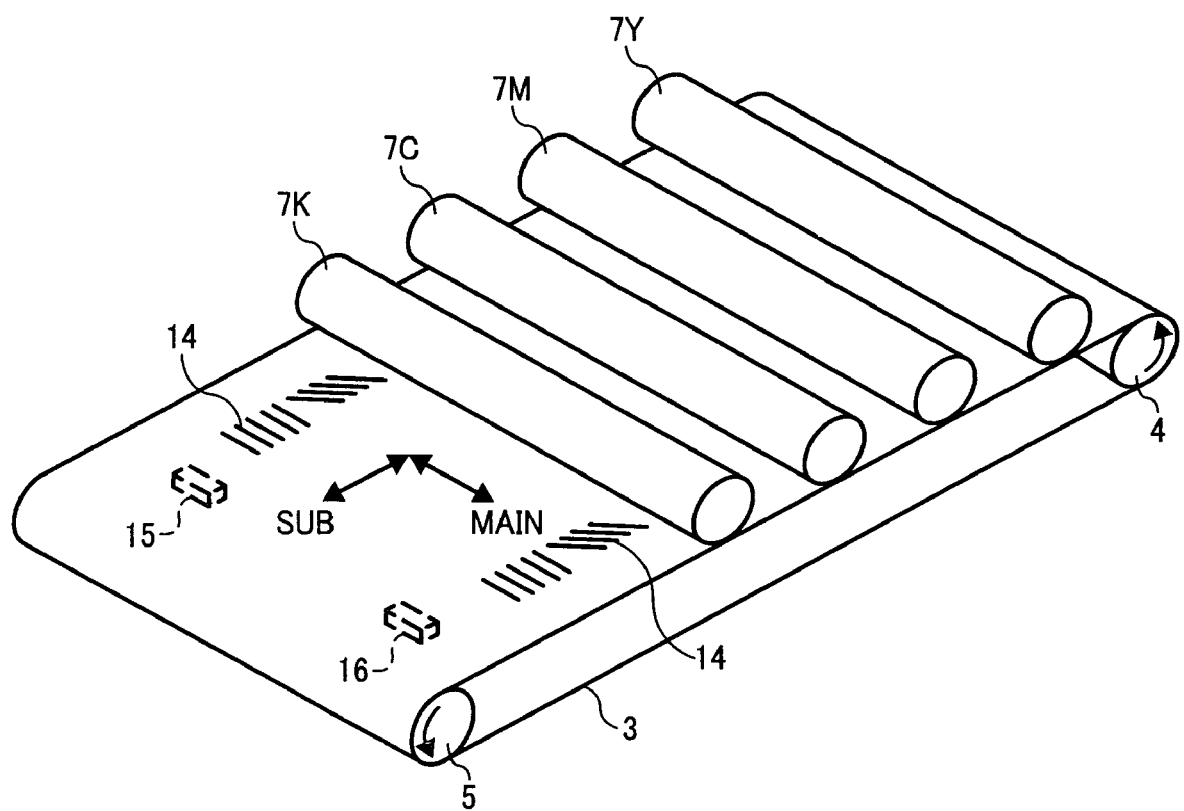
FIG. 2 is a perspective view of photosensitive drums and a transfer belt on which misregistration correction patterns are formed in the image forming apparatus shown in FIG. 1.

FIG. 2 is a perspective view of the photosensitive drums 7Y, 7M, 7C, 7K and the transfer belt 3 on which misregistration correction patterns 14 are formed. In the tandem-type color image forming apparatus as shown in FIG. 1, it is necessary to perform color registration in an appropriate manner to form a desired image. The color image forming apparatus according to the embodiment corrects misregistration of each color before forming a full-color image on the transfer sheet 2.

The correction patterns 14 for correcting misregistration of each color are formed on the transfer belt 3, and a plurality of pattern detection sensors 15, 16 detect the correction patterns 14. The detection sensor 15 is arranged at an end in the main-scanning direction of the transfer belt 3, and the detection sensor 16 is arranged at the other end in the main-scanning direction of the transfer belt 3. The correction patterns 14 are formed on the transfer belt 3 in accordance with positions of the detection sensors 15, 16. The detection sensors 15, 16 detect the correction patterns 14 when the transfer belt 3 moves and delivers the correction patterns 14 over the detection sensors 15, 16. When the correction patterns 14 are detected, the amount of misregistration or the amount of correction is calculated based on a result of detection, and each element of misregistration is corrected accordingly.

Figure 3:
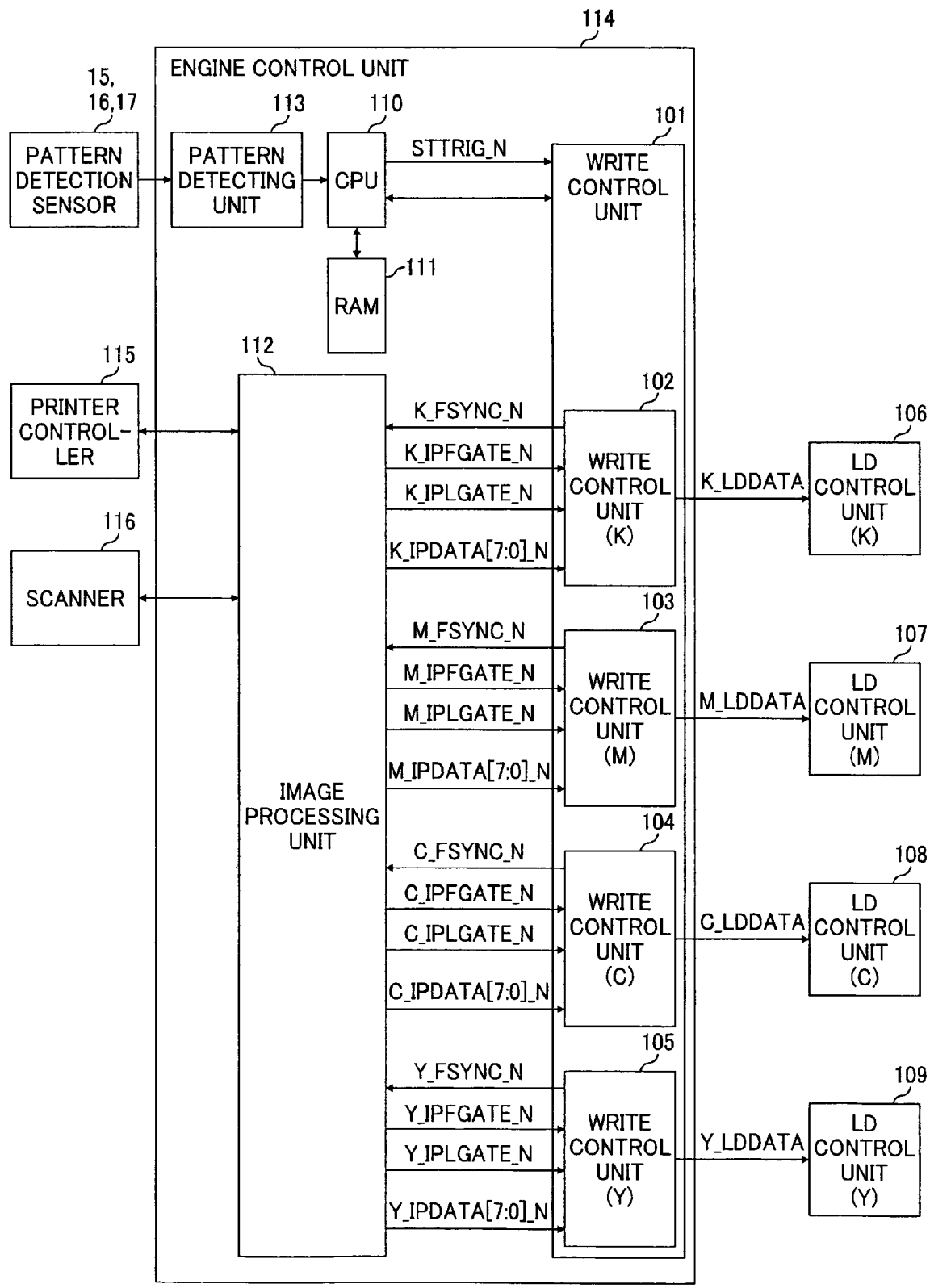
FIG. 3 is a block diagram of an engine control unit that performs write control and misregistration correction according to the embodiment.
Figure 4:
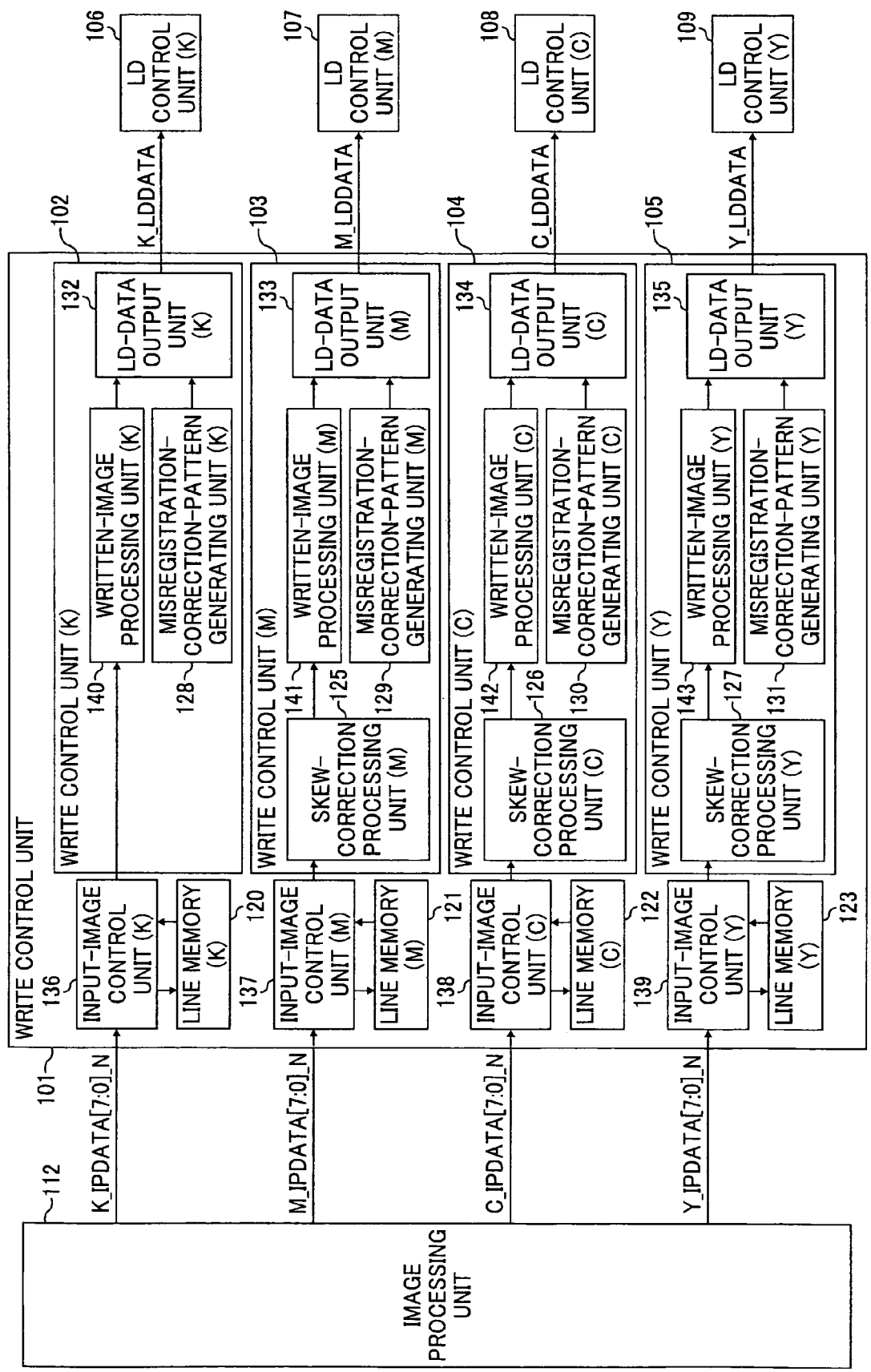
FIG. 4 is a block diagram of a write control unit shown in FIG. 3.

FIG. 3 is a block diagram of an engine control unit 114 that performs write control and misregistration correction; and FIG. 4 is a block diagram of a write control unit 101.

The engine control unit 114 includes a central processing unit (CPU) 110, a random access memory (RAM) 111, an image processing unit 12, a pattern detecting unit 113, and the write control unit 101. The pattern detecting unit 113 is connected to the pattern detection sensors 15, 16, and receives a detection signal. The pattern detecting unit 113 outputs a signal on detection to the CPU 110. The CPU 110 runs programs stored in a read only memory (ROM) (not shown) by using the RAM 111 as a work area to control the write control unit 101 and the engine control unit 114.

As shown in FIG. 4, the write control unit 101 includes write control units 102 to 105 for four colors K, M, C, Y. Each of the write control units 102 to 105 receives signals necessary for writing an image from the image processing unit 112. The image processing unit 112 transmits/receives signals to/from a printer controller 115 and a scanner 116. An image to be printed from a personal computer (PC) (not shown) is processed by the printer controller 115 while an image to be copied is processed by the scanner 116, and such images are transferred to the image processing unit 112.

The image processing unit 112 performs various image processings for various image data, converts the image data to new image data for each color, and transfers converted image data to the write control unit 101. Each of the write control units 102 to 105 generates a print timing, receives image data in accordance with a timing of sub scanning, performs write-image processings to a received image data, and converts processed image data to laser diode (LD) emitting data. Each of LD control units 106 to 109 for each of colors K, M, C, Y controls LD emission, so that an image is written onto each of the photosensitive drums 7K, 7M, 7C, 7Y.

As shown in FIG. 4, the write control unit 102 for K includes a written-image processing unit 140, a misregistration-correction-pattern generating unit 128, and an LD-data output unit 132. An input-image control unit 136 and a line memory 120 are arranged between the image processing unit 112 and the write control unit 102. The write control unit 103 for M includes a skew-correction processing unit 125, a written-image processing unit 141, a misregistration-correction-pattern generating unit 129, and an LD-data output unit 133. An input-image control unit 137 and a line memory 121 are arranged between the image processing unit 112 and the write control unit 103. The write control unit 104 for C includes a skew-correction processing unit 126, a written-image processing unit 142, a misregistration-correction-pattern generating unit 130, and an LD-data output unit 134. An input-image control unit 138 and a line memory 122 are arranged between the image processing unit 112 and the write control unit 104. The write control unit 105 for Y includes a skew-correction processing unit 127, a written-image processing unit 143, a misregistration-correction-pattern generating unit 131, and an LD-data output unit 135. An input-image control unit 139 and a line memory 123 are arranged between the image processing unit 112 and the write control unit 105.

Each of the skew-correction processing units 125 to 127 is arranged for each of M, C, Y, while a skew-correction processing unit is not arranged for K. This is because K is used as reference color and skew correction is not performed for K, while registrations of M, C, Y are adjusted based on registration of K.

If the write control unit 101 is configured as shown in FIG. 4, the input-image control unit 136 receives image data of K from the image processing unit 112, and performs toggle operation of the line memory 120 to send image data line by line to the written-image processing unit 140. The written-image processing unit 140 processes the image data, and sends processed image data to the LD-data output unit 132. The LD-data output unit 132 converts the image data to an LD-modulation signal, and outputs the LD-modulation signal to the LD control unit 106. Then, LD is output from the exposure unit 9 based on a driving signal from the LD control unit 106.

For M, C, Y, image data is input to the skew correction processing units 125 to 126 from the input-image processing units 137 to 139, respectively, and skew correction is performed for the image data. Then, the image data is transferred to the written-image processing units 141 to 143, and processed in the same manner as described above in connection with K.

For printing the misregistration correction patterns 14, the misregistration-correction-pattern generating units 128 to 131 generates the misregistration correction patterns 14 for K, M, C, Y, and then transfers them to the LD-data output units 132 to 135, respectively. The misregistration correction patterns 14 are then converted into LD data, output to each of the LD control units 106 to 109, and written to the transfer belt 3 by using LD from the exposure unit 9.

Figure 5:
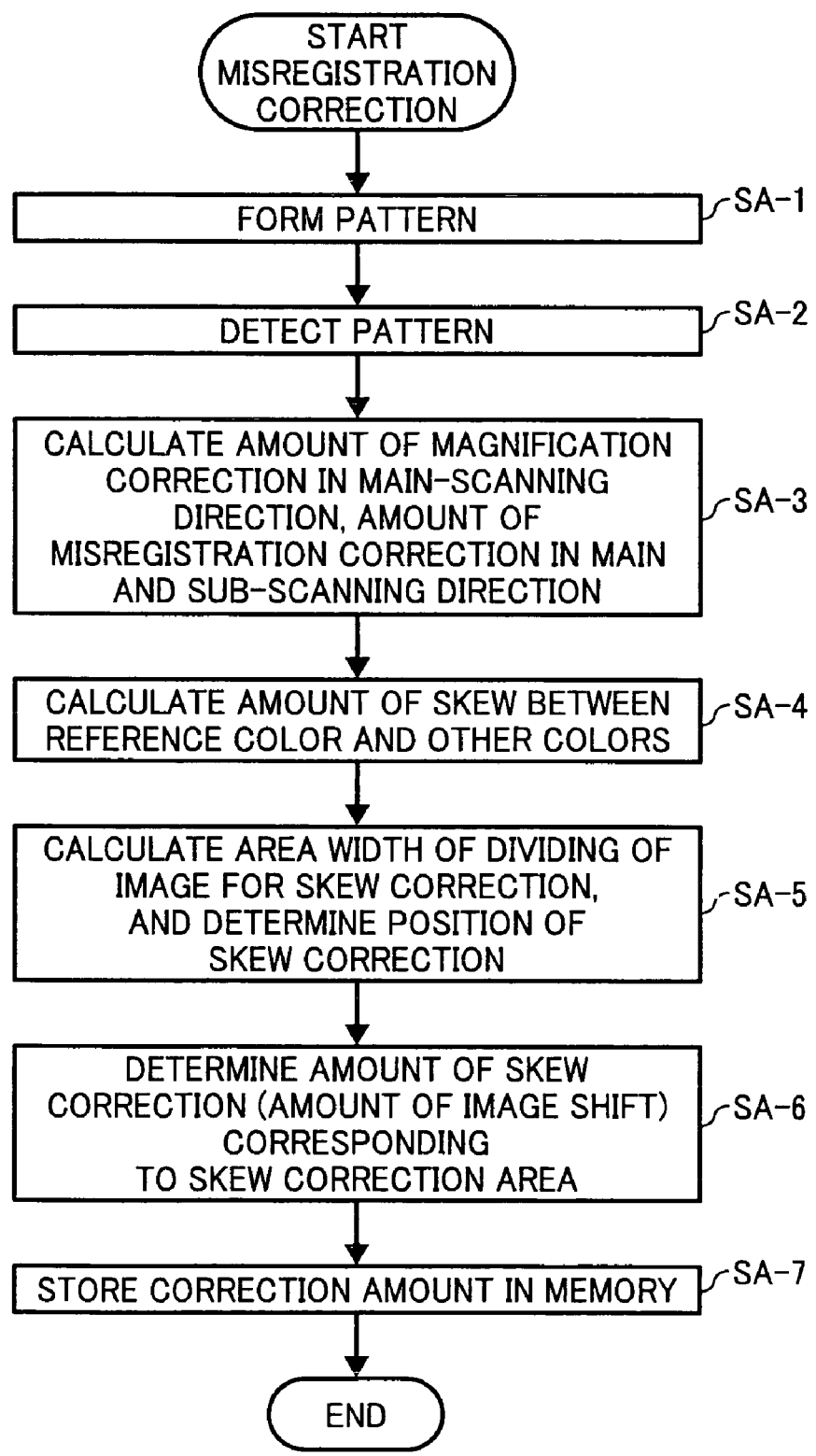
FIG. 5 is a flowchart of a process of correcting misregistration of each color in the image forming apparatus shown in FIG. 1.

FIG. 5 is a flowchart of a process of correcting misregistration for each color. Techniques of correcting misregistration are known as disclosed in Japanese Patent No. 3556349; therefore their basic explanations are omitted. A process of correcting misregistration in accordance with registration of reference color of K is specifically explained below. The reference color means base color of misregistration correction, i.e., registrations of other colors are adjusted based on registration of the reference color.

When a misregistration correction process is started, the misregistration correction patterns 14 generated by the misregistration-correction-pattern generating units 128 to 131 are formed on the transfer belt 3 (step SA-1).

The detection sensors 15, 16 detect the misregistration correction patterns 14 formed at step SA-1 (step SA-2). An amount of magnification correction in the main-scanning direction, the amount of misregistration in the main-scanning direction, and the amount of misregistration in the sub-scanning direction are calculated for each color in accordance with the reference color (K) (step SA-3). An amount of skew between the reference color and each color is calculated (step SA-4). An area width (first area width) of dividing of an image in the main-scanning direction is calculated in accordance with a maximum image size for performing skew correction, and a position of skew correction (skew correction area) is determined (step SA-5). Then, the amount of skew correction (amount of image shift) corresponding to a determined skew correction area is calculated (step SA-6).

Data on the magnification in the main-scanning direction, the amount of correction in the main-scanning direction, the amount of correction in the sub-scanning direction, the amount of skew correction corresponding to the first area width and the skew correction area, which are obtained at steps SA-3 and SA-6, are stored in the RAM 111 or a non-volatile memory (not shown) (step SA-7), and then process control ends. Each of the amounts of correction stored in a memory is used for printing until next misregistration correction processing is performed.

Figure 6:
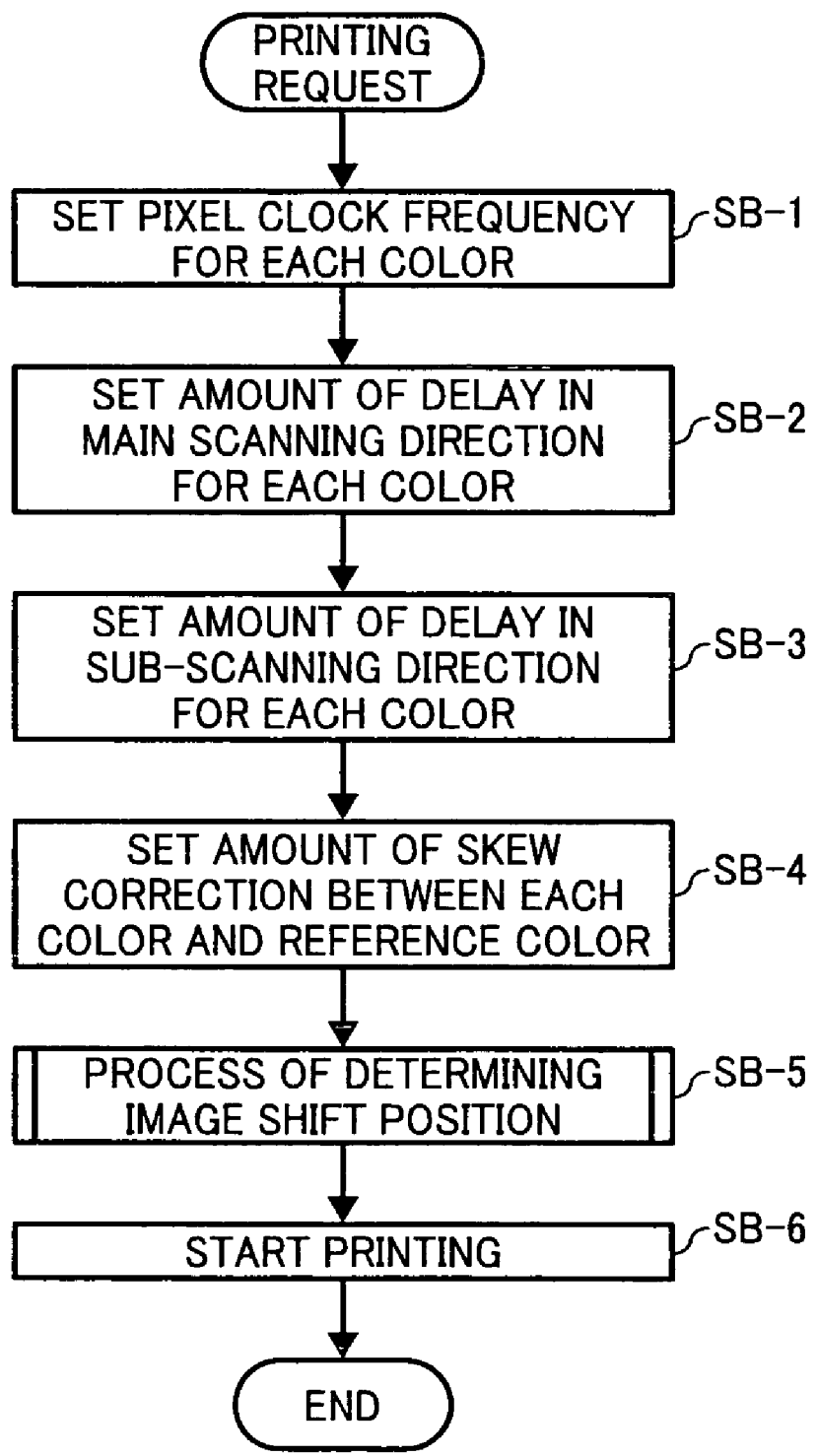
FIG. 6 is a flowchart of a printing process according to the embodiment.

FIG. 6 is a flowchart of a printing process according to the embodiment. Upon reception of a printing request, various settings and calculations are performed in the misregistration correction process as shown in FIG. 5, and then a printing process is started. For correcting color misregistration in the main-scanning direction, magnification in the main-scanning direction and write timings in the main-scanning direction are corrected. The magnification in the main-scanning direction is corrected by the write control unit 101 by changing image frequency based on the amount of difference between detected magnifications of each color. The write control unit 101 includes a device capable of minutely setting frequencies, for example, a clock generator using a voltage controlled oscillator (VCO). The write timings in the main-scanning direction are adjusted by adjusting a timing of output of data by LD by using a main-scanning counter that works based on a synchronous detection signal for each color as a trigger. The misregistration in the sub-scanning direction is corrected by adjusting write timings in the sub-scanning direction.

Specifically, upon reception of a printing request, pixel clock frequency for each color is set (step SB-1), the amount of delay in the main scanning for each color is set (step SB-2), the amount of delay in the sub scanning for each color is also set (step SB-3), and the amount of skew correction between the reference color and each color is set (step SB-4). A process of determining an image shift position for an image to be printed is performed (step SB-5), and a printing is started (step SB-6). The process of determining an image shift position performed at step SB-5 will be described in detail later.

The processes described in connection with FIGS. 5 and 6 are executed by the CPU 110.

Figure 7:
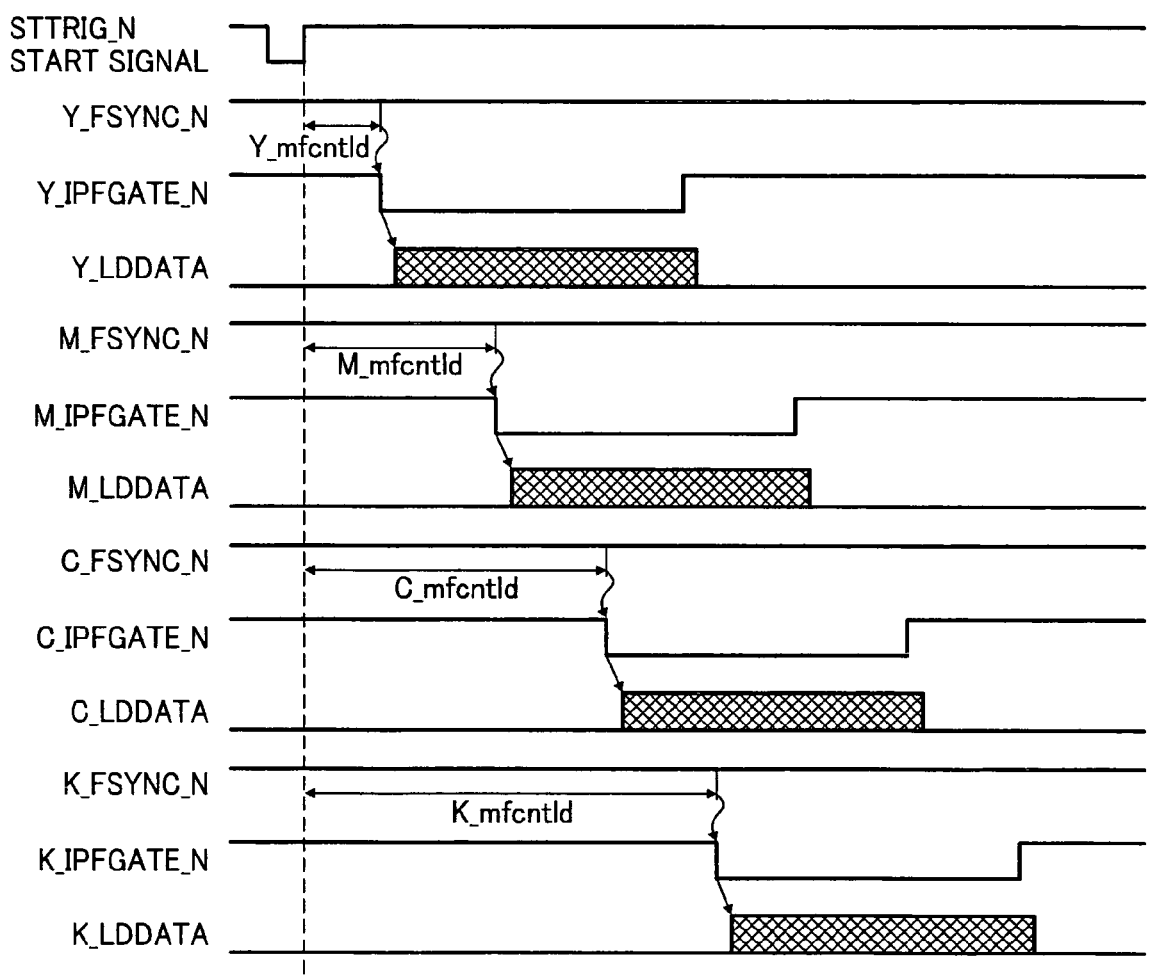
FIG. 7 is a timing chart of write timings in the sub-scanning direction for correcting misregistration in the sub-scanning direction.

FIG. 7 is a timing chart of write timings in the sub-scanning direction for correcting misregistration in the sub-scanning direction. The write control unit 101 counts the number of lines from a start signal (STTRIG_N) output from the CPU 110, and outputs a sub-scanning timing signal (*_FSYNC_N) to the image processing unit 112. The image processing unit 112 outputs a sub-scanning gate signal (*_IPFGATE_N) based on the sub-scanning timing signal (*_FSYNC_N) as a trigger, and transfers an image data (*_LDDATA). For correcting misregistration in the sub-scanning direction, the amount of delay in the sub-scanning (*_mfcntld) from the start signal is changed depending on a detected amount of misregistration. Generally, the amount of misregistration from the reference color K is used as the amount of delay in the sub scanning for each color (M, C, Y), and timings of *_FSYNC_N are changed to adjust registrations in the sub-scanning direction. In the above explanation, * is used as a substitution for Y, M, C, K.

Figure 8A:
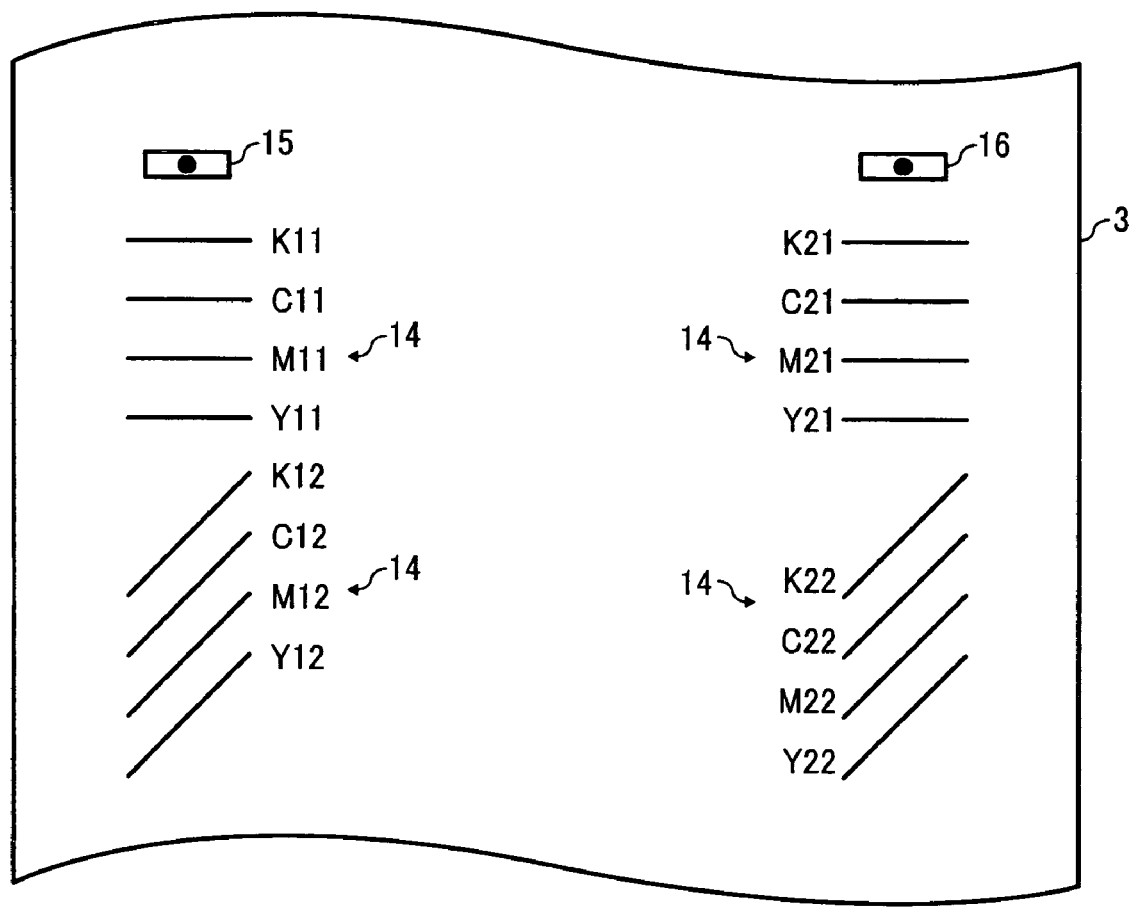
FIGS. 8A and 8B are schematic diagrams for explaining detection of a misregistration correction pattern by using two detection sensors.
Figure 8B:
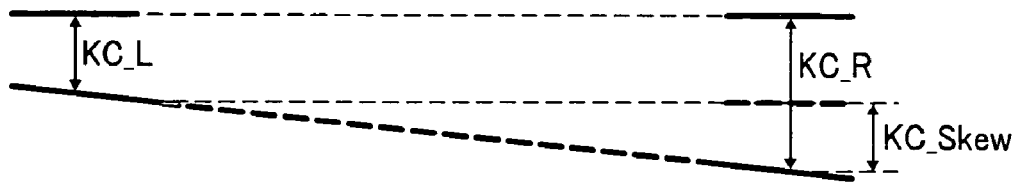

FIGS. 8A and 8B are schematic diagrams for explaining detection of the misregistration correction patterns 14 by the detection sensors 15, 16. The detection sensors 15, 16 detect the correction patterns 14 and output detected signals to the pattern detecting unit 113. The pattern detecting unit 113 converts the signals from analogue data to digital data, and the digital data is sampled. Such sampled data is then stored in the RAM 111. After detecting a series of the correction patterns 14, the CPU 110 executes various calculation processes for calculating various amounts of color misregistration (magnification in the main-scanning direction, amounts of misregistration in the main- and sub-scanning directions, amount of skew) for data stored in the RAM 111, and then calculates the amount of correction for each element of misregistration based on the amount of misregistration for each color.

For skew correction, the amount of skew for each of C, M, Y over K is calculated. For example, as shown in FIG. 8B, if the right side of an image of C skews, the amount of skew for C (KC_Skew) is calculated by Equation (1):

$$KC\_Skew = KC\_R - KC\_L \quad (1)$$

where KC_R represents an interval between K and C on the right side of the image shown in FIG. 8B, and KC_L represents an interval between K and C on the left side of the image shown in FIG. 8B.

FIGS. 9A to 9F and 10A to 10F are schematic diagrams for explaining a method of calculation of the amount of skew correction. As shown in FIG. 9B, if an input image shown in FIG. 9A is output as LD data without performing skew correction, the right portion of the image skews upward by three lines (i.e., the number of lines in the amount of skew is three) on the transfer sheet 2 due to skew of scanning beams compared to the image shown in FIG. 9A. If the image skews by three lines, the image is equally divided into four areas in the main-scanning direction as shown in FIG. 9C. The number of dividing the image is such incremented by one from the number of lines in the amount of skew. As shown in FIG. 9D, each of divided areas is shifted downward line by line in the sub-scanning direction. When such a shifted image is output, an image shown in FIG. 9E is acquired, in which the left end (zero pixel) and the right end (4800 pixels) of each line is aligned on the same line in the main-scanning direction.

An image shown in FIG. 10B skews downward by one line on the transfer sheet 2 compared to an image shown in FIG. 10A. In this case, the image is equally divided into two areas in the main-scanning direction as shown in FIG. 10C, and each area is shifted upward by one line in the sub-scanning direction as shown in FIG. 10D. Thus, an image shown in FIG. 10E is acquired, in which the left end (zero pixel) and the right end (4800 pixels) of each line is aligned on the same line in the main-scanning direction.

Figure 11A:
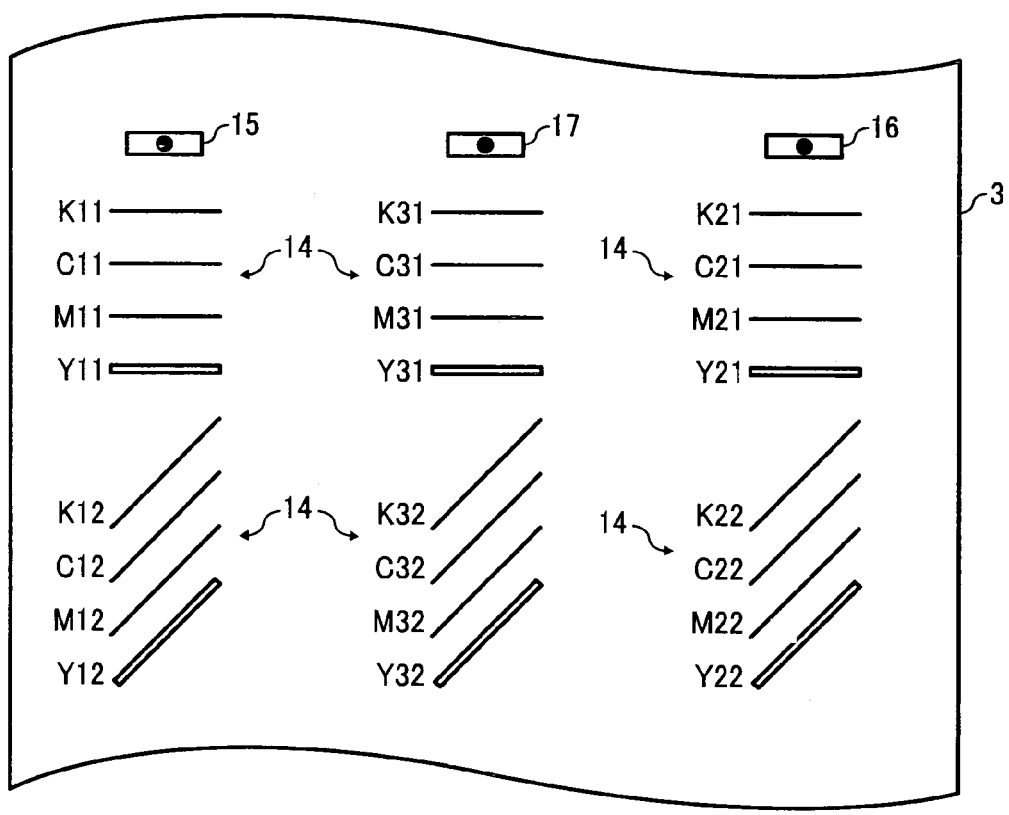
FIGS. 11A and 11B are schematic diagrams for explaining detection of misregistration correction patterns by using three detection sensors.
Figure 11B:
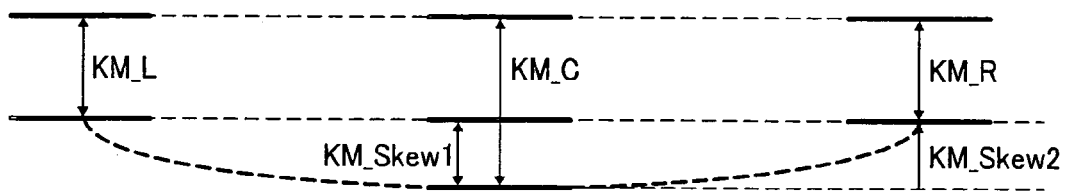

FIGS. 11A, 11B, and 12A to 12F are schematic diagrams for explaining correction of curved skew. FIGS. 11A and 11B are schematic diagrams of an example of detection of the misregistration correction patterns 14 by the detection sensors 15, 16 and a detection sensor 17. The pattern detecting unit 113 coverts detected signals from analogue data to digital data, and the digital data is sampled. Such sampled data is then stored in the RAM 111. After detecting a series of the correction patterns 14, the CPU 110 executes various calculation processes for calculating various amounts of color misregistration (magnification in the main-scanning direction, amounts of misregistration in the main- and sub-scanning directions, amount of skew) for data stored in the RAM 111. The CPU 110 then calculates the amount of correction for each element of misregistration based on the amount of misregistration for each color.

For correcting curved skew, it is necessary to detect the misregistration correction patterns 14 by three or more of the detection sensors, acquire the amount of skew for each area divided in the main-scanning direction, and perform skew correction for each area. For example, when each of the detection sensors 15 to 17 detects the misregistration correction patterns 14 as shown in FIG. 11A, the amount of skew for each color over K between the detection sensors 15 and 17, and the amount of skew for each color over K between the detection sensors 17 and 16 are acquired. As shown in FIG. 11B, if the center portion of an image in M skews downward, amounts of skew for M (KM_Skew1, KM_Skew2) are obtained by Equation (2) and Equation (3):

$$KM\_Skew1 = KM\_C - KM\_L \quad (2)$$

$$KM\_Skew2 = KM\_C - KM\_R \quad (3)$$

where KM_C represents an interval between patterns of K and M as shown in center portion of FIG. 11B, KM_L represents an interval between patterns of K and M as shown on the left side of FIG. 11B, and KM_R represents an interval between patterns of K and M as shown on the right side of FIG. 11B.

Specifically, if an image shown in FIG. 12A is output without performing skew correction, center portion of the image skews downward by one line on the transfer sheet 2 due to curve of scanning beams as shown in FIG. 12B. In this case, as shown in FIG. 12C, a first area between a left end (zero pixel) and a center portion (2400 pixels) is divided into two areas in the main-scanning direction, and a second area between the center portion and a right end (4800 pixels) is also divided into two areas in the main-scanning direction.

The number of dividing the image is determined as the number incremented by one from the number of lines in the amount of skew for each of the first and the second areas. As shown in FIG. 12D, a divided area between 1200 pixels and 2400 pixels is shifted upward by one line, and a divided area between 2400 pixels and 3600 pixels is shifted downward by one line. If such a shifted image is output, an image shown in FIG. 12E is acquired, in which the left end (zero pixel) and the right end (4800 pixels) of each line is aligned on the same line in the main-scanning direction.

In practice, input image data is sequentially stored in line memories for skew correction. Then, each of the skew-correction processing units 125 to 127 switches data read/write of each line memory for each divided area so that images shown in FIGS. 9D, 10D, and 12D are output. For this configuration, it is necessary to acquire addresses of divided positions in the main-scanning direction, and data on shift direction in the sub-scanning direction at each divided position.

As shown in FIG. 9C, when the number of pixels of the image in the main-scanning direction is 4800, and the image at 4800 pixels is shifted by three lines from the image at zero pixels, the image is divided into four areas in the main-scanning direction at 1200 pixels, 2400 pixels, and 3800 pixels, and then the image is sequentially shifted by one line from each adjacent area. As shown in FIG. 9D, for the first line, image data of a first line memory is output from zero pixel to 1199 pixels and white pixel is output from 1200 pixels to 4800 pixels. For the second line, image data of a second line memory is output from zero pixel to 1199 pixels, image data of a first line memory is output from 1200 pixels to 2399 pixels, and white pixel is output from 2400 pixels to 4800 pixels. Similarly, image data for the rest of the lines in the image is output in accordance with a shifted image. As a result, misregistration of the image can be corrected as shown in FIG. 9E, in which the left end of the image (zero pixel) and the right end of the image (4800 pixels) are on the same line.

In the example shown in FIGS. 10A to 10F, contrary to the images shown in FIGS. 9A to 9F, for the first line, white pixel is output from zero pixel to 2399 pixels and image data of a first line memory is output from 2400 pixels to 4800 pixels. For the second line, image data of a first line memory is output from zero pixel to 2399 pixels and image data of a second line memory is output from 2400 pixels to 4800 pixels. Similarly, image data for the rest of the lines in the image is output in accordance with a shifted image. Accordingly, misregistration of the image can be corrected as shown in FIG. 10E, in which the left end of the image (zero pixel) and the right end of the image (4800 pixels) are on the same line.

In the example shown in FIGS. 12A to 12F, when the number of pixels of the image in the main-scanning direction is 4800, the image is shifted downward by one line at a center portion, so that the image is shifted up by one line at 1200 pixels. As shown in FIG. 12D, for the first line, white pixel is output from zero pixel to 1199 pixels, image data of a first line memory is output from 1200 pixels to 3599 pixels, and white pixel is output from 3600 pixels to 4800 pixels. For the second line, image data of the first line memory is output from zero pixel to 1199 pixels, image data of a second line memory is output from 1200 pixels to 3599 pixels, and image data of the first line memory is output from 3600 pixels to 4800 pixels. As a result, misregistration of the image can be corrected as shown in FIG. 12E, in which the left end of the image (zero pixel) and the right end of the image (4800 pixels) are on the same line.

The positions where the image is divided in the main-scanning direction for the skew correction at step SA-5 are positions equally dividing the image size in the main-scanning direction by the number incremented by one from the number of lines of amount of skew.

Figure 13:
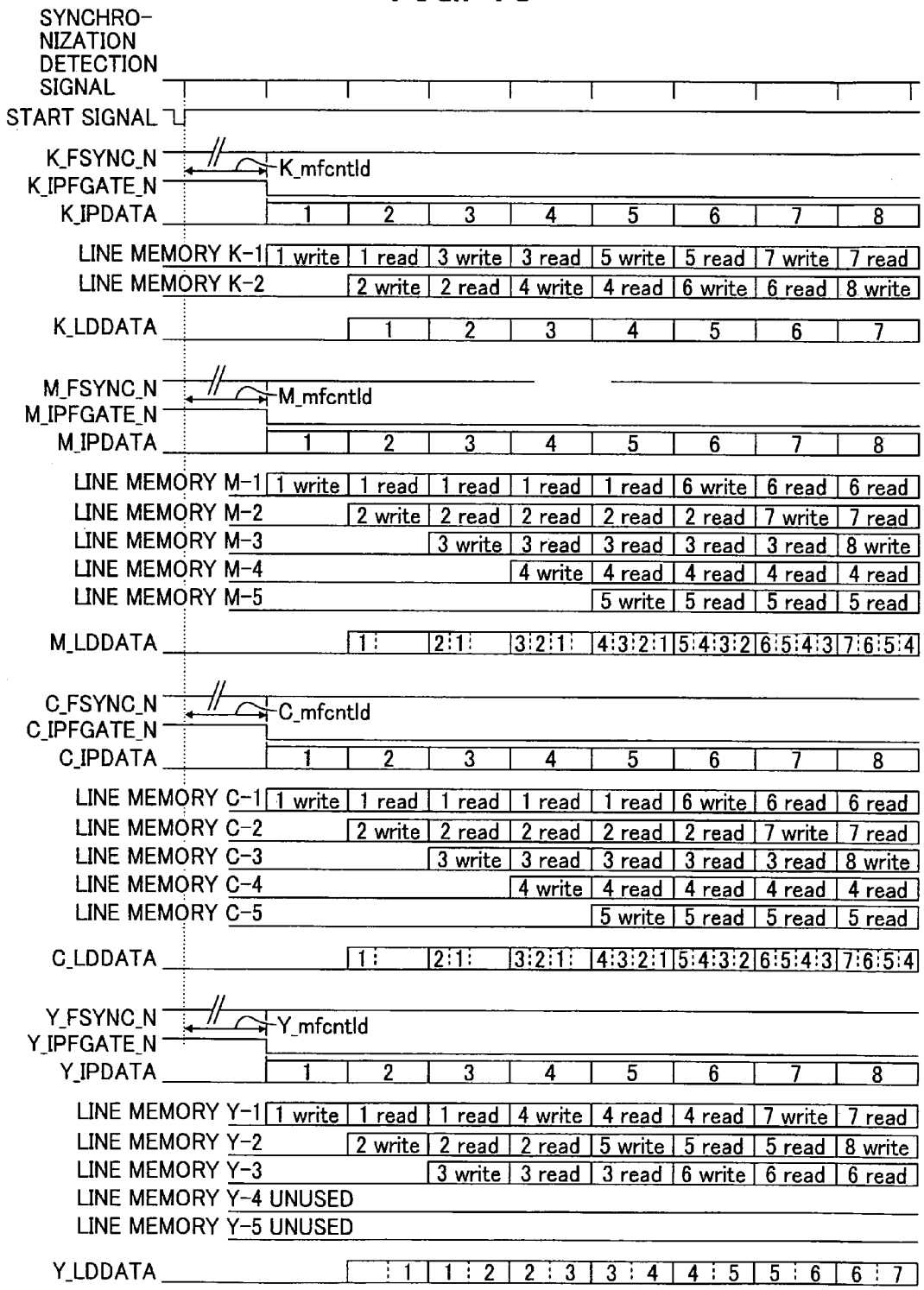
FIG. 13 is a timing chart of read/write timings of each line memory for skew correction.

FIG. 13 is a timing chart of read/write timings of each line memory for skew correction. An input image data (*_IPDATA) is sequentially stored in line memories, and each of the skew-correction processing units 125 to 127 switches data read/write of each line memory for each divided area, generates image data to be output, and outputs the image data as LD data (*_LDDATA) to the LD control unit 106. The timing charts for M and C represent operations described in connection with FIGS. 9A to 9F, and the timing chart for Y represents operation described in connection with FIGS. 10A to 10F. In the above explanation, * is described as substitution for Y, M, C, K.

FIG. 14 is a table of an example of the amount of skew between reference color K and other colors at 600 dots per inch in the sub-scanning direction. A relation between the amount of skew and the amount of skew correction is described below.

Assuming that the amount of skew between each color M, C, Y and the reference color K is as follows: −110 micrometers between M and K, −130 micrometers between C and K, and 30 micrometers between Y and K. As shown in FIG. 15, if the resolution in the sub-scanning direction is 600 dots per inch, the amount of skew is represented by lines as follows: 3 lines between M and K, 3 lines between C and K, and −1 line between Y and K. The above lines are calculated based on the fact that the image is shifted by 42.3 micrometers when shifted by one line, so that the amount of skew represented by micrometers is divided by 42.3, a quotient is rounded to the nearest whole number, and plus/minus is reversed.

The image-shift possible positions for the skew correction obtained at step SA-6 are previously determined based on the main-scanning size of the dither matrix used for a dither process. The image-shift possible positions are described in detail below.

Laser printers are only capable of showing a limited color range, so that a dither process is generally performed to display more colors than those available by the laser printers. Specifically, color laser printers are provided with dither matrixes corresponding to the number of bits of image data or resolution of image data with respect to each color for each of photographs and texts to form smooth shade transition. The size and patterns of the dither matrixes are generally different from one another. The dither process is for displaying a multiple tone image by using binary codes, in which dither matrixes having N×N pixels with each threshold are overlapped to an original image, so that each of the pixels in the original image is binarized. FIGS. 16A to 16E are schematic diagrams for explaining the dither process. In this example, each pixel in an original image shown in FIG. 16B is compared with each threshold on a corresponding position of a dither matrix shown in FIG. 16A. When a pixel of the original image is larger than a corresponding threshold of the dither matrix, the pixel is output as an image. On the contrary, when a pixel of the original image is smaller than a corresponding threshold of the dither matrix, the pixel is not output as an image. As a result, the image shown in FIG. 16B is output as an image shown in FIG. 16C. Similarly, when the dither process is performed to an original image shown in FIG. 16D by using the dither matrix shown in FIG. 16A, an image shown in FIG. 16E is output. Each pixel (dither matrix) is extremely small when viewed by people, so that images shown in FIGS. 16C and 16E are displayed as they have each different tone. As described above, the dither process is performed to display multiple tones by using binary codes. In addition, the dither process can be realized by using multiple codes for realizing multiple tones from three to sixteen tones, instead of using binary codes.

A relation between the image-shift possible positions for the skew correction and dither matrixes is described below.

Figure 17A:
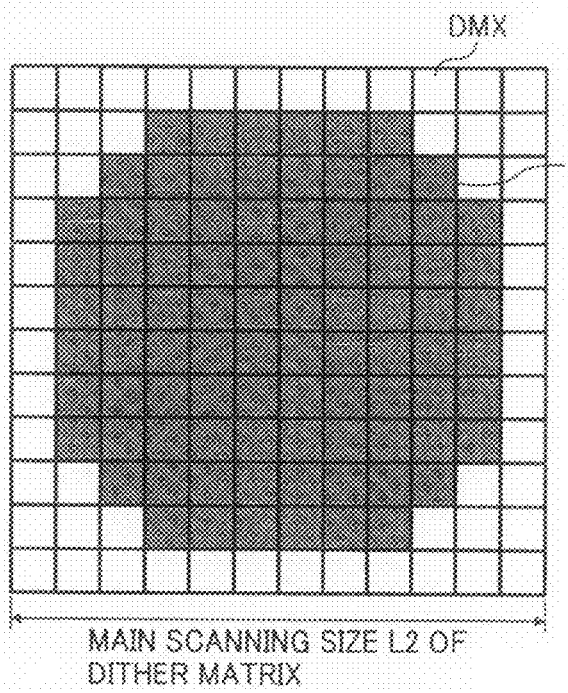
FIGS. 17A and 17B are schematic diagrams of a state of a dither pattern before/after shifting an image in a drawing area of a dither matrix.
Figure 17B:
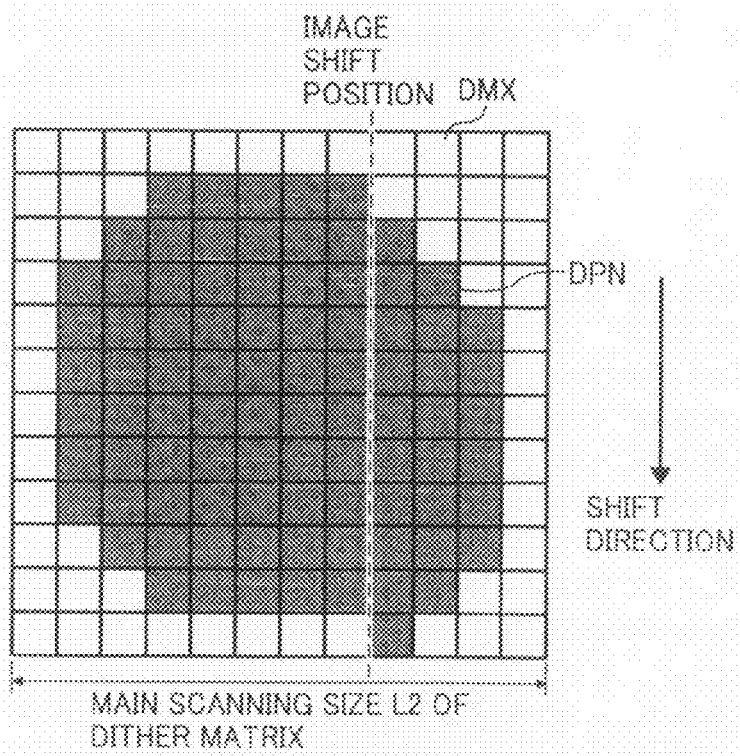

Image in the reference color of the skew correction is not shifted; thereby, the dither matrix for the reference color is not considered below. The skew correction is performed for each color, so that the image-shift possible positions are determined by using dither matrixes for each color. FIGS. 17A and 17B are schematic diagrams of a state of a dither pattern before/after shifting an image in a drawing area of a dither matrix. As shown in FIG. 17B, when image shift due to the skew correction described in connection with FIGS. 9A to 9F and 10A to 10F is performed in the drawing area of the dither matrix, a shape of a dither pattern DPN changes at an image shift position.

Figure 18A:
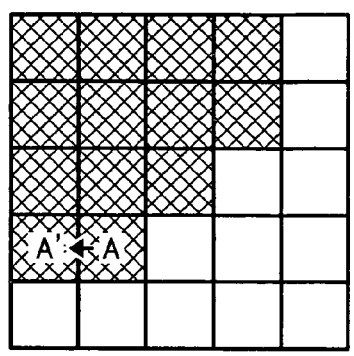
FIGS. 18A and 18B are partial enlarged views of portions of the dither patterns shown in FIGS. 17A and 17B.
Figure 18B:
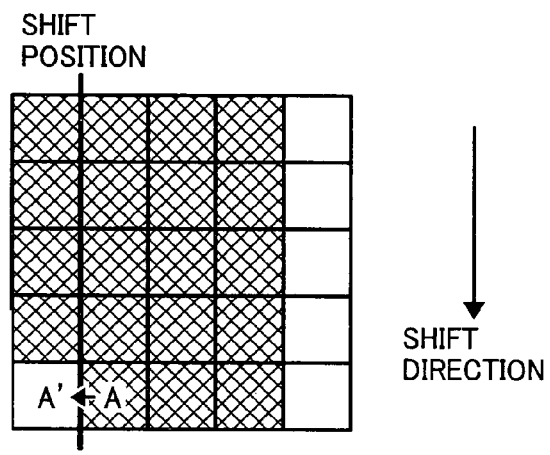

Specifically, adjacency relationship between pixels changes in the image shown in FIG. 17B compared to the image shown in FIG. 17A. FIGS. 18A and 18B are partial enlarged views of portions of the dither patterns shown in FIGS. 17A and 17B. A pixel A' adjacent to a pixel A in the dither pattern before shifting the image is black as shown in FIG. 18A. However, the pixel A' is changed to white after shifting the image as shown in FIG. 18B.

Figure 19A:
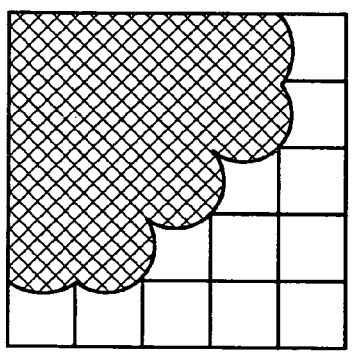
FIGS. 19A and 19B are schematic diagrams of actual images output based on the patterns shown in FIGS. 18A and 18B.
Figure 19B:
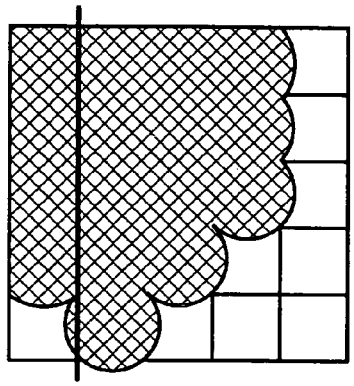

Electrophotographic images are generally processed by using laser beams having diameter larger than a pixel size, so that when such image data is output, toners are deposited in wider area than a pixel size on a recorded image (printed sheet). Specifically, when adjacency relationship between pixels is changed due to a shift processing as shown in FIG. 18B, an area where toners are deposited is also changed in an actually output image as shown in FIG. 19B compared to a desired image as shown in FIG. 19A. In other words, if a dither pattern is changed due to image shift, an area where toners are deposited is also changed in a recorded image (on a printed sheet).

Figure 20:
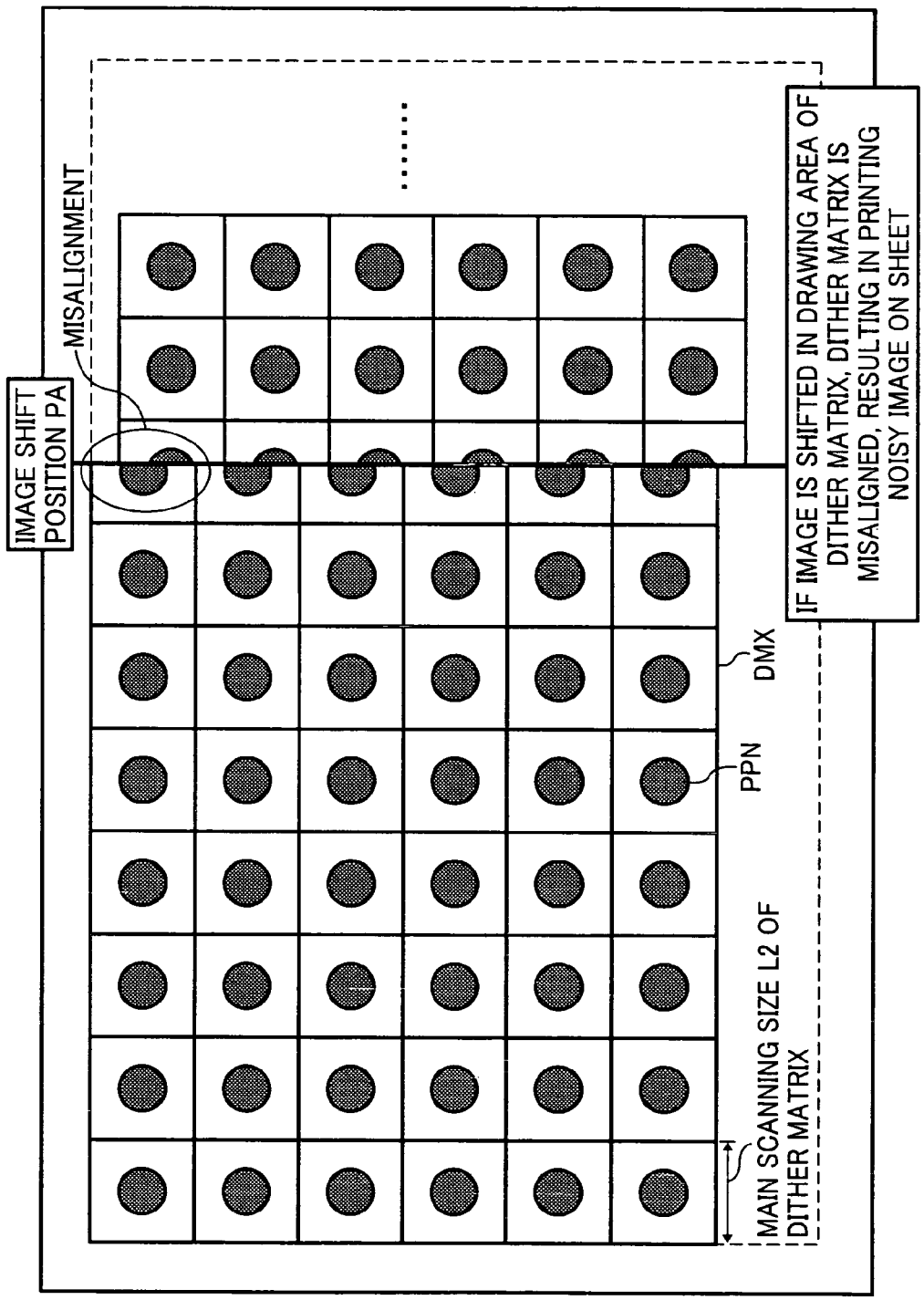
FIG. 20 is a schematic diagram of an assembly of the dither matrixes shown in FIGS. 17A and 17B.
Figure 21:
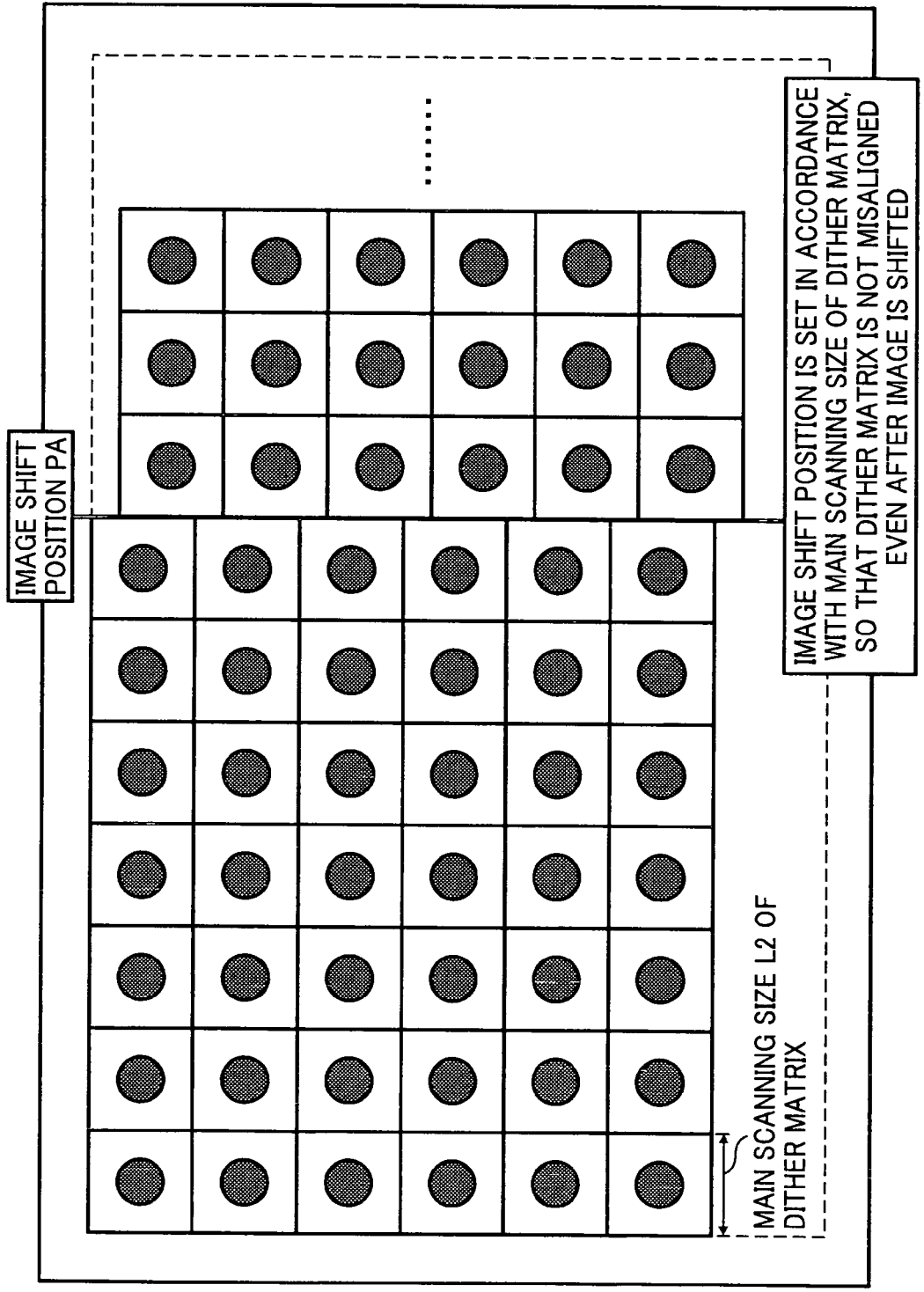
FIG. 21 is a schematic diagram of a state where an image-shift possible position shown in FIG. 20 is set at a position corresponding to a multiple of a main-scanning size of the dither matrix.

If such image shift is applied to the entire image formed by collections of dither matrixes, the image becomes such as shown in FIG. 20. Specifically, when image shift due to skew correction is performed in a drawing area of dither matrixes, dither patterns at an image shift position of the skew correction are misaligned. Therefore, areas where toners are deposited are changed at the image shift position on the transfer sheet 2, and such image change is cyclically repeated in the sub-scanning direction because dither patterns are cyclically arranged. Thus, a noisy image is generated, resulting in degrading image quality. For counteracting the above situation, as shown in FIG. 21, image shift position is set at a position corresponding to multiples of main-scanning size of dither matrixes. Accordingly, the image shift position is not set over dither patterns of dither matrixes, so that it is possible to perform image shift without causing misalignment of dither patterns.

Figure 22:
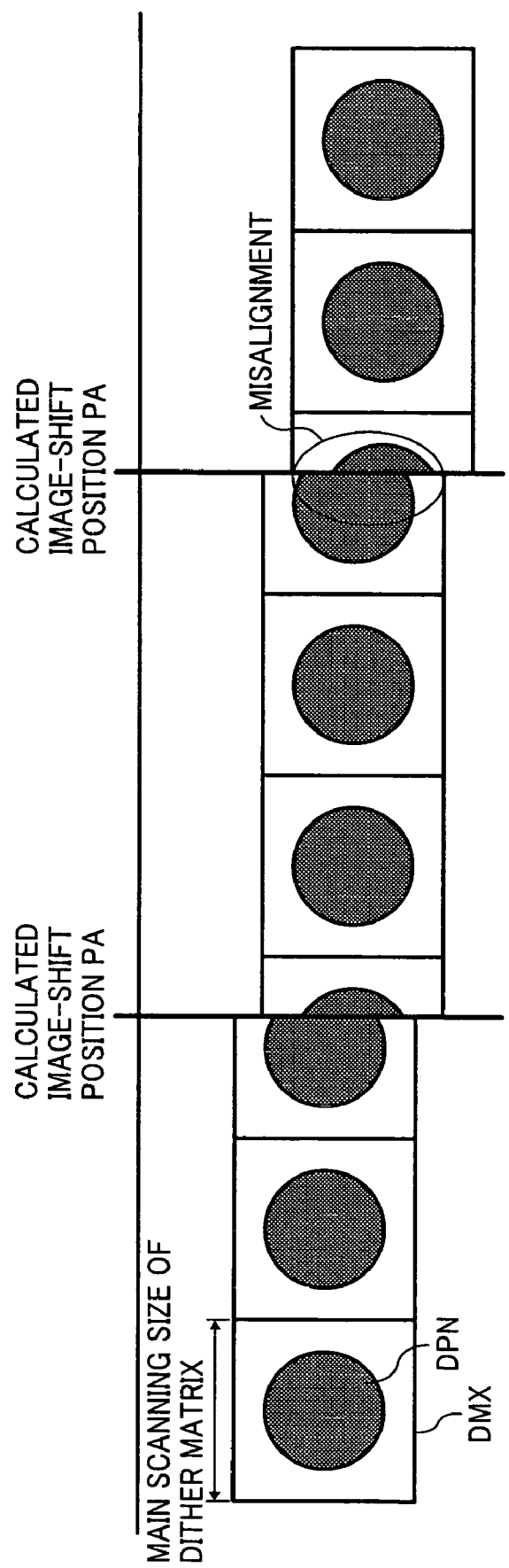
FIG. 22 is a schematic diagram of examples of a calculated image-shift position for skew correction.
Figure 23:
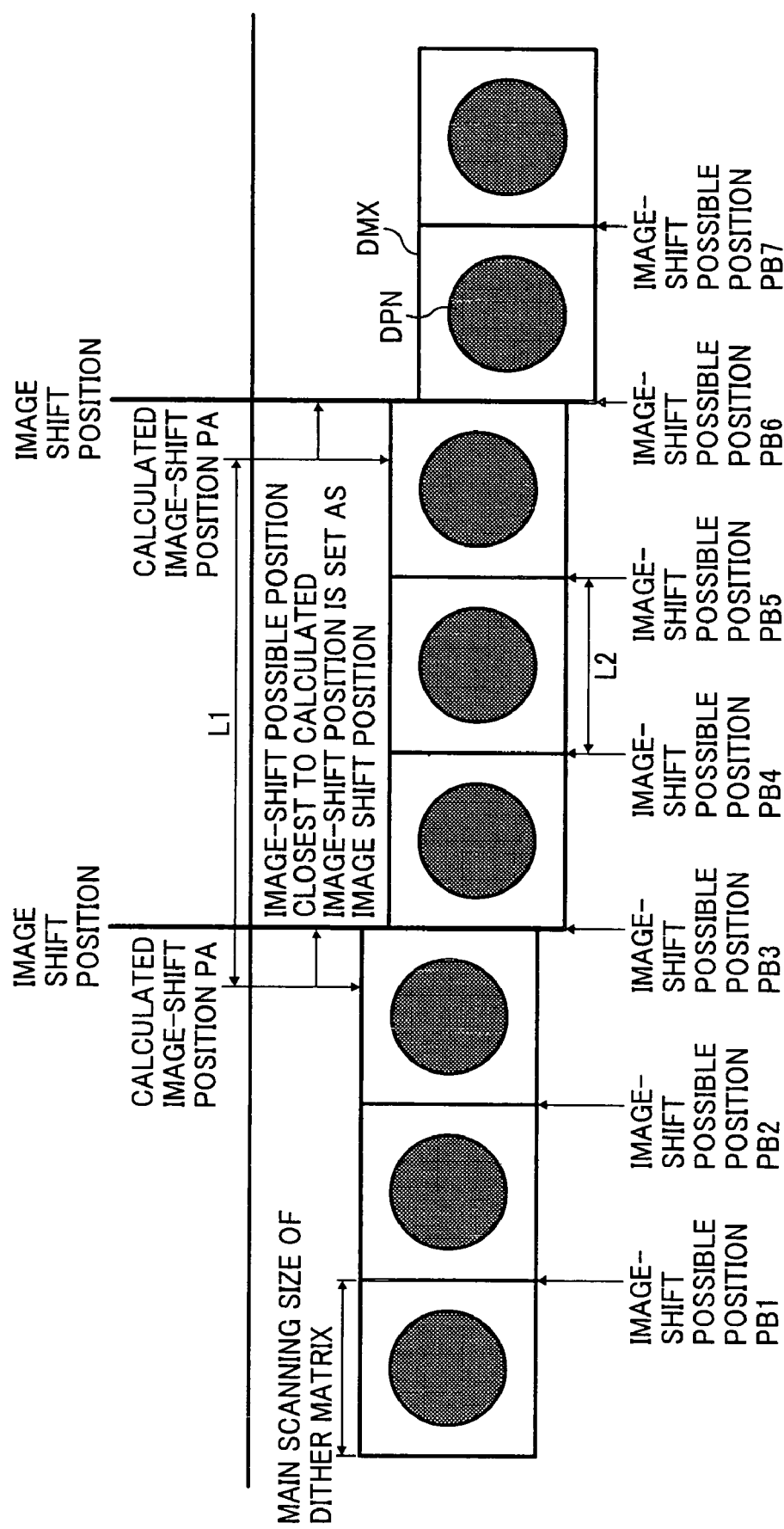
FIG. 23 is a schematic diagram of relation between image-shift possible positions and image shift positions.

As described above in connection with FIG. 21, the image shift position is not set over dither patterns of dither matrixes, so that it is possible to perform image shift without causing misalignment of dither patterns. The image shift position is set in the above manner at step SA-6. In the conventional techniques, as shown in FIG. 22, an image is shifted at the image dividing position (image shift position) PA calculated at step SA-5. However, if the image is shifted at the image dividing position PA, the dither patterns may be misaligned (area where toners are deposited is changed when the image is output). However, according to the embodiment, as shown in FIG. 23, one of the image shift possible positions PB1 to PB7 closest to the image dividing position PA is set as an image-dividing possible position (image-shift possible position) PB3, and an image is shifted at the image-dividing possible position PB3. Because main-scanning size L2 of the dither matrix DMX is uniform, if the image is shifted at the image-shift possible position PB3 instead of the calculated image shift position PA, a next image shift position is set at the image-shift possible position PB6. Thus, each of the image-shift possible positions PB1 to PB7 is set at a position corresponding to multiples of the main-scanning size L2 of the dither matrix DMX. Therefore, it is possible to shift an image without causing misalignment of the dither pattern DPN in the dither matrix DMX.

The main-scanning size L2 of the dither matrix DMX is extremely small compared to an image shift interval L1. Therefore, the image shift position PA can be regarded approximately the same as the image-shift possible position PB.

Figure 24:
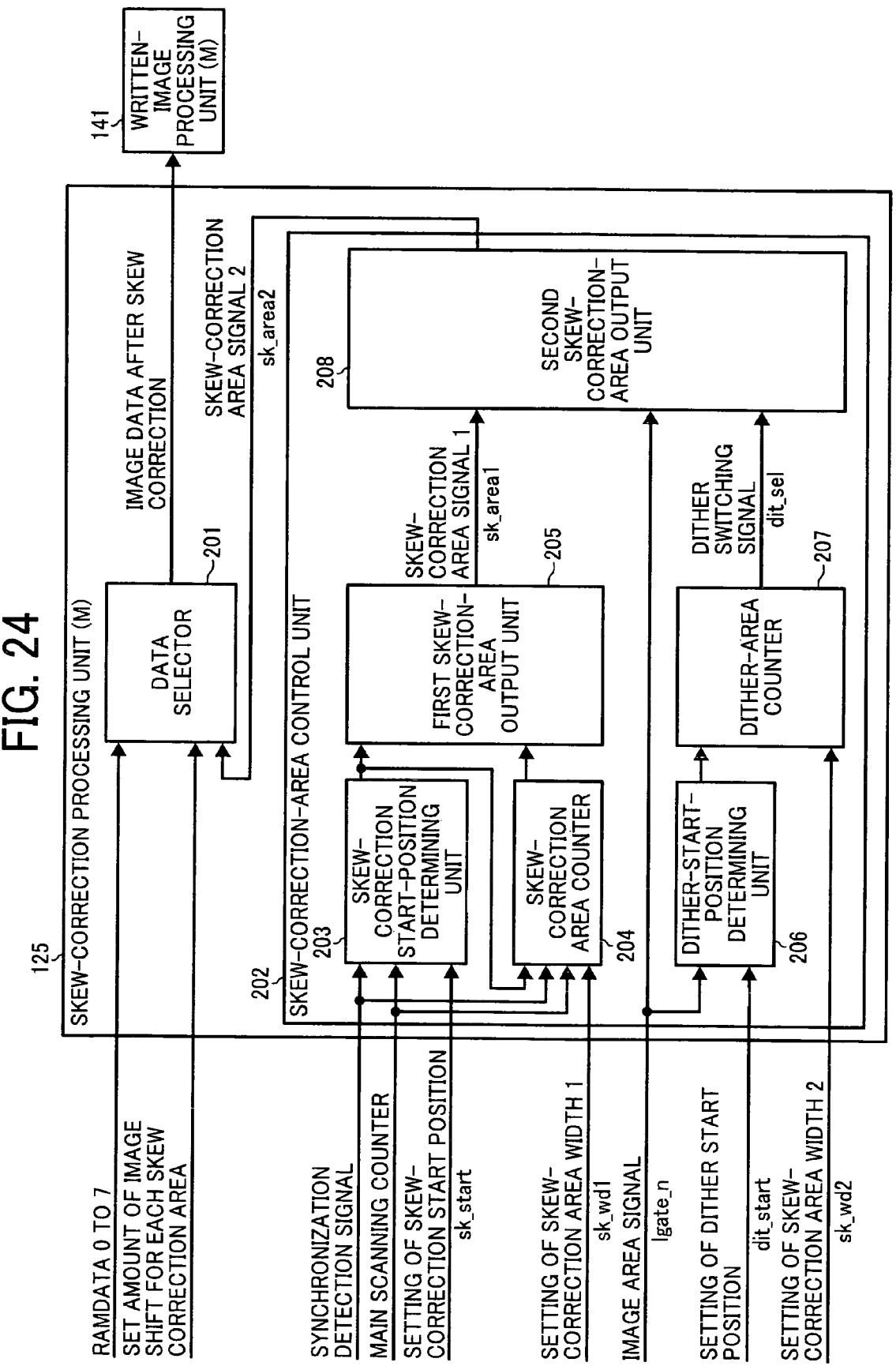
FIG. 24 is a block diagram of a skew-correction processing unit shown in FIG. 4.

FIG. 24 is a block diagram of the skew-correction processing unit 125. The skew-correction processing units 126 and 127 have the same configurations as that of the skew-correction processing unit 125; thereby their explanations are omitted.

Image data (RAMDATA 0 to 7) input from a plurality of line memories are selected by a data selector 201 and output to the written-image processing unit 141. The data selector 201 determines a line to be selected and output from the line memories based on a skew-correction area signal from a skew-correction-area control unit 202 and the amount of image shift corresponding to each skew correction area.

The skew-correction-area control unit 202 outputs a skew-correction area signal corresponding to an actual printing image based on a shift position of the skew correction for a maximum image size obtained in the misregistration detection process. An operation by the skew-correction-area control unit 202 is described with reference to a timing chart shown in FIG. 25A.

A skew-correction start-position determining unit 203 determines a start position of the skew correction based on setting of a skew-correction start position (sk_start). A first skew-correction-area output unit 205 switches a first skew-correction area signal (sk_area1) for an area 1 from the skew-correction start position.

A skew-correction area counter 204 starts counting from the skew-correction start position, and repeats counting for a period corresponding to a first skew-correction area width (sk_wd1) determined at step SA-5. When the skew-correction area counter 204 resets counting, the skew-correction-area output unit 205 switches the first skew-correction area signal (sk_area1) for a next area.

A dither-start-position determining unit 206 counts the number of pixels from a time when an image area signal (lgate_n) is enabled, and activates a dither-area counter 207 from a time of a dither start position (dit_start). When the dither-area counter 207 counts for a period corresponding to a second skew-correction-area width (sk_wd2), the dither-area counter 207 outputs dit_sel signal, resets its counts, and then repeats above operations.

Figure 29:
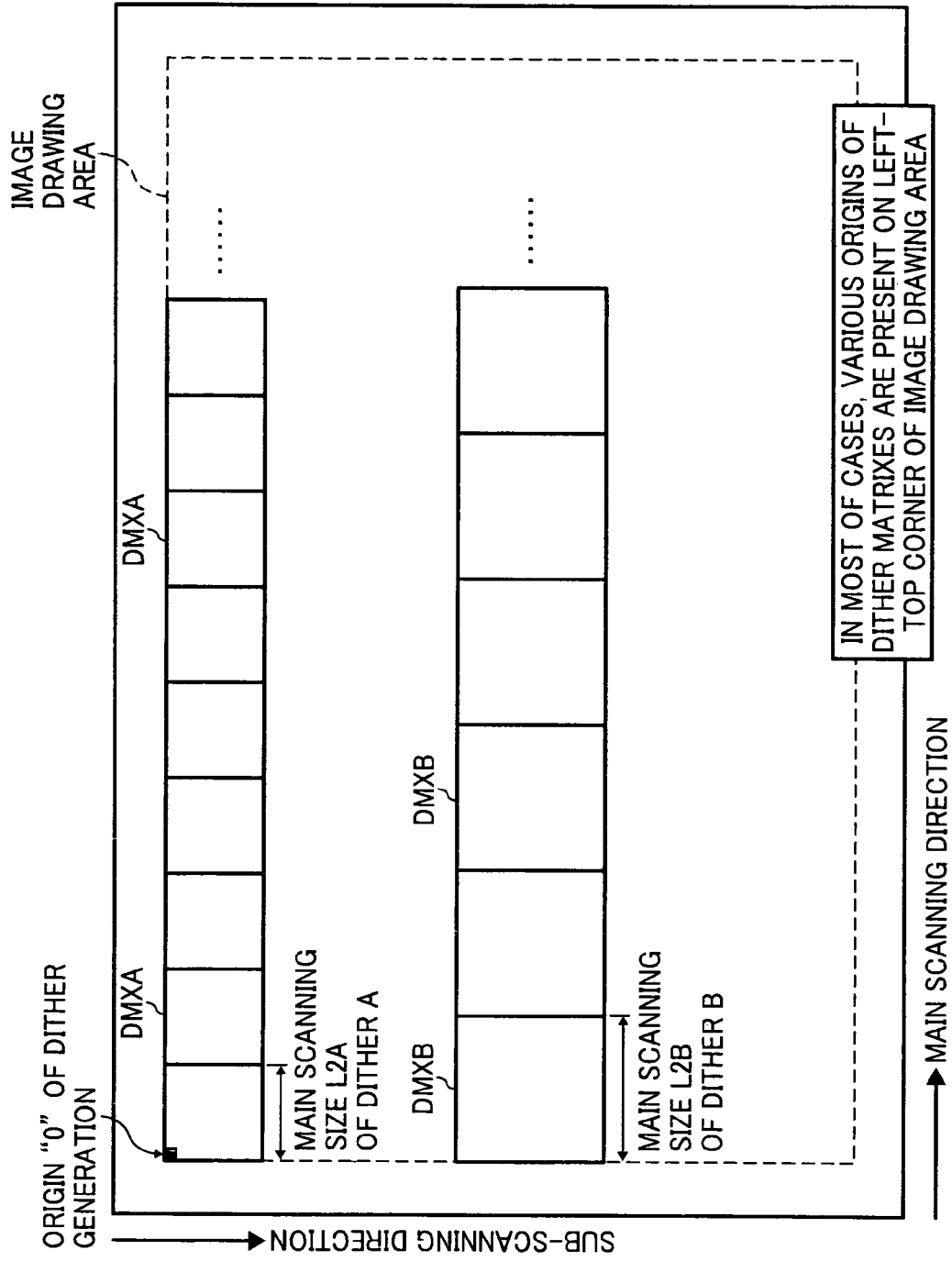
FIG. 29 is a schematic diagram for explaining an original point of a dither matrix.

When the image area signal (lgate_n) is disabled, the second skew-correction-area output unit 208 loads the first skew-correction area signal 1 (sk_area1) for the second skew-correction area signal 2 (sk_area2). When the image area signal (lgate_n) is enabled, the first skew-correction area signal 1 (sk_area1) is loaded for the second skew-correction area signal 2 (sk_area2) only when dit_sel is output. For the dither start position (dit_start), position from a right-top corner of a sheet, i.e., an origin of dither generation shown in FIG. 29, is acquired from a printer controller performing the dither process and set as the dither start position.

Figure 30:
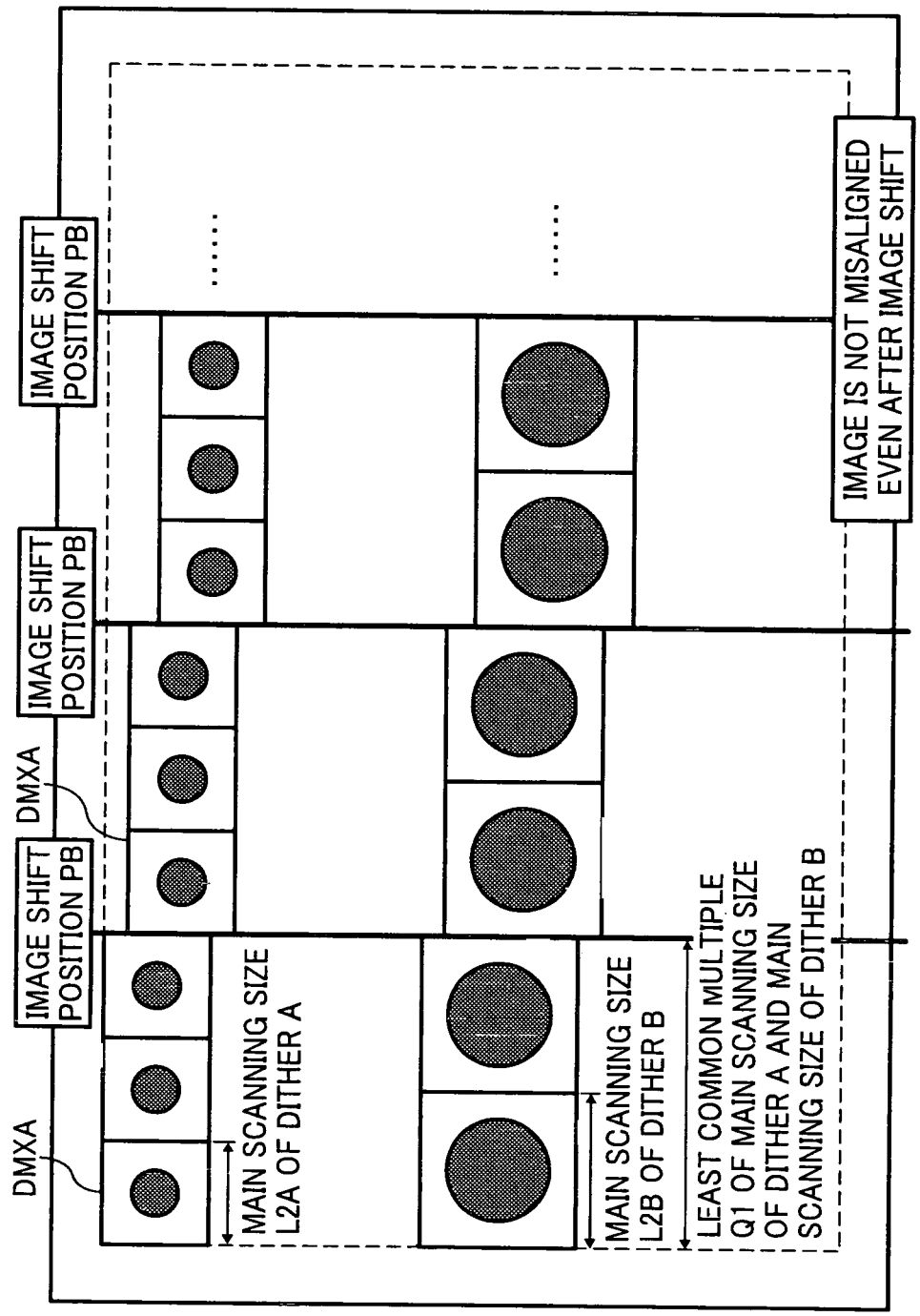
FIG. 30 is a schematic diagram of an example of image-shift possible positions for skew correction in the main-scanning direction of a dot-concentrated type dither matrix.
Figure 31:
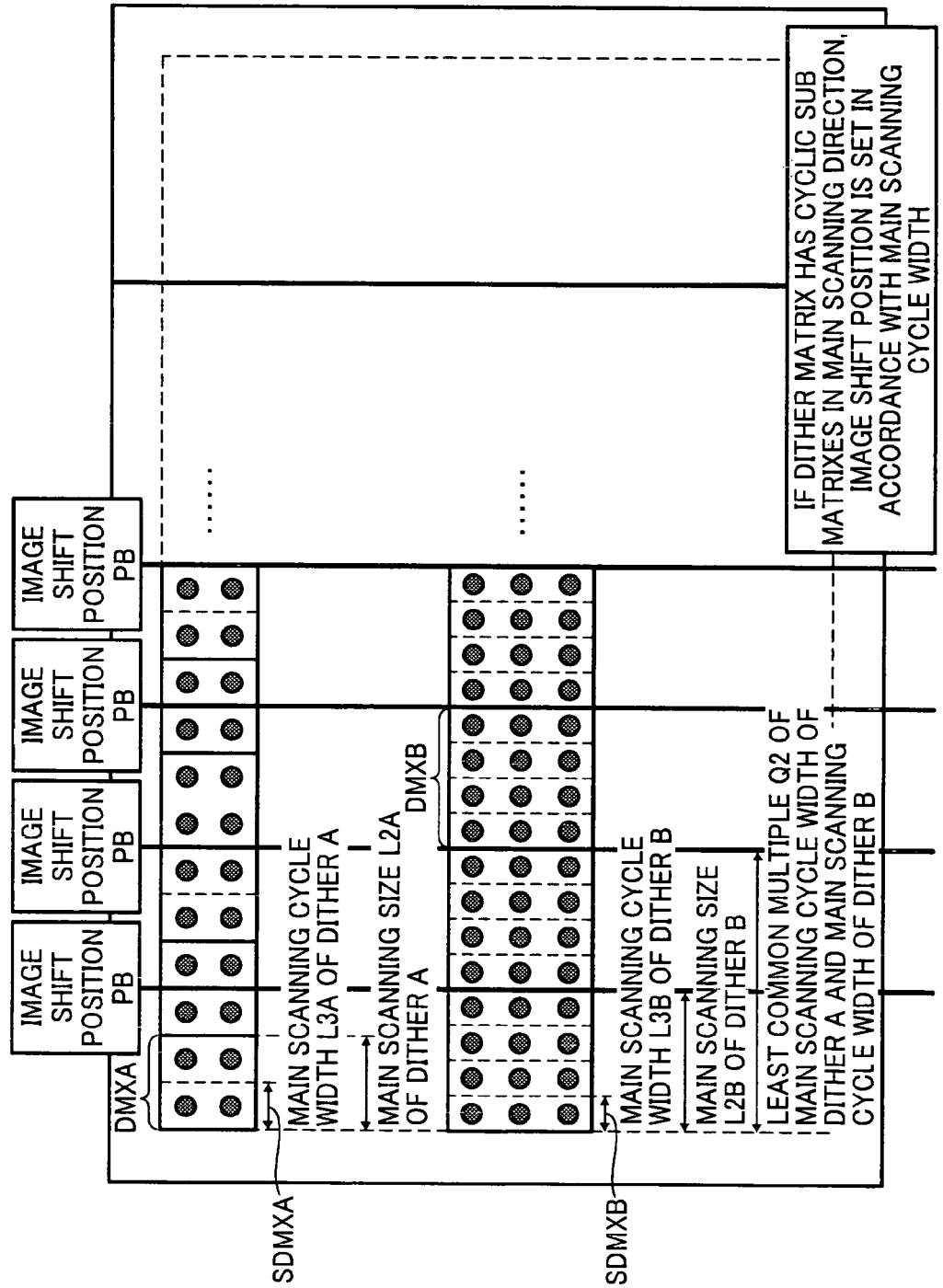
FIG. 31 is a schematic diagram of an example of image-shift possible positions of a dither matrix having cyclic sub matrixes in the main-scanning direction.
Figure 32:
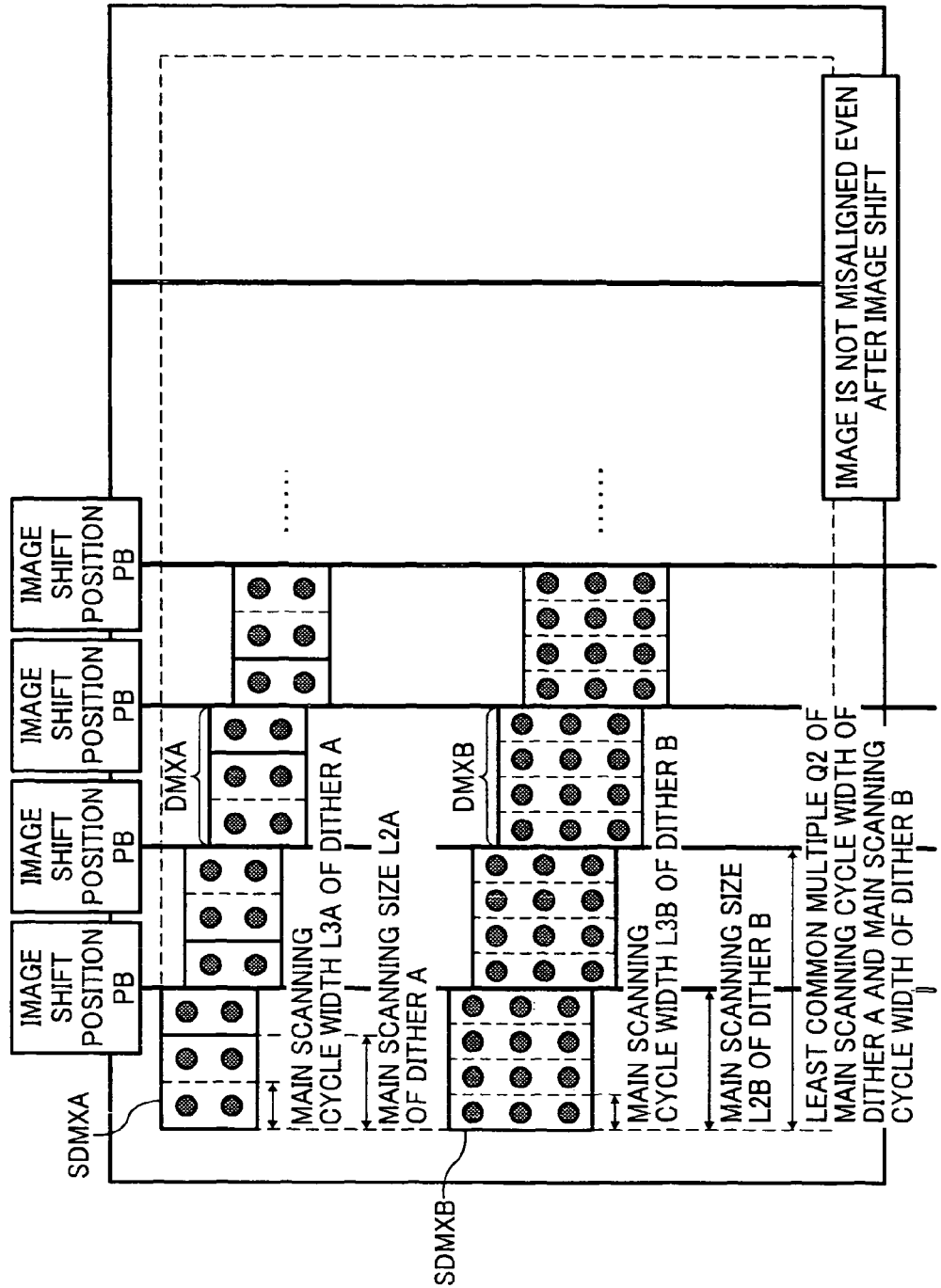
FIG. 32 is a schematic diagram of a shifted image without causing a noisy image at image shift positions.

For the second skew-correction area 2 (sk_wd 2), main-scanning sizes of dither matrixes used for a printing image as shown in FIGS. 30 to 32 is obtained from a printer controller, least common multiple (Q1 and Q2) of the main-scanning sizes is calculated, and such least common multiple is set as the second skew-correction area 2.

As described above, the skew correction process (image shift) is performed at a timing of switching the second skew-correction area signal 2 (sk_area 2), i.e., the image shift position PB, in a drawing area. Therefore, it is possible to prevent occurrence of a noisy image due to misalignment of dither patterns.

Figure 25A:
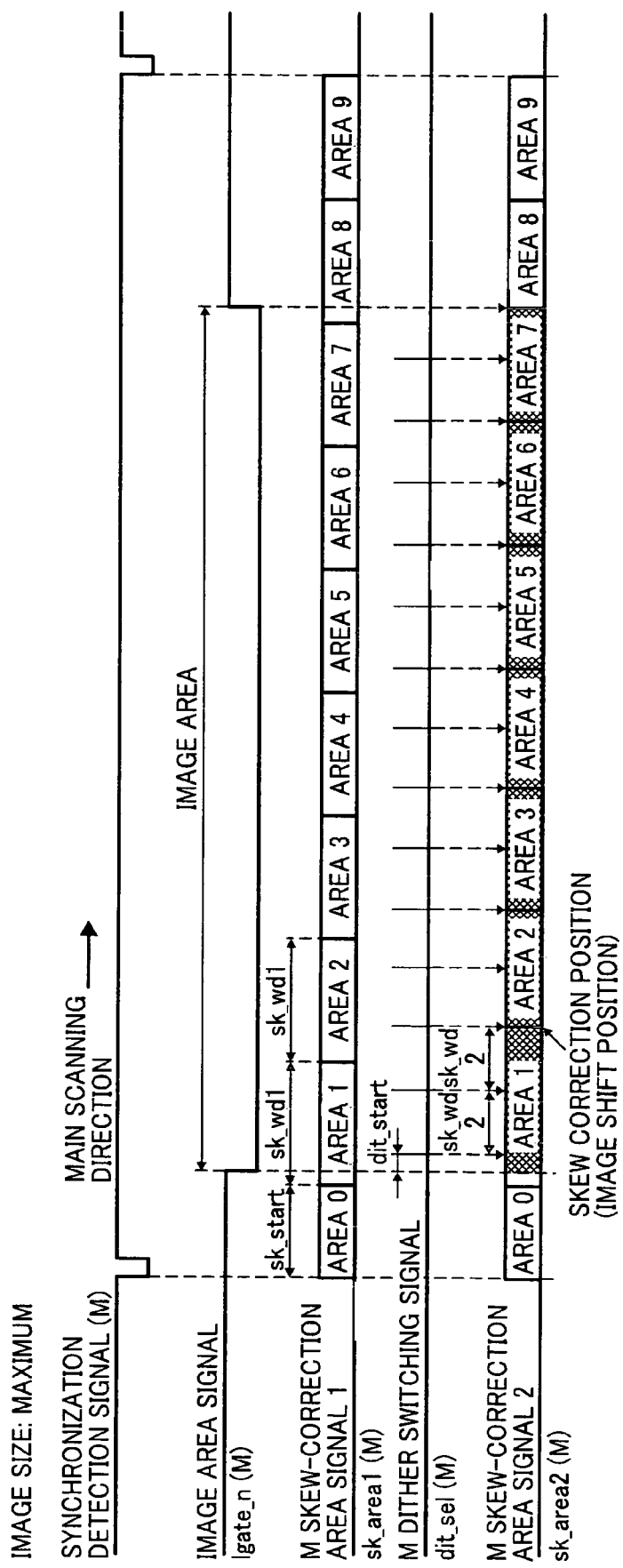
FIGS. 25 to 27 are timing charts of signals output from a skew-correction-area control unit shown in FIG. 24.
Figure 25B:
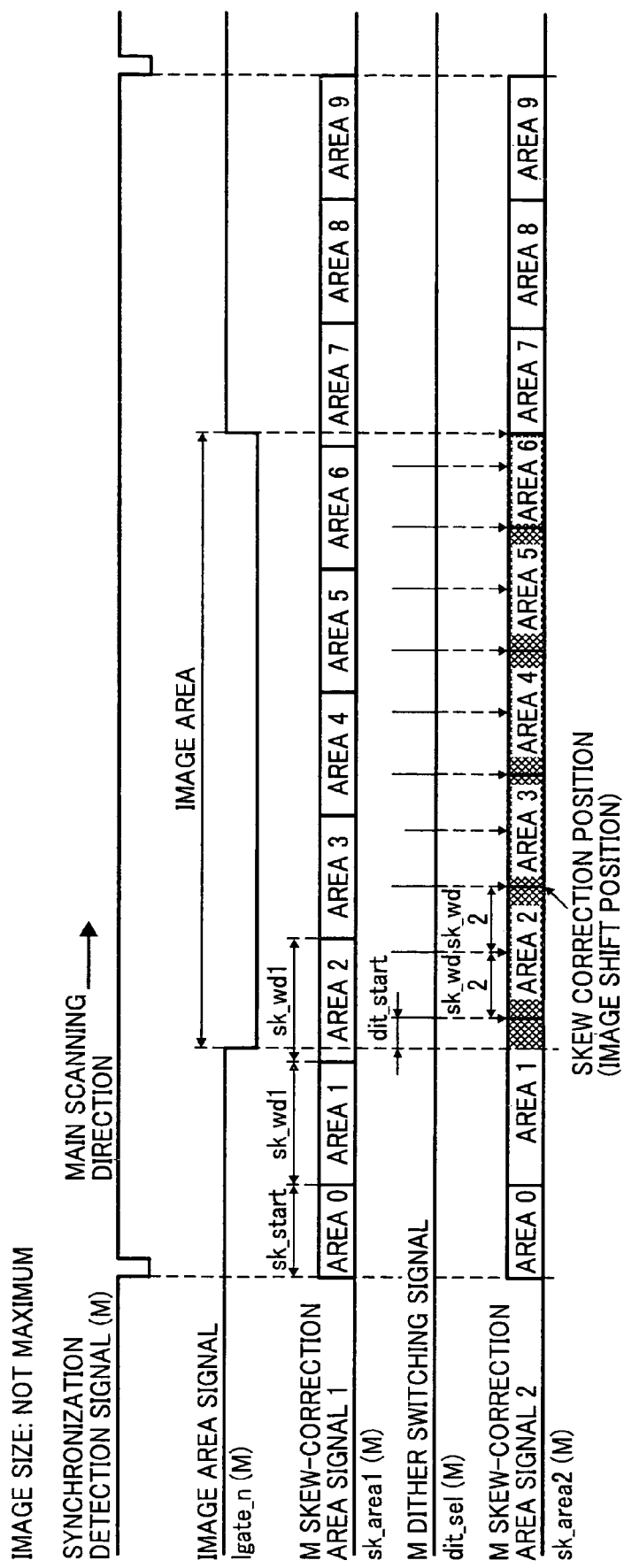

FIG. 25B is for an image of which size is smaller than that described in FIG. 25A. In this example, it is assumed that the origin of dither generation is different from that shown in FIG. 25A even with the same dither matrix size. In this case, the dither-start position (dit_start) is changed, while other parameters are similarly set as in the example shown in FIG. 25A, so that the skew correction processing (image shift) can be performed at any time at a timing of switching the second skew-correction area signal 2 (sk_area2), i.e., the image shift position PB. Thus, the above method can be applied for various image size and various dither matrixes owing to an image-shift-position determining process described later.

Figure 26B:
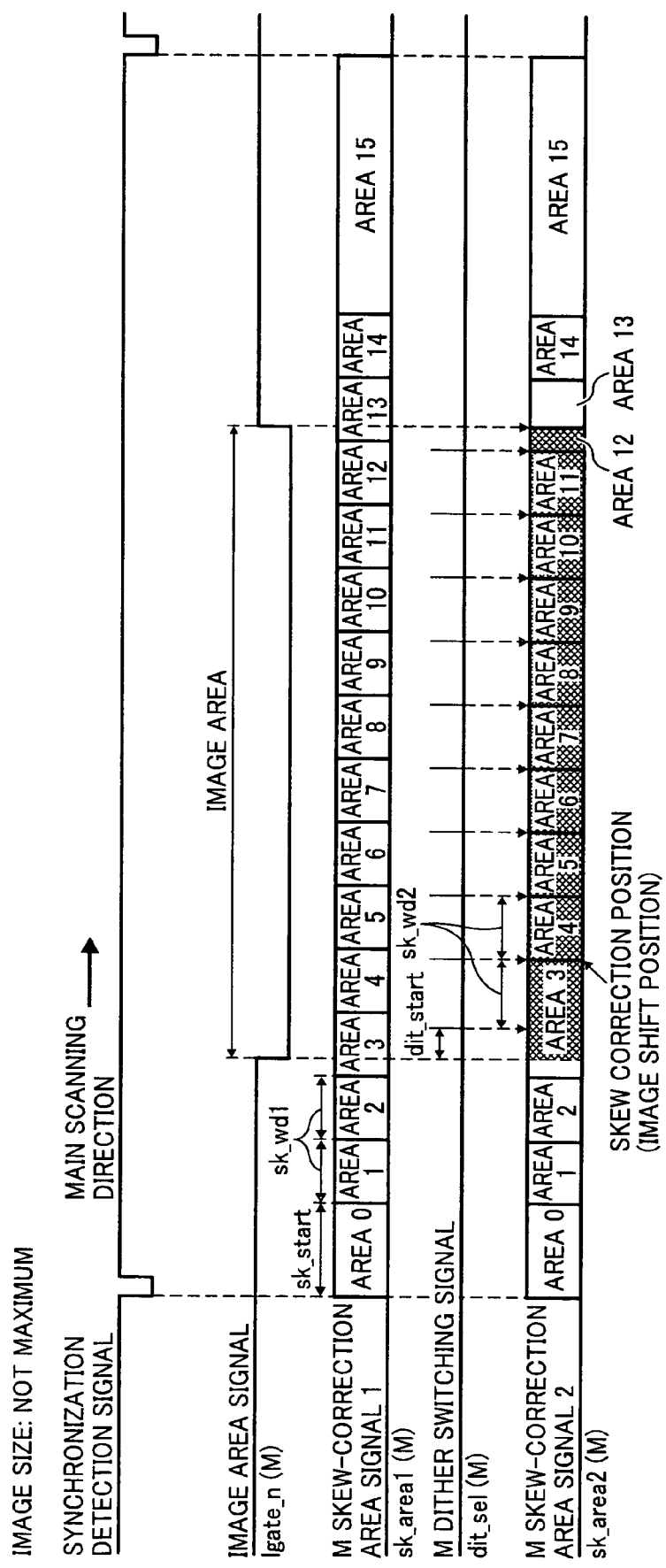

The examples shown in FIGS. 26A and 26B are such that the first skew-correction area width 1 (sk_wd1) is previously set so that the skew-correction area width 1 corresponds to integral multiples of a least common multiple of the dither matrix sizes and has the same setting as that of the second skew-correction area width 2 (sk_wd2). In this case, the same operation and the same effects can be achieved as described in connection with FIGS. 25A and 25B. However, data to be acquired at a time of printing is only data on the origin of dither generation, so that control can be easily performed.

Figure 27A:
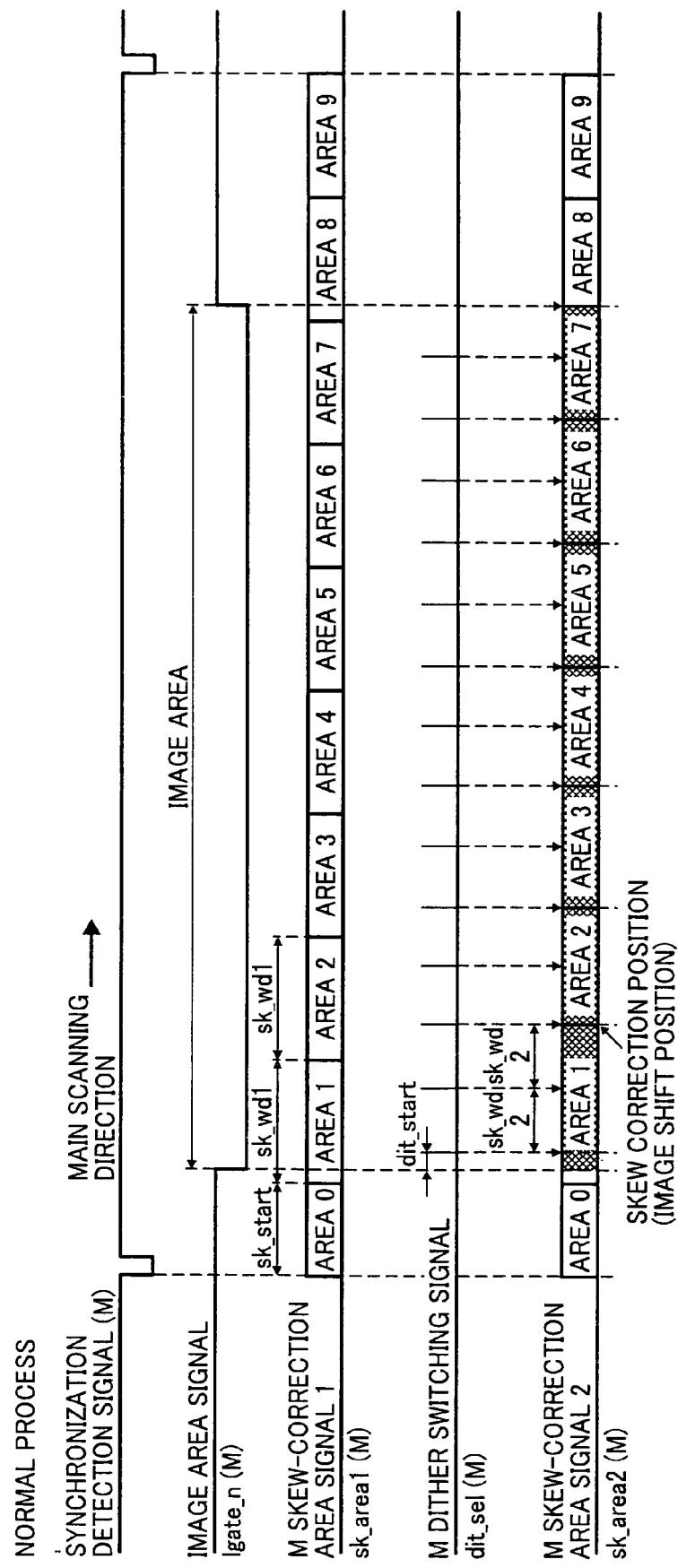
Figure 27B:
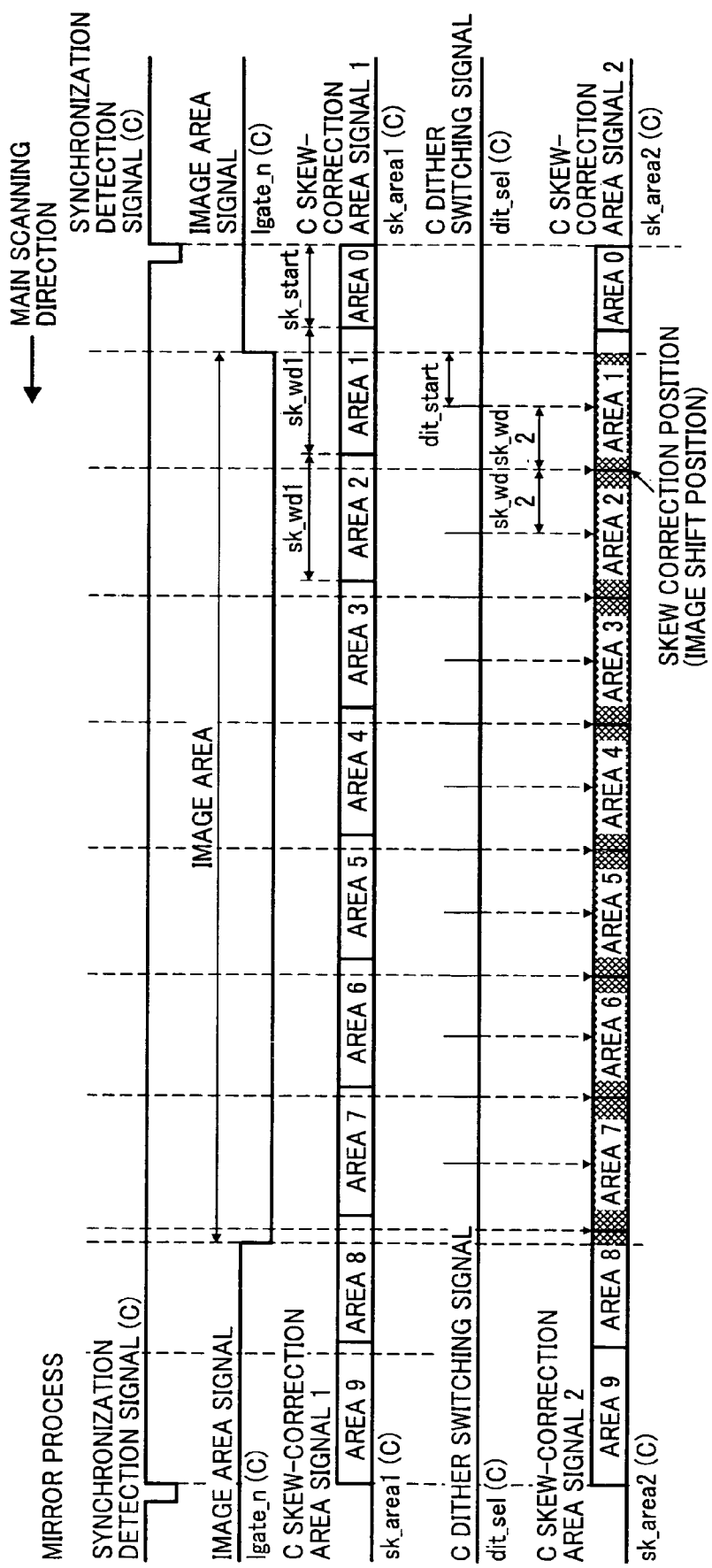

FIGS. 27A and 27B are timing charts for explaining operation of setting a skew correction area in a mirror process. FIG. 27A is operation for M in a normal process, and FIG. 27B is operation for C in a mirror process.

In the mirror process, the skew-correction start position (sk_start) shown in FIG. 24 is set by using an optical mechanism layout by which an image formed by the mirror process can be the same as the image formed by the normal process when these two images are overlapped. The first skew-correction area width 1 (sk_wd1) and the second skew-correction area-width 2 (sk_wd2) are the same as those in the normal process. The skew-correction position (shift position) is also set at the same position as set in the normal process by setting the dither start position (dit_start) by Equation (4):

$$\text{remainder of (sheet size)}-(\text{origin of dither generation})/Q1 \text{ or } Q2 \quad (4)$$

Figure 28:
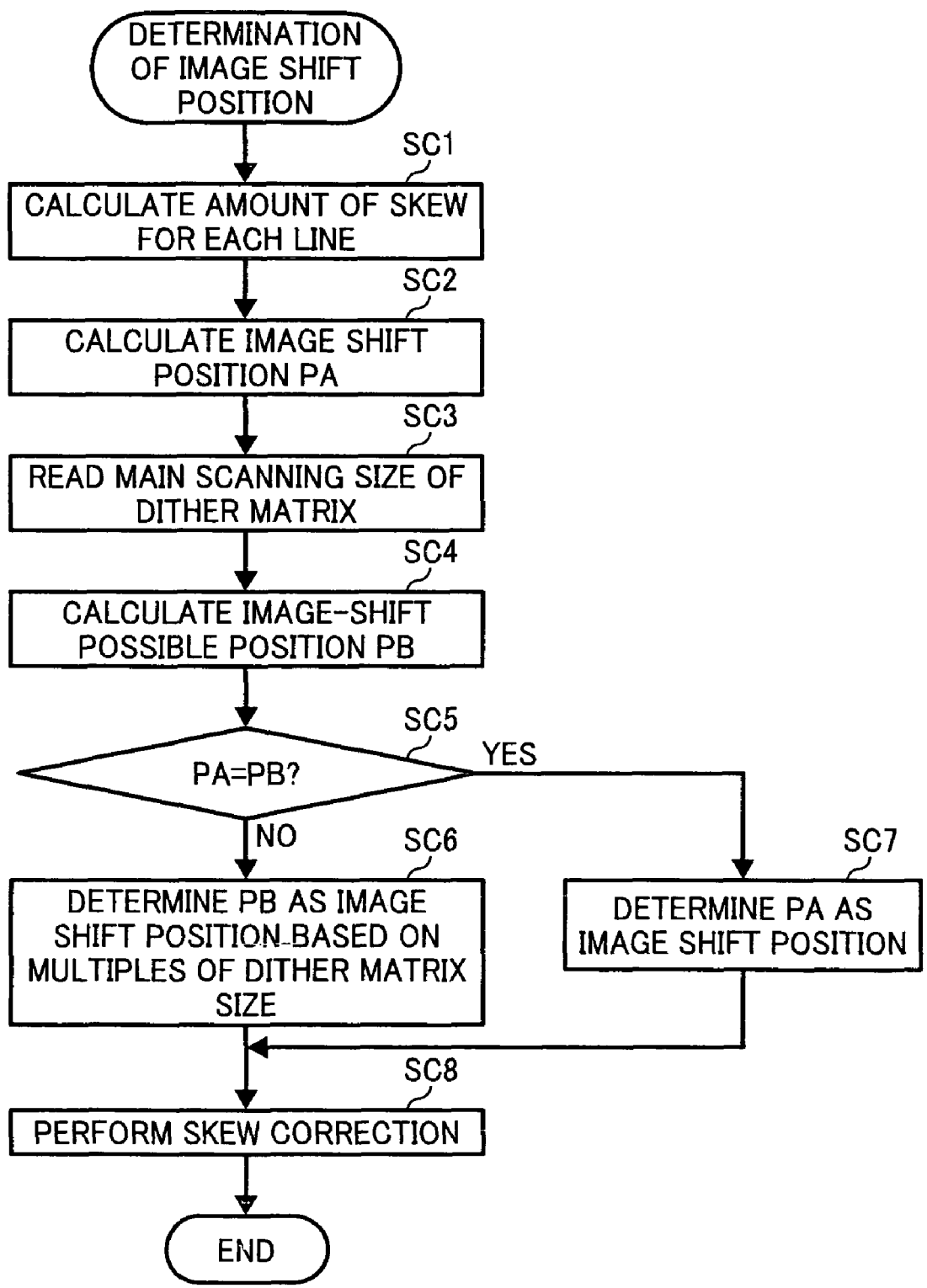
FIG. 28 is a flowchart of a process of determining an image shift position performed by a skew-correction processing unit shown in FIG. 24.

FIG. 28 is a flowchart of a process of determining an image shift position performed by the skew-correction processing units 125 to 127.

For determining a shift position, the amounts of skew KY_Skew, KM_Skew, KC_Skew for each color to the reference color K are detected, and skew_line_gap obtained by converting detected amounts of skew to the amounts represented by lines based on resolution in the sub-scanning direction are calculated (step SC-1). The amount of skew represented by skew_line_gap is obtained by Equation (5):

$$\text{skew\_line\_gap}(\mu m/\text{the number of lines})=\text{skew\_gap}/(25.4/\text{resolution in the sub-scanning direction (dots per inch)}\times 1000) \quad (5)$$

where skew_line_gap is integer with fractions rounded up.

A provisional image shift position PA (_shift_s) for performing the skew correction is obtained by using the main-scanning size L (xsize) of an image and skew_line_gap by Equation (6):

$$\_shift\_x = n \times x\text{size}/(\text{skew\_line\_gap}+1) \quad (6)$$

where 0<n<a+1 (n is integer, and shift_x is integer with fractions rounded up) (step SC-2).

After calculating the provisional image shift position PA, a main-scanning size L2 (dit_size) of the dither matrix DMX used for an image to be formed is read (step SC-3). The image-shift possible positions PB are calculated (step SC-4). It is determined whether the provisional image shift position PA and each of the image-shift possible positions PB correspond with each other (step SC-5). As a result of comparison, when the provisional image shift position PA and the image-shift possible position PB correspond with each other (Yes at step SC-5), the provisional image shift position PA (i.e., the image-shift possible position PB) is set as the image shift position (step SC-7).

On the other hand, when the provisional image shift position PA and the image-shift possible position PB do not correspond with each other (No at step SC-5), the image-shift possible position PB is determined based on the multiples of the dither matrix sizes (main-scanning size of the dither matrix), and sets a determined image-shift possible position PB as the image shift position (step SC-6). In other words, the provisional shift position shift_x is set as the image shift position.

For example, if the provisional shift position PA (_shift_x) is not the multiple of the main-scanning size L2 (dit_size) of the dither matrix DMX, the image shift position (shift_x) is set by Equation (7):

$$\text{shift}\_x = m \times \text{dit\_size} \quad (7)$$

where m is integer.

Then, the image is shifted at the determined image shift position shift_x, and the skew correction is performed (step SC-8).

FIG. 29 is a schematic diagram for explaining an origin of a dither matrix. The dither matrix DMX is drawn from the origin "O", and regularly arranged in the main-scanning direction and the sub-scanning direction. Generally, the dither matrix DMX has the origin at the left-top corner of the image drawing area as shown in FIG. 29, and an image is drawn from the left to the right of the image drawing area as shown in FIG. 29. The left-top corner is generally a start point of various dither matrixes in the main-scanning direction. In the example shown in FIG. 29, a dither matrix DMXA and a dither matrix DMXB in each different size are used. The main-scanning size L2A of the dither matrix DMXA is shorter than the main-scanning size L2B of the dither matrix DMXB as shown in FIG. 29. (L2A<L2B).

FIG. 30 is a schematic diagram of an example of image-shift possible positions for skew correction in the main-scanning direction for a dot-concentrated type dither matrixes. The image-shift possible positions PB are set in accordance with integral multiples of the least common multiple Q1 of the main-scanning size L2A of the dither matrix DMXA and the main-scanning size L2B of the dither matrix DMXB. Accordingly, even when the image is shifted, the dither patterns of the dither matrixes DMXA and DMXB are not misaligned, resulting in preventing a noisy image. If three or more of dither matrixes in each different size are used, the image shift position is set in accordance with integral multiples of a least common multiple of those main-scanning sizes.

FIG. 31 is a schematic diagram of an example of image-shift possible positions of the dither matrix DMXA having cyclic sub matrixes SDMXA in the main-scanning direction. If integral multiples of the least common multiple Q2 of main-scanning cycle widths L3A and L3b of each of the sub matrixes SDMXA and SDMXB are set as the image-shift possible positions PB for the skew correction in the main-scanning direction, a shift position can be such that corresponds to a common boundary of the sub matrixes SDMXA and SDMXB even when the image is shifted. Therefore, dither patterns are not misaligned at the image shift position. As shown in FIG. 32, even when the image is shifted at shift positions shown in FIG. 31, it is possible to prevent a noisy image. Furthermore, each of the main-scanning cycle widths L3A and L3B is shorter than each of the main-scanning sizes L2A and L2B, so that the image-shift possible positions can be set with shorter intervals than those by integral multiples of the least common multiple Q1.

When the entire image is formed by sub matrixes SDMX having cyclic arrangement in the main-scanning direction, if the main-scanning cycle width L3 of the sub matrix SDMX is set as the image-shift possible position, it is possible to shift an image without causing misalignment of the dither patterns DPN.

Figure 33:
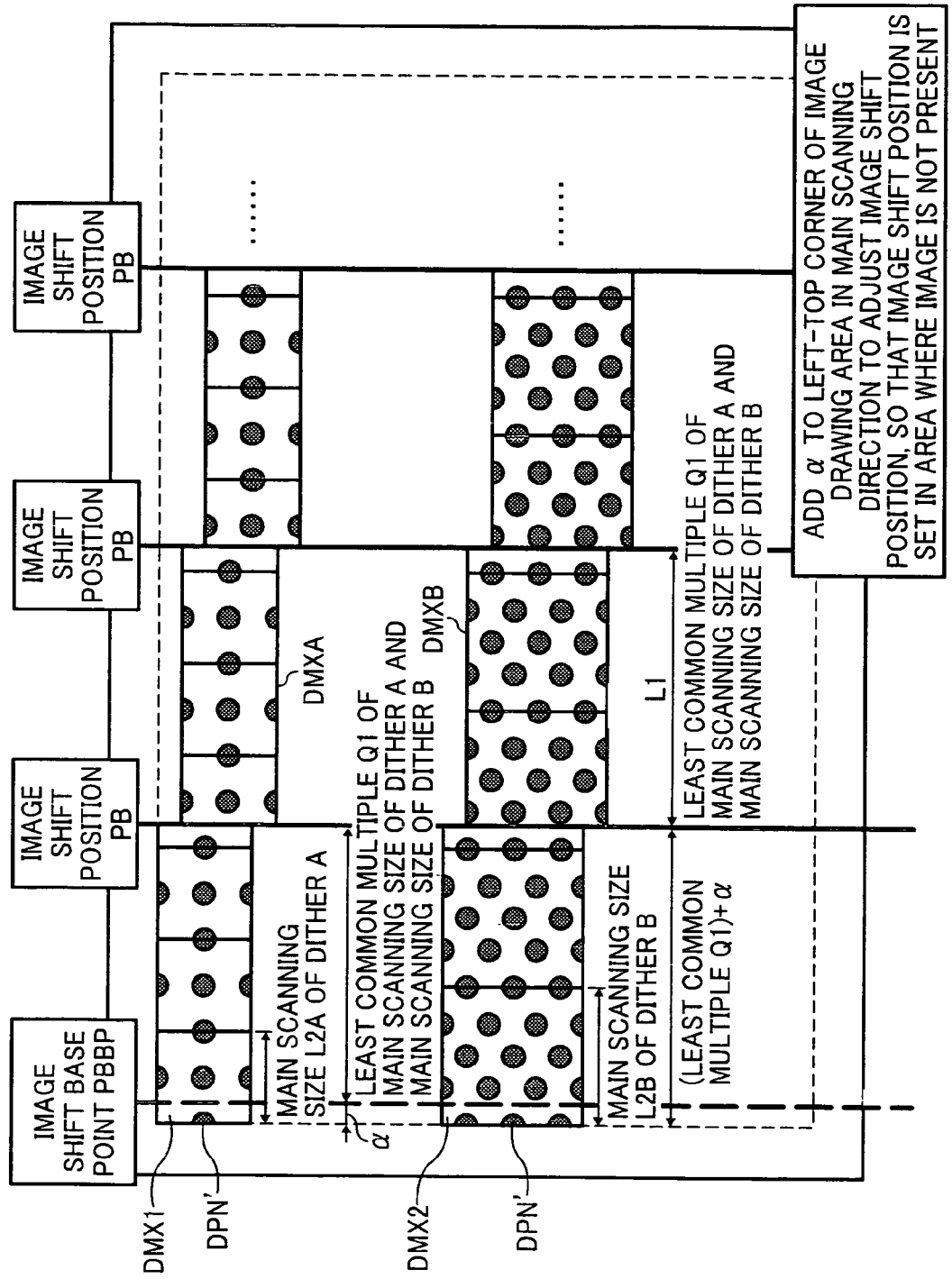
FIG. 33 is a schematic diagram of another example of image-shift possible positions.

FIG. 33 is a schematic diagram of another example of image-shift possible positions PB. When dither patters DPN' are aligned over a start position of dither matrixes DMX1 and DMX2 in the dither matrixes DMXA and DMXB, a base point PBBP of the image-shift possible positions PB in the main-scanning direction is set at a position α where dither patterns are not present from the left-top corner of the dither matrixes DMXA and DMXB, and a dividing interval L1 of image shift in the main-scanning direction (image shift interval) is set to an integral least common multiple Q1 of the main-scanning sizes L2A and L2B. Accordingly, the image-shift possible positions PB can be set in positions (Q1+α) where dither patterns are not present, resulting in shifting an image without causing misalignment of the dither pattern DPN. The value α is set so that α is smaller than the shortest main-scanning size between the main-scanning sizes L2A and L2B. Alternatively, α is set so that α is smaller than a most highest common factor of the main-scanning sizes L2A and L2B.

Figure 34:
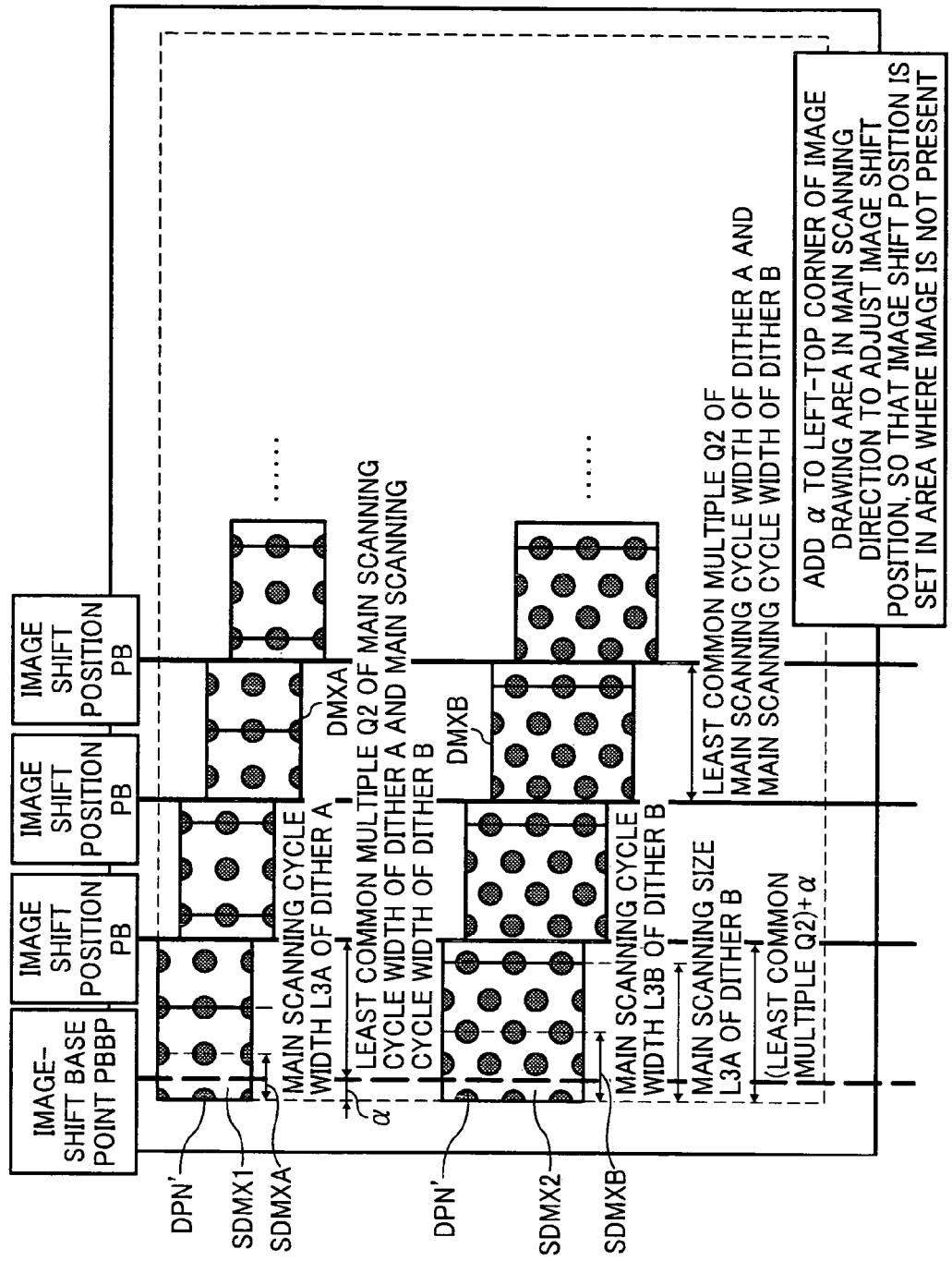
FIG. 34 is a schematic diagram of an example of image-shift possible positions of a dither matrix having cyclic sub matrixes in the main-scanning direction, and when dither patters are aligned over a start position of a dither matrix.

FIG. 34 is a schematic diagram of an example of image-shift possible positions PB of the dither matrixes DMXA and DMXB having cyclic sub matrixes SDMXA and SDMXB in the main-scanning direction, in which dither patters DPN' are aligned over a start position of the dither matrixes DMXA and DMXB. The base point PBBP of the image-shift possible positions PB in the main-scanning direction is set at a position α where dither patterns are not present from the left-top corner of the dither matrixes DMXA and DMXB, and the image-shift possible positions PB are set at integral multiples of a least common multiple of the main-scanning cycle widths L3A and L3B from the base point PBBP. Accordingly, the image-shift possible positions PB can be set at positions where dither patterns are not present.

When the entire image is formed in such a manner that dither patters are aligned over a start position of the dither matrixes, the base point PBBP is set at a position α where dither patterns are not present from the left-top corner of the dither matrixes in the main-scanning direction, so that dividing intervals (the image-shift possible positions PB) in the main-scanning direction for the image shift are set in accordance with the main-scanning size L2 of the dither matrix or the main-scanning cycle widths L3A and L3B of the dither matrixes cyclically arranged in the main-scanning direction.

Figure 35:
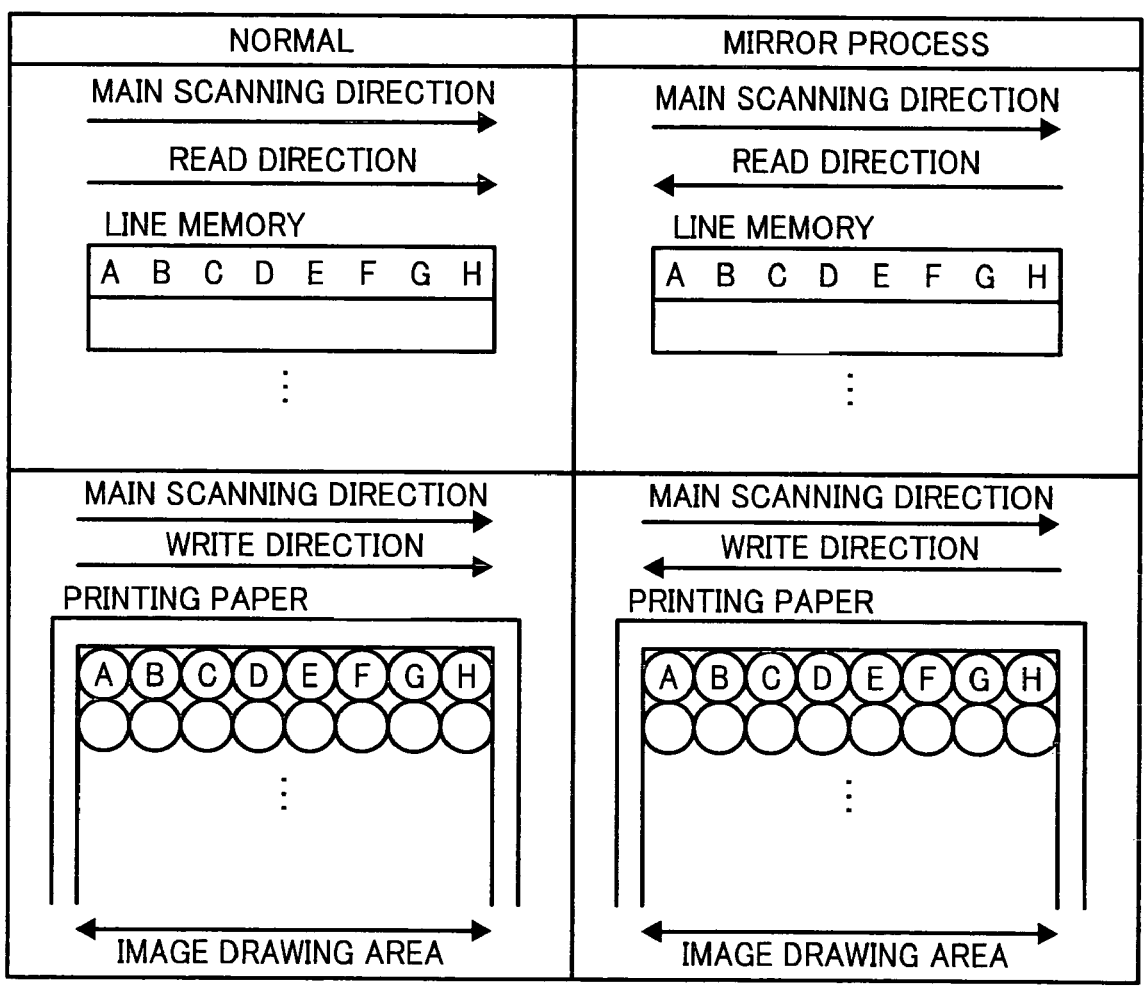
FIG. 35 is a schematic diagram of a system configuration for a mirror process in which a write process is performed in an inverse direction of the main-scanning direction.
Figure 36:
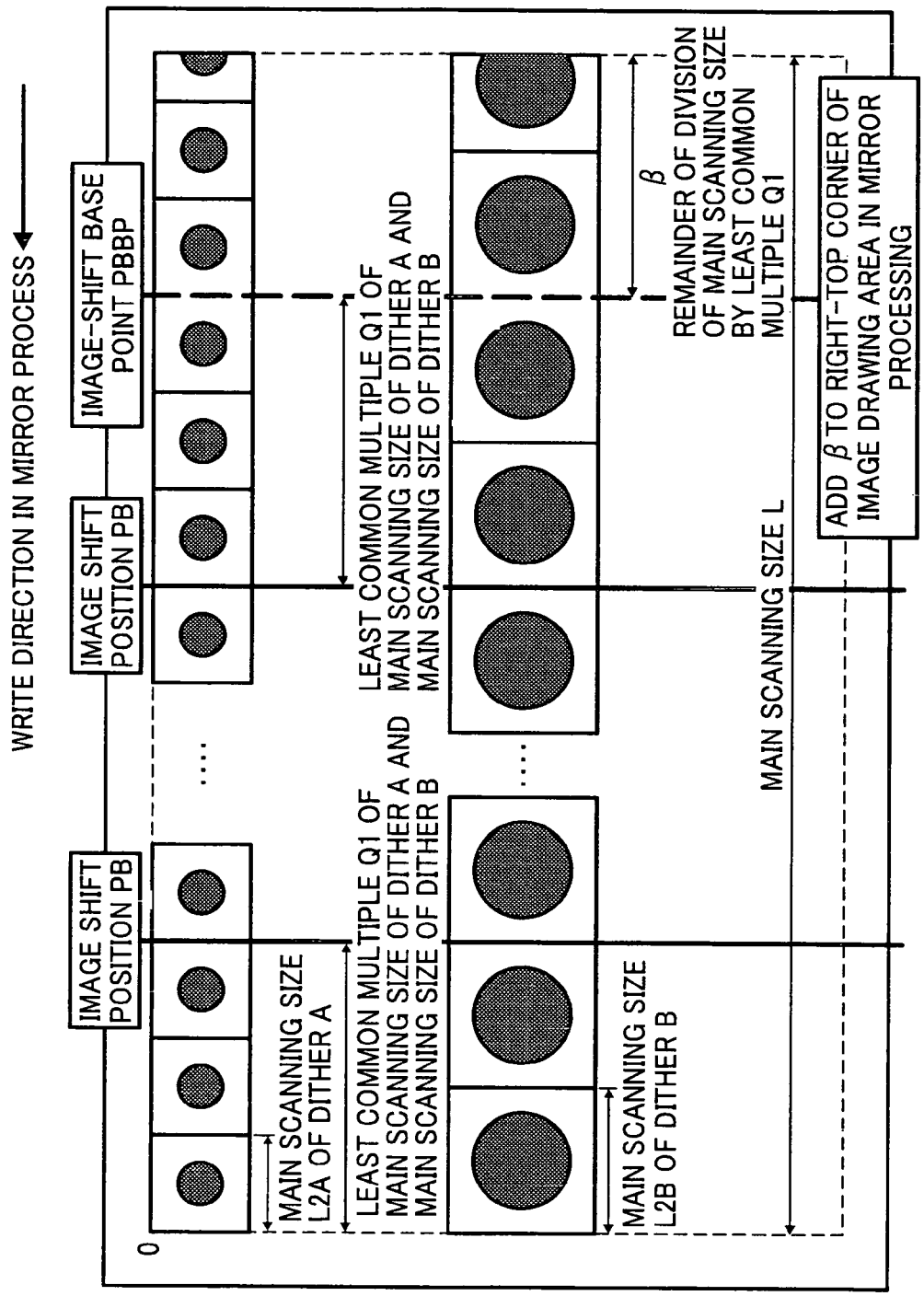
FIG. 36 is a schematic diagram of an example of image-shift possible positions for a mirror process.

In tandem-type color laser printers, some colors are written in an inverse direction of the main-scanning direction due to their configuration. FIG. 35 is a schematic diagram of a system configuration for a mirror process in which a write process is performed in an inverse direction of the main-scanning direction. Each of the line memories 120 to 123 shown in FIG. 4 includes image data for one line in the main-scanning direction. When image data is written in an inverse direction of the main-scanning direction as shown in FIG. 36, the image data is written from a rear end of the line memories 120 to 123, so that image data is written in an inverse direction of the main-scanning direction. The above described process is the mirror process.

FIG. 36 is a schematic diagram of an example of image-shift possible positions PB for a mirror process. For performing the mirror process, the image data is written from the right end to the left end in the image drawing area as shown in FIG. 36. The origin "O" of the dither matrix DMX is generally present at the left-top corner as in the normal process. Accordingly, remainder of division of the main-scanning size L in the drawing area by a least common multiple of the main-scanning sizes L2A and L2B is set as β, and a position shifted by β from the right-top corner of the image drawing area is set as the base point PBBP of the image-shift possible positions PB in the main-scanning direction. The image-shift possible positions PB are set in accordance with integral multiples of the least common multiple Q1 of the main-scanning sizes L2A and L2B of the dither matrixes DMXA and DMXB from the base point PBBP. As a result, the image can be shifted without causing misalignment of the dither patterns DPN. The value β is set so that β is smaller than the least common multiple Q1 of the main-scanning sizes L2A and L2B of the dither matrixes and the least common multiple Q2 of the main-scanning cycle widths L3A and L3B.

When each of the dither matrixes DMXA and DMXB includes cyclic sub matrixes SDMXA and SDMXB in the main-scanning direction, remainder of division of the main-scanning size in the image drawing area by the integral least common multiple Q2 of the main-scanning cycle widths L3A and L3B is set as β, and a position shifted by β from the right-top corner of the image drawing area is set as the base point PBBP of the dividing possible positions PB.

Figure 37:
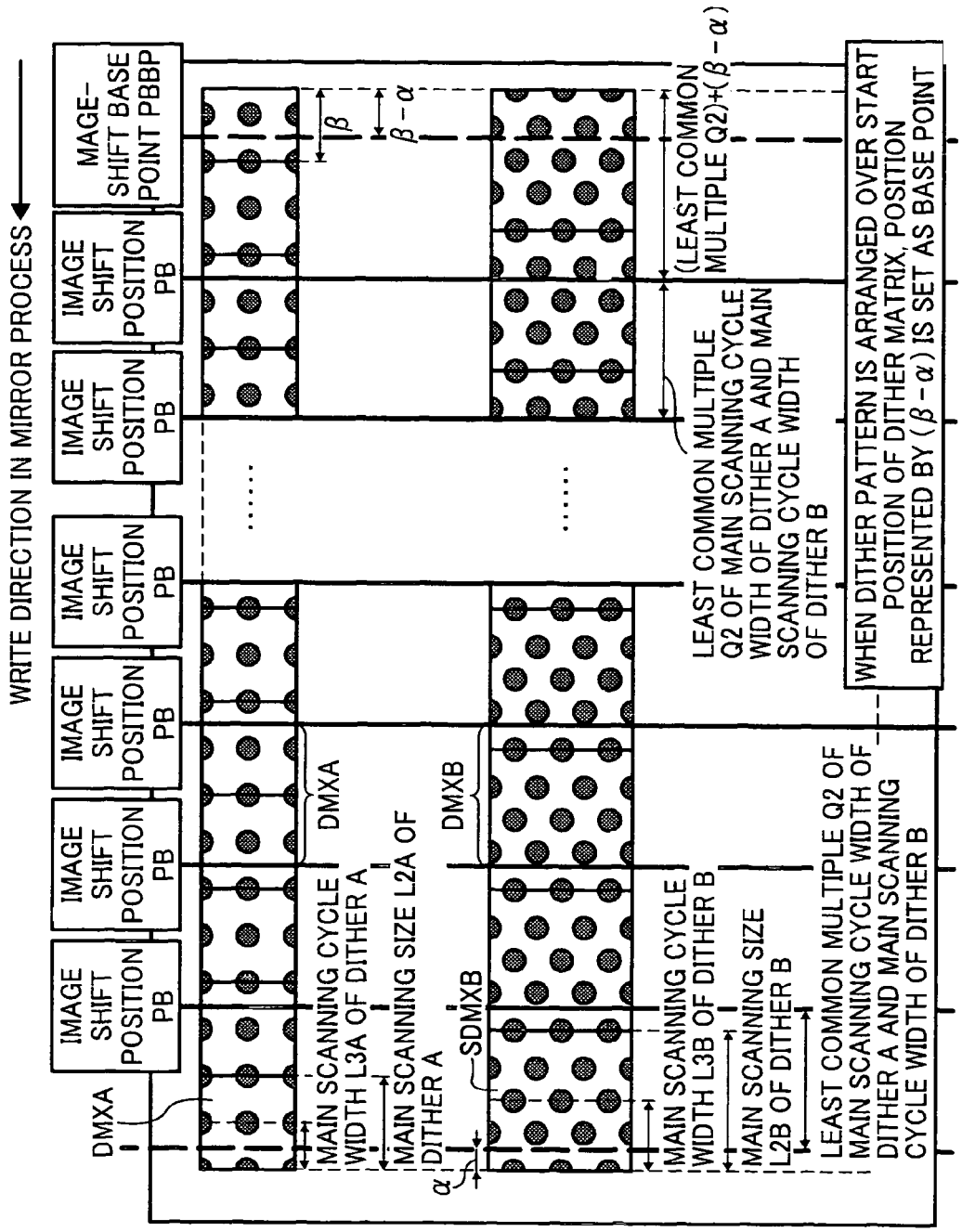
FIG. 37 is a schematic diagram of an example of image-shift possible positions in the main-scanning direction for skew correction when a mirror process is performed to an image having sub matrixes with dither patterns aligned over a starting position of a dither matrix.

FIG. 37 is a schematic diagram of an example of image-shift possible positions PB in the main-scanning direction for skew correction when a mirror process is performed to an image having the sub matrixes SDMXA and SDMXB with dither patterns DPN' aligned over a starting position of dither matrixes. The base point PBBP is set by β and α(β−α), and a dividing interval L1 for image shift in the main-scanning direction is set in accordance with the main-scanning sizes L2A and L2B of the dither matrixes DMXA, DMXB, or the least common multiple Q2 of the main-scanning cycle widths L3A, L3B of the cyclically-arranged sub matrixes SDMXA and SDMXB. As a result, the image-shift possible positions are set at positions where dither patterns are not present. The second shift position PB in an inverse direction of the main-scanning direction is determined by Q2+(β−α).

In some dither matrixes, a noisy image hardly occurs even when the image-shift possible positions are set at any positions in the dither matrixes (e.g., a halftone process having no cyclicity, such as an error diffusion method). It is possible not to perform a control for determining the image-shift possible positions for such dither matrixes.

In some other dither matrixes, a noisy image occurs in a specific image shift direction. In such a case, it is possible to perform a control only for determining the image-shift possible positions for shifting an image in a direction where the noisy image occurs, and not perform a control in a direction where a noisy image hardly occurs.

Figure 38:
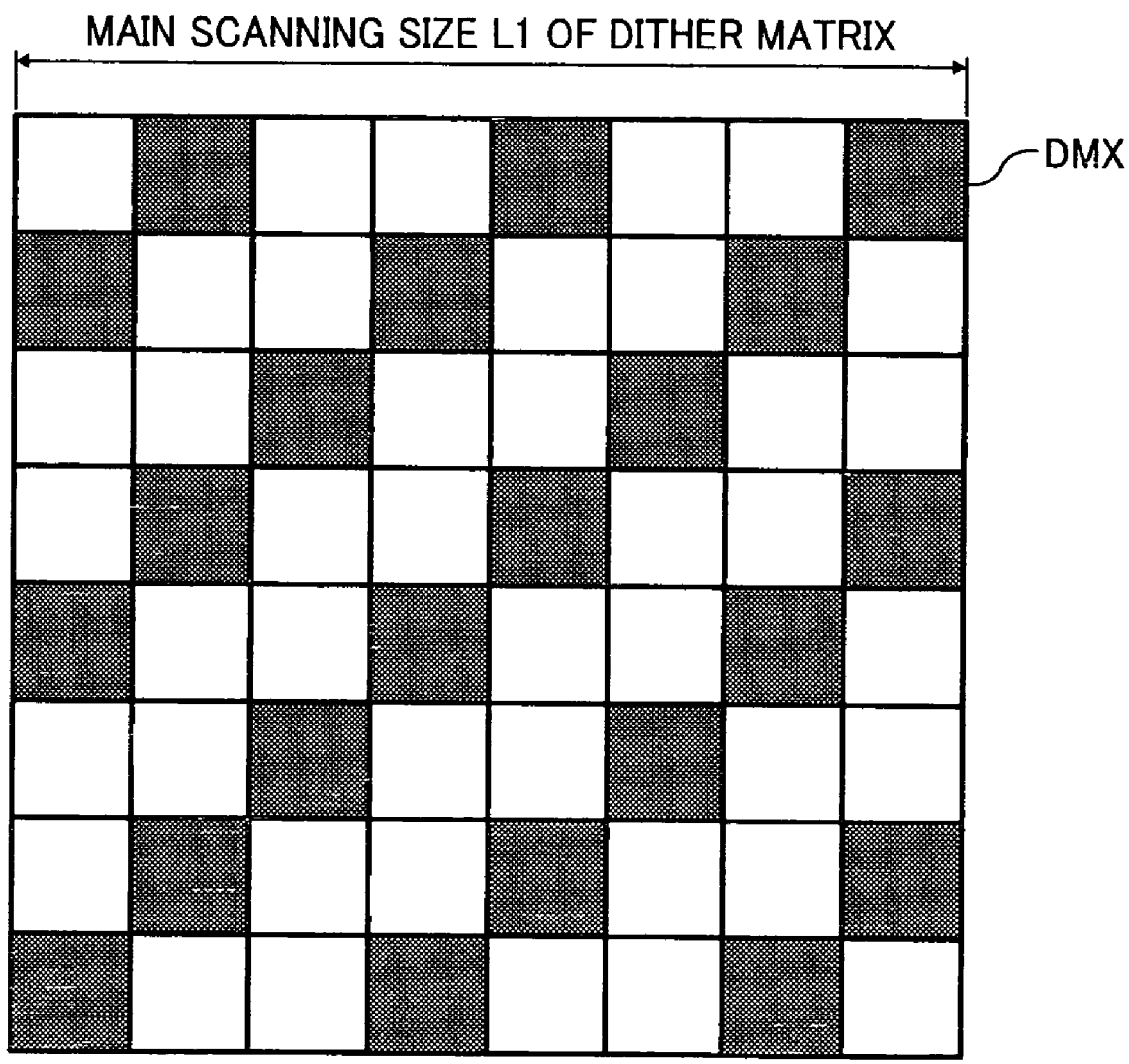
FIG. 38 is a schematic diagram of screen angles of a dither matrix having parallel line patterns.

FIG. 38 is a schematic diagram of screen angles of a dither matrix having parallel line patterns (line-screen-type dither matrix). Some line-screen-type dither matrixes like the dither matrix DMX shown in FIG. 38 have screen angles that are likely to cause a noisy image when an image is shifted, while some other line-screen-type dither matrixes do not have such screen angles. It is possible to perform a control to determine the image-shift possible positions only when the dither matrixes having screen angles that may cause a noisy image are used, and not perform a control when dither matrixes having screen angles that hardly cause a noisy image.

Some other line-screen-type dither matrixes cause a noisy image depending on the number of lines in the dither matrixes. In such a dither matrix, it is possible to perform a control to adjust the image-shift possible positions to the size of a dither matrix only when the image is shifted in a direction where a noisy image may occur, and not perform a control when the image is shifted in a direction where a noisy image hardly occurs.

The above described methods are examples of a method of setting the image-shift possible positions. The method can be modified due to combinations of various types of dither matrixes in an image.

Figure 39:
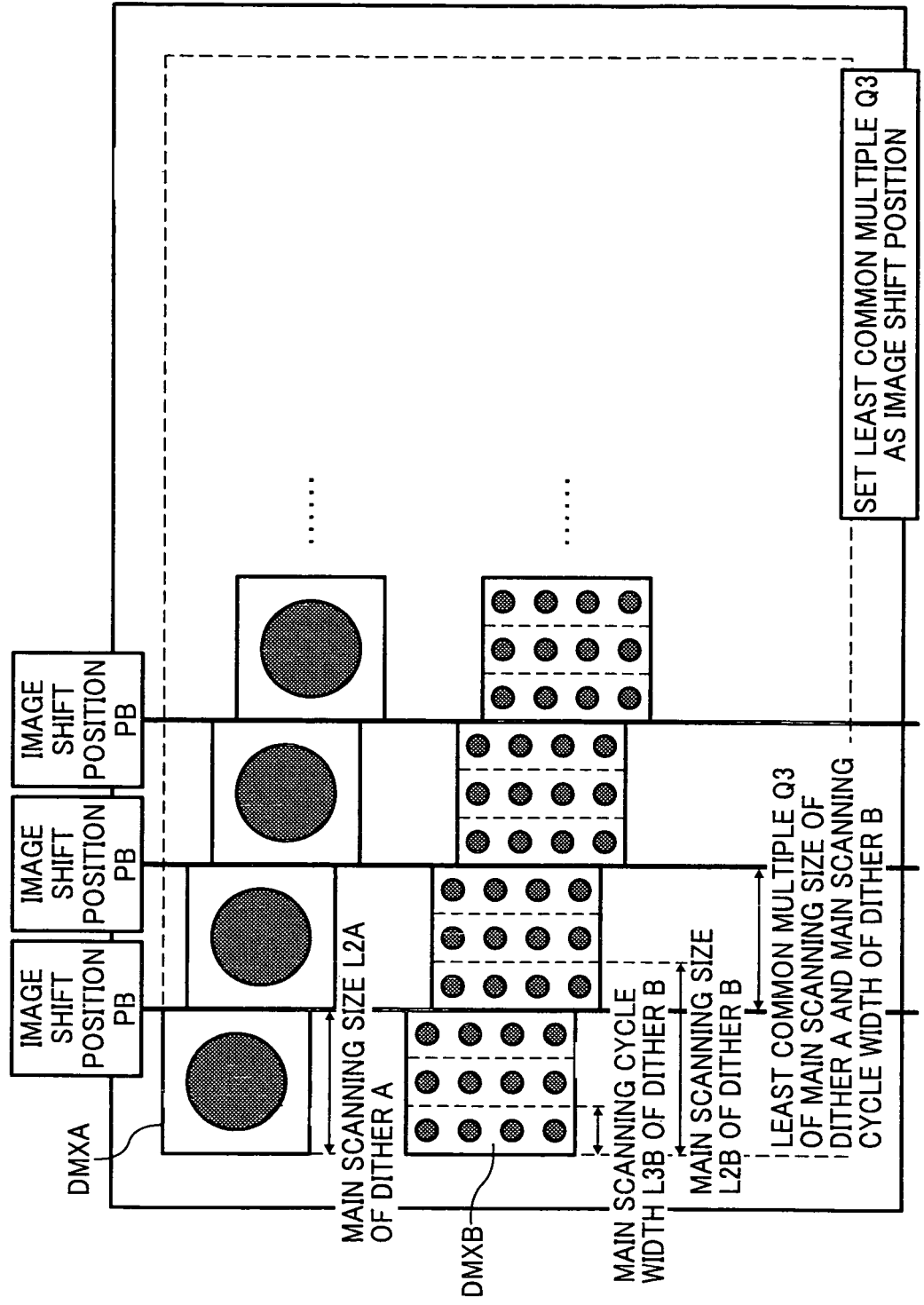
FIG. 39 is a schematic diagram of an example of image-shift possible positions for an image with dot-concentrated-type dither matrixes and dither matrixes having cyclic sub matrixes in the main-scanning direction.

FIG. 39 is a schematic diagram of an example of image-shift possible positions PB for an image with dot-concentrated-type dither matrixes and dither matrixes having cyclic sub matrixes in the main-scanning direction. When the image is formed by first dither matrixes DMXA in a dot-concentrated-type and second dither matrixes DMXB having cyclic sub matrixes in the main-scanning direction, the image-shift possible positions are set at positions corresponding to integral multiples of a least common multiple of the main-scanning sizes of the dither matrixes DMX, or positions corresponding to integral multiples of a least common multiple of the main-scanning cycle widths of the sub matrixes in the dither matrixes. However, it is possible to set the image-shift possible positions by setting an integral multiple of a least common-multiple of the main-scanning cycle width L3 of a sub matrix and the main-scanning size L2 of the dither matrix DMX as shown in FIG. 39. Specifically, the image-shift possible positions PB are set at positions corresponding to integral multiples of a least common multiple Q3 of the main-scanning size L2A of the dither matrix DMXA and the main-scanning cycle width L3B of the sub matrix SDMXB of the dither matrix DMXB. Even with these image-shift possible positions PB, the image shift position does not come over dither patterns. As a result, it is possible to prevent degradation of image quality due to misalignment of dither patterns.

The dividing positions and the dividing intervals in the main-scanning direction are set for each color by setting target dither matrixes or changing target dither matrixes depending on types of the matrix, image shift direction, screen angle of dither matrixes, the number of lines in the dither matrixes, or the like. According to the embodiment, the setting of the dividing positions and the dividing intervals are not performed for K because K is used as the reference color of the skew correction.

According to the embodiment, when the skew correction is performed in the image processing, the image shift position is set depending on dither matrixes. Therefore, it is possible to prevent occurrence of a noisy image due to misalignment of dither patterns at the image shift position.

Furthermore, the image shift position is set at positions where misalignment of dither patterns hardly occurs even when the image is shifted in the main-scanning direction. Therefore, it is possible to prevent occurrence of a noisy image at the image shift positions. When misalignment of dither patterns hardly occurs, it can mean that misalignment of dither patterns do not occur, causing no misalignment of dither patterns and no noisy image.

Moreover, the dividing positions and the dividing intervals in the main-scanning direction are set in accordance with the main-scanning size of dither matrixes. Therefore, the dividing positions and the dividing intervals can be easily set when the main-scanning size of dither matrixes is acquired.

Furthermore, the dividing positions and the dividing intervals in the main-scanning direction are set in accordance with the main-scanning cycle width of the sub matrixes in the dither matrixes. Therefore, the dividing positions and the dividing intervals can be easily set when the main-scanning cycle width of the sub matrixes in the dither matrixes is acquired.

When a plurality of types of dither matrixes are used, the shift positions are set at positions corresponding to the main-scanning size of the dither matrixes, the main-scanning cycle width of the sub matrixes, and a least common multiple of the mains scanning size and the main-scanning cycle width. Therefore, it is possible to reduce degradation of image quality even when different types of dither matrixes are used.

Although the origin of dither matrixes is fixed in the example shown in FIG. 29, some images have different origins for different dither matrixes, or origin may be changed due to rotation of an image after a dither process. In such a case, an image may be misaligned due to shift of the origin. It is possible to have a configuration in which misalignment of an image can be prevented even when the origin of dither matrixes is shifted.

Figure 40:
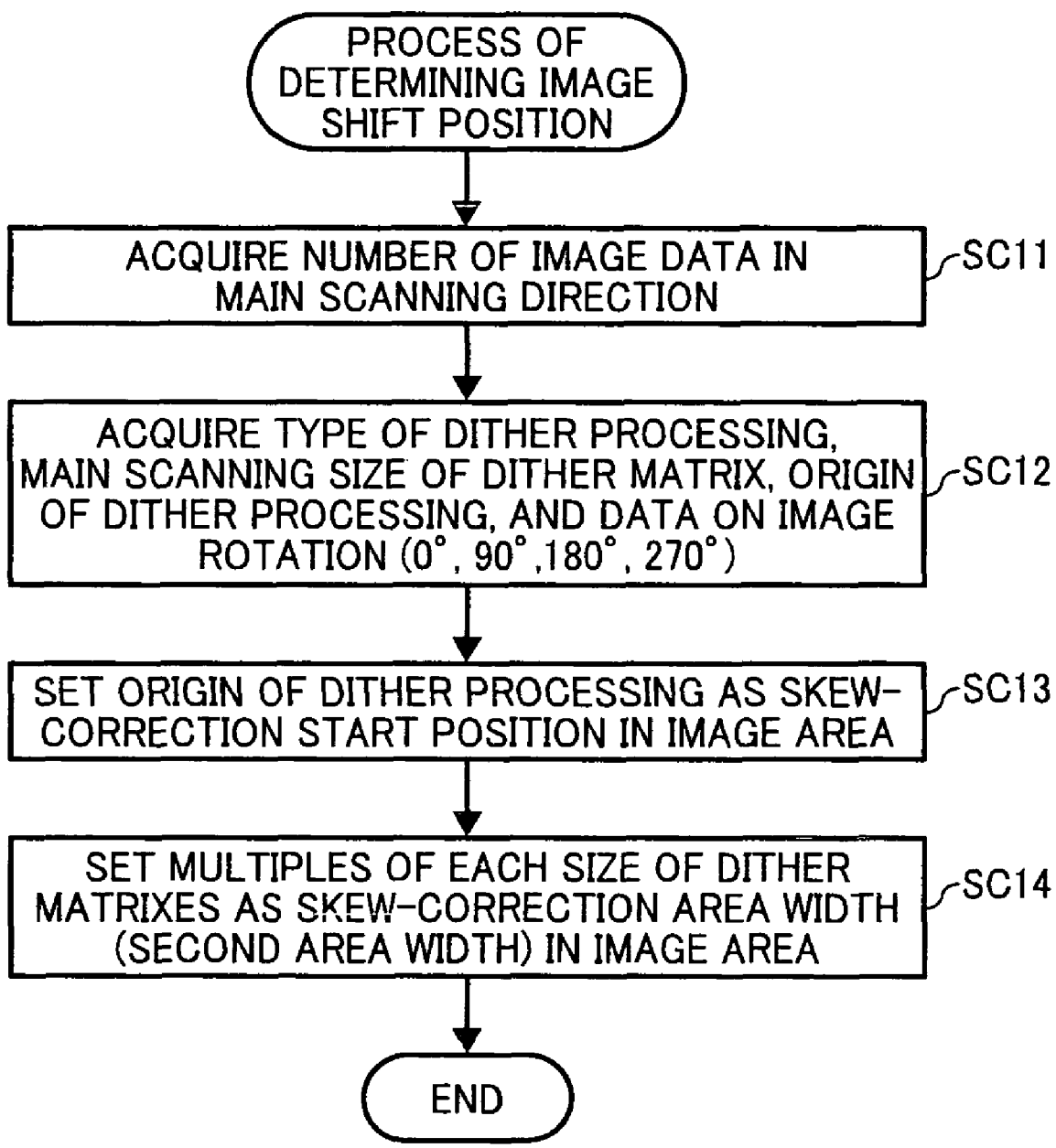
FIG. 40 is a flowchart of a process of determining an image shift position.

FIG. 40 is a flowchart of a process of determining an image shift position. The number of image data in the main-scanning direction is acquired (step SC-11). Data on types of dither process, main-scanning size of the dither matrix (dither matrix size), the origin of dither process, and data on rotation (0°, 90°, 180°, 270°) of the image is acquired (step SC-12). The origin of dither process is set at a skew-correction start position in an image area (step SC-13). Multiples of each size of dither matrixes are set as a skew-area width (second area width) in the image drawing area (step SC-14).

Figure 41:
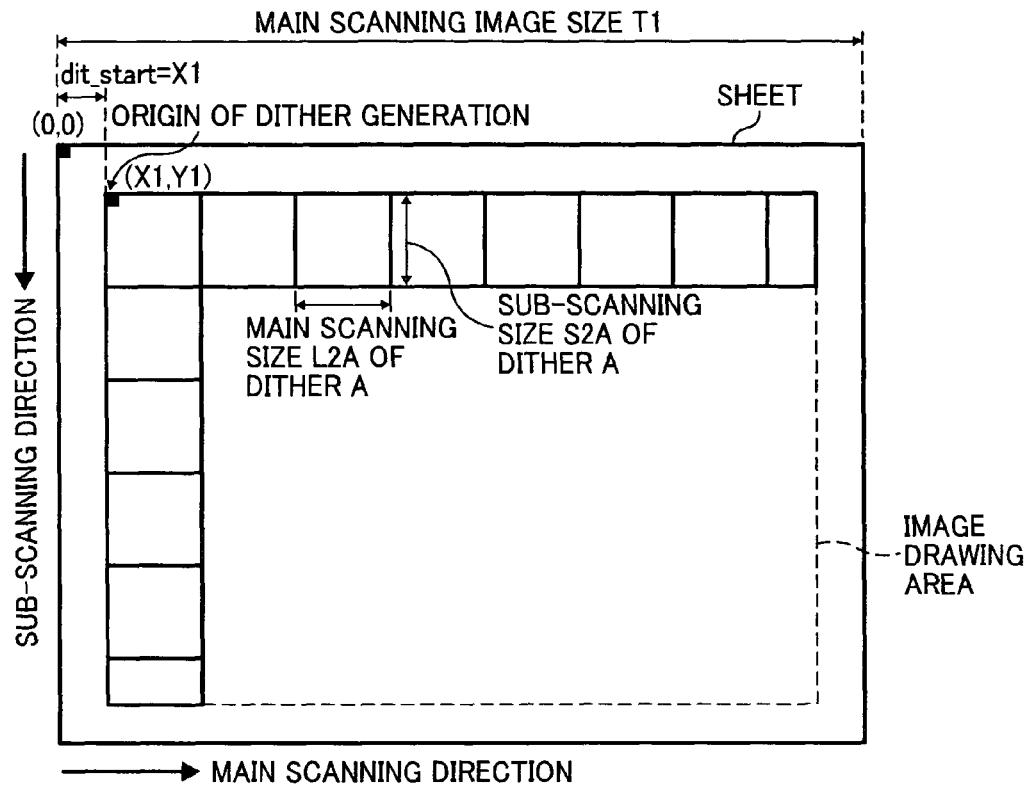
FIGS. 41 to 46 are schematic diagrams of examples of origins of dither matrixes.

At step SC-12, a dither start position (dit_start) is set in the manner described below. As shown in FIG. 41, when a left-top corner of a sheet size (image size) is set as coordinate (0, 0), and when dither-origin data indicates coordinate (X1, Y1), X1 is set as dit_start.

Figure 42:
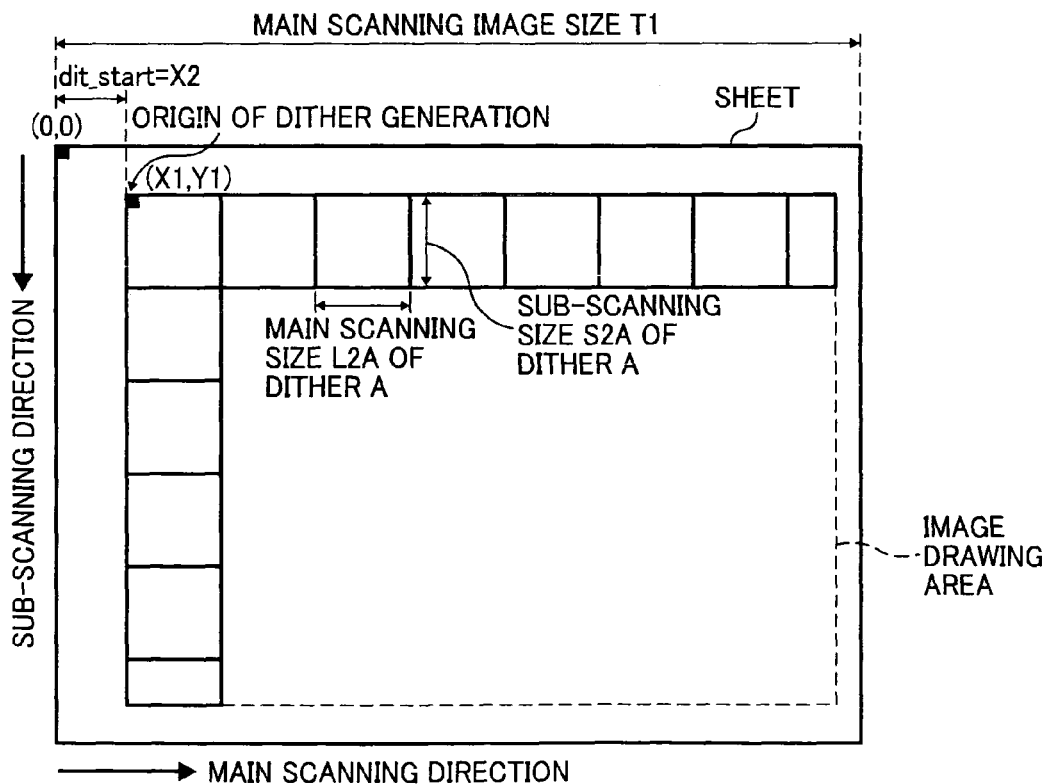

As shown in FIG. 42, when an image is shifted to a right side by a printer controller after the dither process, and when left-top corner of a sheet size (image size) is set as coordinate (0, 0), and dither-origin data indicates coordinate (X2, Y2), X2 is set as dit_start.

Figure 43:
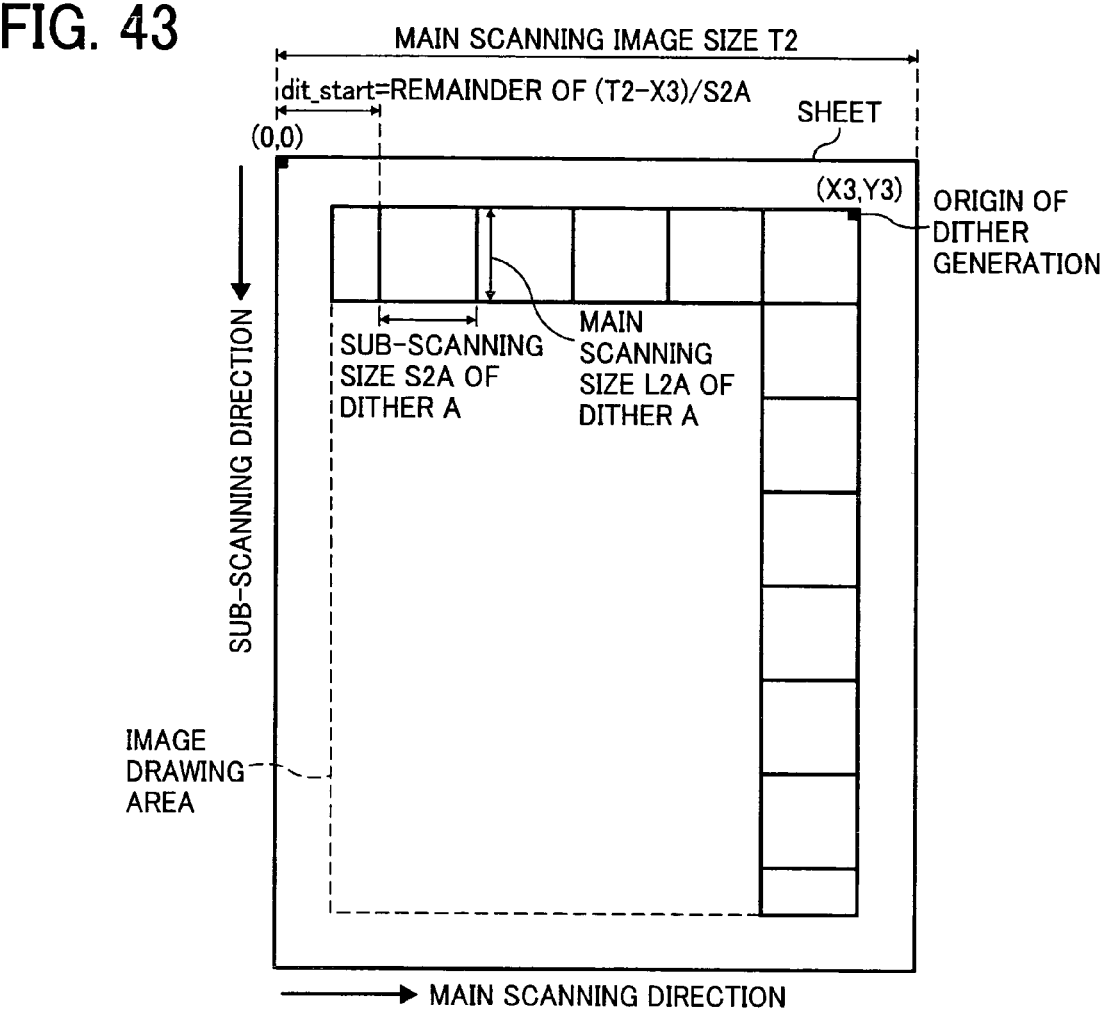

As shown in FIG. 43, when an image is rotated by 90° by a printer controller after the dither process, and when left-top corner of a sheet size (image size) is set as coordinate (0, 0), dither-origin data indicates coordinate (X3, Y3), main scanning image size is T2, main-scanning size as the dither matrix size is L2A, and the sub-scanning size is S2A, remainder of (T2−X3)/S2A is set as dit_start.

Figure 44:
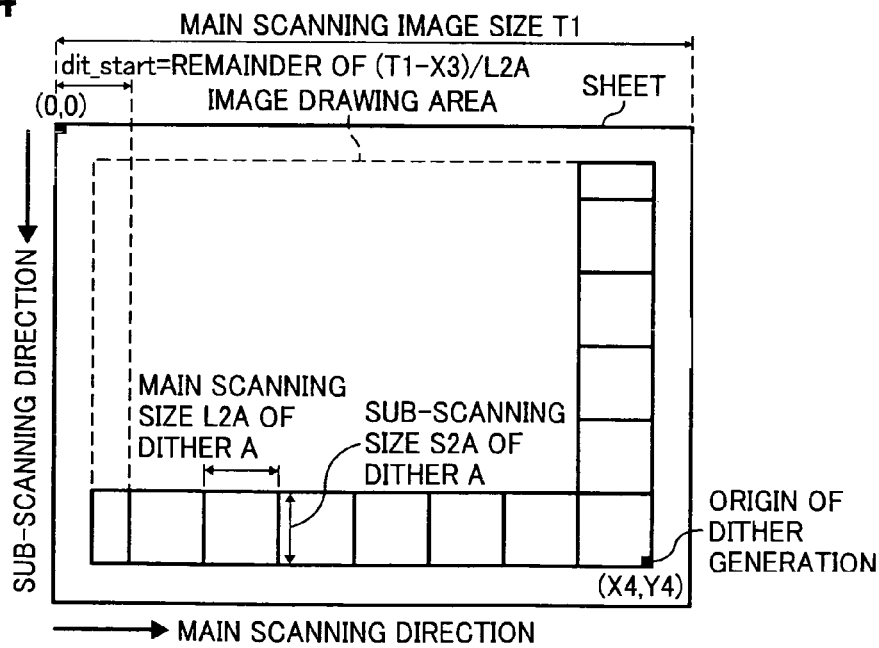

As shown in FIG. 44, when an image is rotated by 180° by a printer controller after the dither process, and when left-top corner of a sheet size (image size) is set as coordinate (0, 0), dither-origin data indicates coordinate (X3, Y3), main scanning image size is T1, main-scanning size as the dither matrix size is L2A, and the sub-scanning size is S2A, remainder of (T1−X3)/S2A is set as dit_start.

Figure 45:
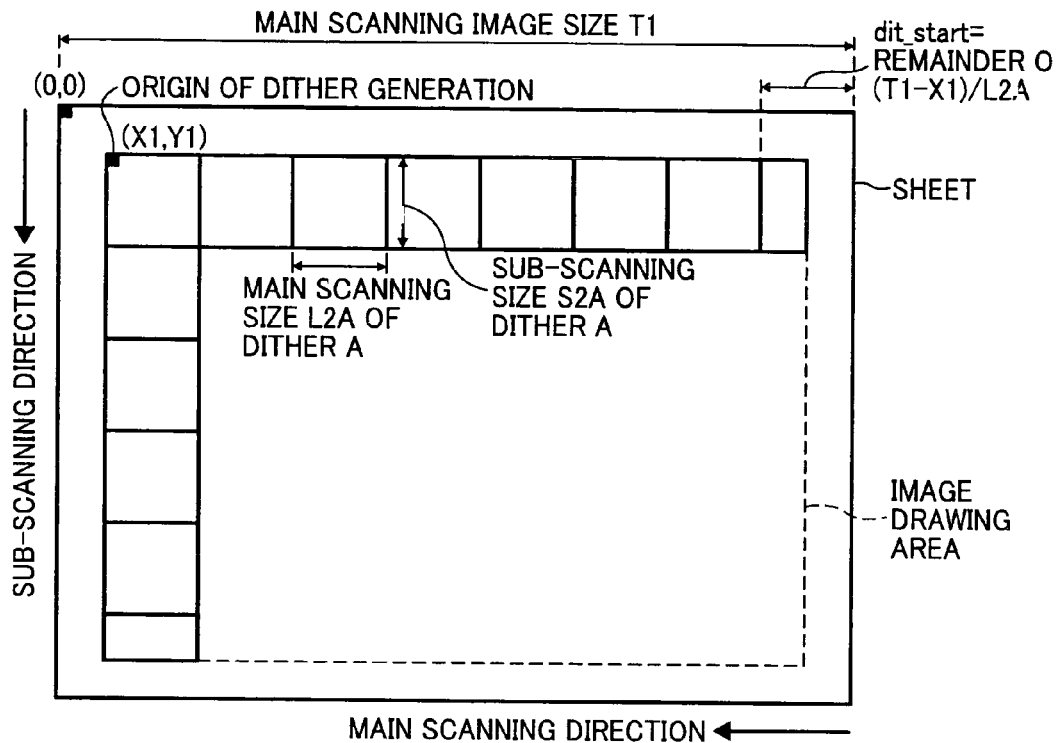

As shown in FIG. 45, when mirror process is performed by the engine control unit, and when left-top corner of a sheet size (image size) is set as coordinate (0, 0), dither-origin data indicates coordinate (X1, Y1), main scanning image size is T1, main-scanning size as the dither matrix size is L2A, and the sub-scanning size is S2A, remainder of (T1−X1)/S2A is set as dit_start.

Figure 46:
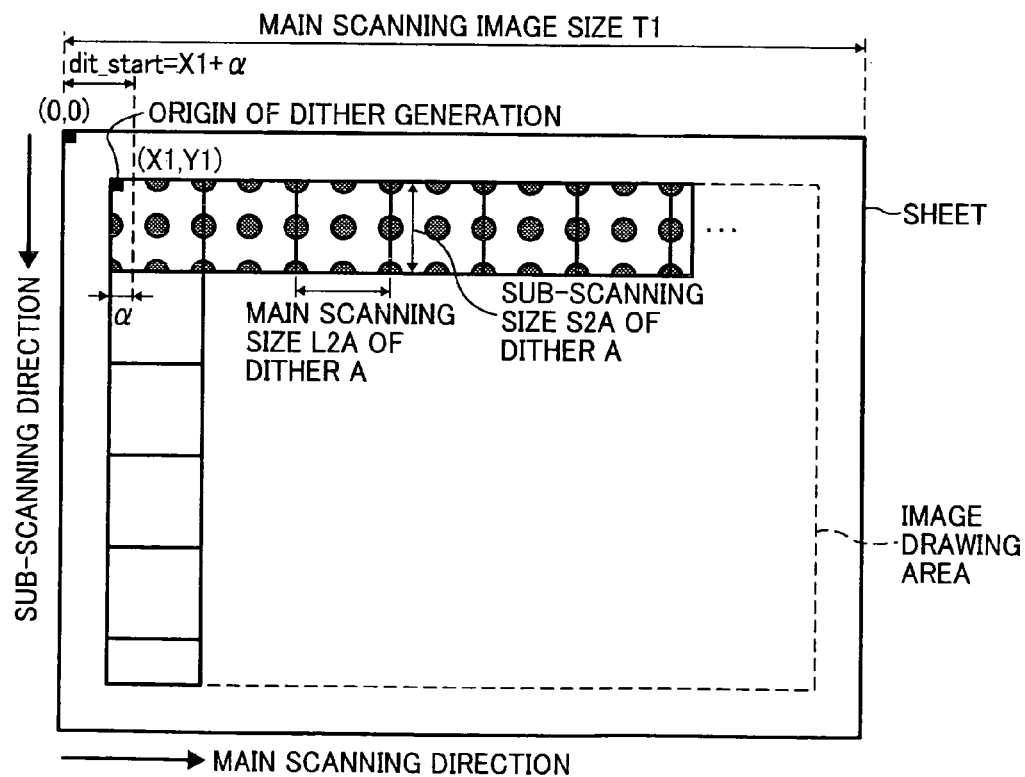

As shown in FIG. 46, in a normal processing, when a position is shifted to a position α in the main-scanning direction where dither patterns are not present, and when left-top corner of a sheet size (image size) is set as coordinate (0, 0), dither-origin data indicates coordinate (X1, Y1), main scanning image size is T1, main-scanning size as the dither matrix size is L2A, and the sub-scanning size is S2A, remainder of X1+α is set as dit_start.

As described above, it is possible to prevent drift of an image event when an origin of dither matrices is shifted.

According to an aspect of the present invention, an image is divided in the main-scanning direction at a position where a dither pattern is not present in a dither matrix on an image forming medium. Such divided image is then shifted in the sub-scanning direction at divided positions for performing skew correction. Therefore, misalignment of the image at the image shift position for skew correction can be prevented, resulting in reducing degradation of image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image correcting apparatus comprising:
a first calculating unit that calculates a blank position of dither matrixes used for performing a dither process on an image, the blank position being a position in the dither matrixes at which an image pattern is not present, based on a main-scanning size and an interval between the image patterns in the dither matrixes, the main-scanning size is a size of each of the dither matrixes in a main-scanning direction, and determines the blank position as one of image-shift possible positions, the image-shift possible positions are candidate positions where the image can be divided when performing skew-correction on the image;
a second calculating unit that calculates an image dividing position where the image is divided when performing skew-correction on the image based on amounts of misregistration between a reference color and each of other colors in the image;
a determining unit that compares the image-shift possible positions with the image dividing position and determines one of the image-shift possible positions closest to the image dividing position to began image shift position; and
a correcting unit that performs skew-correction on the image by dividing the image at the image shift position.

2. The image correcting apparatus according to claim 1, wherein the first calculating unit calculates a position corresponding to at least one of integral multiples of the main-scanning size of the dither matrix as a blank position.

3. The image correcting apparatus according to claim 1, wherein
each of the dither matrixes includes a first image pattern and a second image pattern, and
the first calculating unit calculates a position corresponding to at least one of integral multiples of a least common multiple of the main-scanning size of the first pattern and the main-scanning size of the second pattern as a blank position.

4. The image correcting apparatus according to claim 1, wherein
the dither matrix includes a plurality of sub matrixes, and
the sub matrixes each having image patterns and cyclically arranged in the main-scanning direction, the first calculating unit calculates a position corresponding to at least one of integral multiples of the main-scanning size of the sub matrixes as a blank position.

5. The image correcting apparatus according to claim 1, wherein
each of the dither matrixes has an image pattern arranged over an origin of each of the dither matrixes, and
the first calculating unit sets a base position of the image-shift possible positions on a position where the image patterns are not present in the dither matrixes and closest to a drawing start position of an image drawing area in the main-scanning direction, and determines the image-shift possible position based on the base position.

6. The image correcting apparatus according to claim 1, wherein
the image is formed in an inverse direction of the main-scanning direction, and
the first calculating unit sets a base position of the image-shift possible positions on a first position, the first position shifted by pixels from a head of an image drawing area in the main-scanning direction, the pixels correspond to a remainder of division of the main-scanning size of the image drawing area by an integral least common multiple of the main-scanning sizes of the dither matrixes, and determines the image-shift possible positions based on the base position.

7. The image correcting apparatus according to claim 6, wherein the first calculating unit sets the base position on a second position, the second position being a position shifted from the first position in the main-scanning direction so that the image patterns of the dither matrixes are not present in the second position, and determines the image-shift possible positions based on the base position.

8. The image correcting apparatus according to claim 1, wherein
the image is one that is rotated so as to shift a start position of the dither matrix from an origin of the dither matrix, and
the first calculating unit sets a base position of the image-shift possible positions based on an angle of rotation of the image and the main-scanning size of the dither matrix, and determines the image-shift possible positions based on the base position.

9. An image forming apparatus comprising:
a first calculating unit that calculates a blank position of dither matrixes used for performing a dither process on an image, the blank position being a position in the dither matrixes at which an image pattern is not present, based on a main-scanning size and an interval between the image patterns in the dither matrixes, the main-scanning size is a size of each of the dither matrixes in a main-scanning direction, and determines the blank position as one of image-shift possible positions, the image-shift possible positions are candidate positions where the image can be divided when performing skew-correction on the image;

a second calculating unit that calculates an image dividing position where the image is divided when performing skew-correction on the image based on amounts of misregistration between a reference color and each of other colors in the image;

a determining unit that compares the image-shift possible positions with the image dividing position and determines one of the image-shift possible positions closest to the image dividing position to be an image shift position;

a correcting unit that performs skew-correction on the image by dividing the image at the image shift position to obtain a skew-corrected image; and an image forming unit that performs an image formation process by using the skew-corrected image.

10. An image correcting method comprising:

calculating a blank position of dither matrixes used for performing a dither process on an image, the blank position being a position in the dither matrixes at which an image pattern is not present, based on a main-scanning size and an interval between the image patterns in the dither matrixes, the main-scanning size is a size of each of the dither matrixes in a main-scanning direction, and determines the blank position as one of image-shift possible positions, the image-shift possible positions are candidate positions where the image can be divided when performing skew-correction on the image;

calculating an image dividing position where the image is divided when performing skew-correction on the image based on amounts of misregistration between a reference color and each of other colors in the image;

comparing the image-shift possible positions with the image dividing position and determining one of the image-shift possible positions closest to the image dividing position to be an image shift position; and performing skew-correction on the image by dividing the image at the image shift position.

* * * * *